(12) United States Patent
Mercado

(10) Patent No.: US 10,274,700 B2
(45) Date of Patent: Apr. 30, 2019

(54) CAMERA LENS SYSTEM

(71) Applicant: Apple Inc., Cupertino, CA (US)

(72) Inventor: Romeo I. Mercado, Fremont, CA (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 14/939,948

(22) Filed: Nov. 12, 2015

(65) Prior Publication Data

US 2016/0341934 A1 Nov. 24, 2016

Related U.S. Application Data

(60) Provisional application No. 62/165,082, filed on May 21, 2015.

(51) Int. Cl.
| | | |
|---|---|---|
| *G02B 13/00* | (2006.01) | |
| *G02B 27/00* | (2006.01) | |
| *H04N 5/225* | (2006.01) | |
| *G02B 9/62* | (2006.01) | |

(52) U.S. Cl.
CPC .......... *G02B 13/0045* (2013.01); *G02B 9/62* (2013.01); *G02B 27/0075* (2013.01); *H04N 5/2252* (2013.01); *H04N 5/2254* (2013.01)

(58) Field of Classification Search
CPC .. G02B 13/0045; G02B 9/62; G02B 27/0075; H04N 5/2252; H04N 5/2254
USPC ........................................................ 359/713
See application file for complete search history.

(56) References Cited

U.S. PATENT DOCUMENTS

| | | |
|---|---|---|
| 4,550,987 A | 11/1985 | Tachihara |
| 8,599,495 B1 | 12/2013 | Tsai et al. |
| 8,743,482 B1 | 6/2014 | Tsai et al. |
| 8,749,896 B2 | 6/2014 | Shinohara |
| 9,341,819 B2 | 5/2016 | Chen et al. |

(Continued)

FOREIGN PATENT DOCUMENTS

| | | |
|---|---|---|
| CN | 101750706 A | 6/2010 |
| CN | 106199926 A | 12/2016 |

(Continued)

OTHER PUBLICATIONS

ROC (Taiwan) Pat. Appln. No. 105103860, Office Action dated Mar. 8, 2017.

(Continued)

*Primary Examiner* — Collin X Beatty
*Assistant Examiner* — Grant A Gagnon
(74) *Attorney, Agent, or Firm* — Womble Bond Dickinson (US) LLP

(57) ABSTRACT

An optical imaging lens assembly that may have six lens components. The optical imaging lens assembly may provide a 74 degree field of view. The first and fourth lens components may have positive refractive power. The second, third, and sixth lens components may have negative refractive power. The first lens component may have convex object-side and image-side refractive surfaces. The second and fifth lens components may have convex object-side and concave image-side refractive surfaces. The fourth lens component may have concave object-side and convex image-side refractive surfaces. The sixth lens component may have concave object-side and image-side refractive surfaces. The refracting surfaces may be aspheric. The optical imaging lens assembly may have a total track length of less than 6 millimeters and be part of a digital camera integrated into a portable wireless communications device.

18 Claims, 56 Drawing Sheets

(56) References Cited

U.S. PATENT DOCUMENTS

| | | |
|---|---|---|
| 9,366,842 B2 | 6/2016 | Chen et al. |
| 9,435,983 B2 | 9/2016 | Liao et al. |
| 2003/0227664 A1 | 12/2003 | Agrawal et al. |
| 2011/0002053 A1 | 1/2011 | Ovrutsky et al. |
| 2011/0255856 A1 | 10/2011 | Reshidko et al. |
| 2011/0261429 A1 | 10/2011 | Sbar et al. |
| 2012/0188654 A1 | 7/2012 | Huang |
| 2013/0016261 A1 | 1/2013 | Tanaka et al. |
| 2013/0050846 A1 | 2/2013 | Huang |
| 2013/0215489 A1 | 8/2013 | Blackburn et al. |
| 2013/0301147 A1 | 11/2013 | Yamada |
| 2013/0329306 A1 | 12/2013 | Tsai et al. |
| 2014/0153117 A1 | 6/2014 | Hagiwara |
| 2014/0192422 A1 | 7/2014 | Tang et al. |
| 2015/0103414 A1 | 4/2015 | Baik |
| 2015/0153546 A1 | 6/2015 | Tang et al. |
| 2015/0160435 A1 | 6/2015 | Chen et al. |

FOREIGN PATENT DOCUMENTS

| | | |
|---|---|---|
| EP | 2708929 A2 | 3/2014 |
| EP | 2860564 A1 | 4/2015 |
| JP | 2007322604 A | 12/2007 |
| JP | 2014123034 A | 7/2014 |
| JP | 5651881 B1 | 1/2015 |
| TW | 201239446 A | 10/2010 |
| TW | 201317619 A | 5/2013 |
| TW | 201413284 A | 4/2014 |
| TW | 201421062 A | 6/2014 |
| TW | 201433813 A | 9/2014 |
| TW | 201435383 A | 9/2014 |
| TW | 201441660 A | 11/2014 |
| TW | 104297904 A | 1/2015 |
| TW | 201502570 A | 1/2015 |
| TW | 201504673 A | 2/2015 |
| TW | 201508318 A | 3/2015 |
| TW | 201514534 A | 4/2015 |
| TW | M498897 | 4/2015 |

OTHER PUBLICATIONS

ROC (Taiwan) Pat Appln. No. 105111549, Office Action dated Mar. 1, 2017.

PCT/US2016/024365 filed Mar. 25, 2016, Invitation to Pay Additional Fees, dated Jun. 17, 2016.

PCT/US2016/022150, Notification of Transmittal of the International Search Report and the Written Opinion of the International Searching Authority, or the Declaration, dated Aug. 9, 2016.

PCT/US2016/014626, Notification of Transmittal of the International Search Report and the Written Opinion of the International Searching Authority, or the Declaration, dated Aug. 11, 2016.

PCT/US2016/024365, Notification of Transmittal of the International Search Report and the Written Opinion of the International Searching Authority, or the Declaration, dated Aug. 16, 2016.

PCT/US2016/014626, Invitation to Pay Additional Fees, dated Apr. 25, 2016.

PCT/US2016/022150, Invitation to Pay Additional Fees, dated Jun. 15, 2016.

U.S. Appl. No. 14/830,646, Office Action dated Sep. 2, 2016.

Office Action dated Dec. 22, 2016 for Taiwan Application No. 105109903 (with English Translation).

Office Action dated Jan. 11, 2017 for U.S. Appl. No. 14/830,650.

U.S. Appl. No. 14/830,650, Office Action dated Jan. 11, 2017.

Office Action for ROC (Taiwan) Patent Application No. 105111549 dated Jun. 22, 2017 w/English translation.

International Preliminary Report on Patentability, dated Nov. 30, 2017, Application No. PCT/US2016/024365.

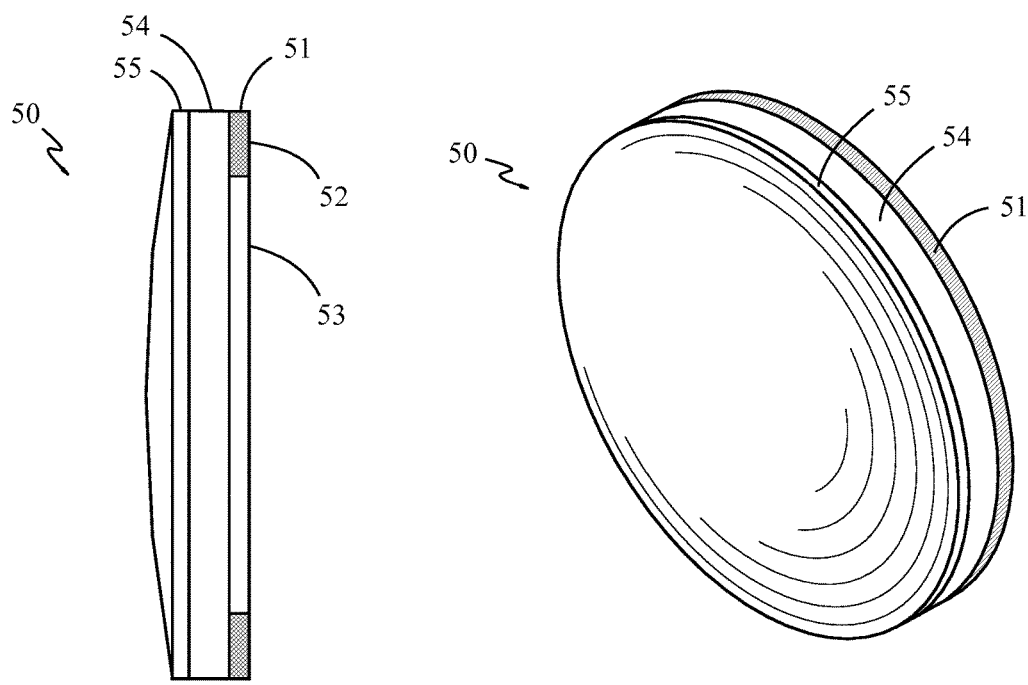
*FIG. 50A*
*FIG. 50B*
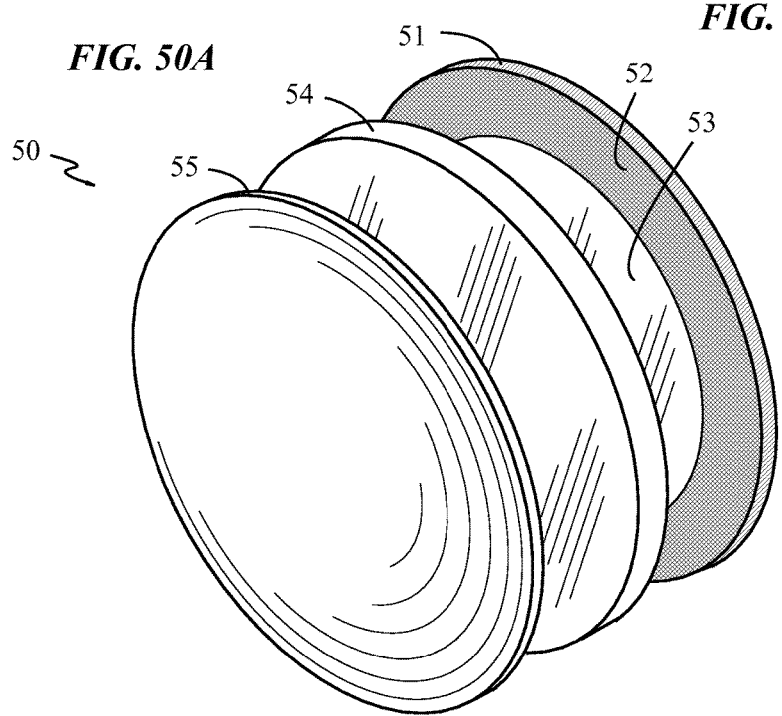
*FIG. 50C*

CAMERA LENS SYSTEM

BACKGROUND

Field

Embodiments of the invention relate to the field of lenses including a nonspherical surface; and more specifically, to lenses having six lens components.

Background

The advent of small mobile multipurpose devices such as smartphones, tablet or pad devices and laptop computers has resulted in a need for high resolution small form factor cameras for integration in the devices. However, due to limitations of conventional camera technology, conventional small cameras used in such devices tend to capture images at lower resolutions and/or with lower image quality than can be achieved with larger high quality cameras. Achieving higher resolution with small package size cameras generally requires use of photosensor with small pixel size and a high quality compact imaging lens system. Advances in technology have achieved reduction of the pixel size in photosensor. However, as photosensor become more compact and powerful, demand for compact imaging lens system with improved imaging quality performance has increased.

SUMMARY

Embodiments of the present disclosure may provide camera lens system designs with a large field of view (FOV) and a large aperture (low F-number) that can capture high resolution images at low background light levels for integration into electronic devices. Embodiments of the present disclosure also may provide a camera lens system design that can incorporate devices to vary the lens system focal ratio and allow adjustment of the depth of field (DOF) or exposure level of the image sensor array.

In some embodiments, an optical imaging lens assembly may be provided with six lens components. The first lens component may have positive refractive power. The second and sixth lens component may have negative refractive power. The third, fourth, and fifth lens component may have positive or negative refractive power. The lens assembly may include an electrically controlled electrochromic aperture having variable light transmittance in response to an applied electrical voltage. The retracting surfaces may be aspheric.

The first lens component may be biconvex in shape or a positive meniscus having a convex object-side refractive surface and a concave image-side refractive surface. The second lens component may be negative meniscus in shape having a convex object-side refractive surface and a concave image-side refractive surface. The third lens component may have convex object-side refractive power or concave object-side refractive surface and may have a concave image-side or convex image-side refractive surfaces. The fourth lens component may have concave object-side refractive surface or convex object-side refractive surface and may have a convex image-side refractive surface. The fifth lens component may have a convex object-side refractive surface and a concave image-side refractive surface. The sixth lens component may have convex object-side refractive surface and a concave image-side refractive surface.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 50A shows a side elevation of a wafer lens component.

FIG. 50B shows a pictorial view of the wafer lens component shown in FIG. 50A.

FIG. 50C shows an exploded pictorial view of the wafer lens component shown in FIG. 50A.

DETAILED DESCRIPTION

Figure 1:
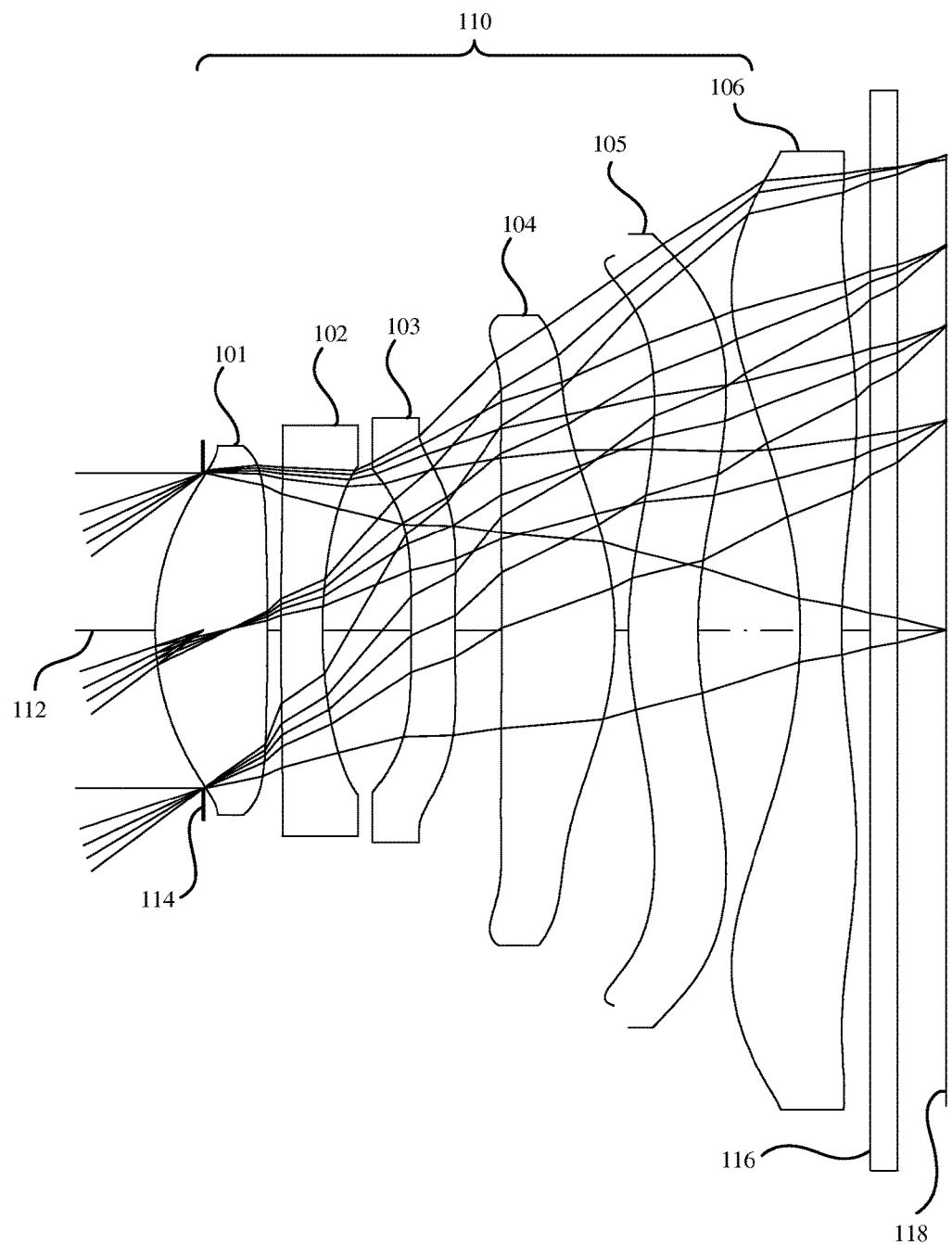
FIG. 1 is a cross-sectional illustration of an example embodiment of a lens system that includes six refractive lens elements.

In the following description, numerous specific details are set forth. However, it is understood that embodiments of the invention may be practiced without these specific details. In other instances, well-known structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The term "optical axis" or simply "axis" as applied to a lens designates the axis of rotational symmetry of the lens.

The term "element" as applied to a lens designates any single transparent mass of refractive material having two opposed refracting surfaces, which surfaces are disposed transversely of the optical axis of the lens and spaced therealong.

The term "component" as applied to a lens designates either (1) a single transparent mass of refractive material having two opposed refracting surfaces, i.e. an element, or (2) a grouped plurality of such masses arranged in series along the optical axis of the lens with their adjacent refracting surfaces either in full overall contact or in spaced parallel relation with the spacing being of such small magnitude that it does not enter into the lens computations.

Radii of refractive surfaces are expressed as positive numbers when the center of the circle is on the image side of the refractive surface. They are expressed as negative numbers when the center of the circle is on the object side of the refractive surface. An object-side refractive surface having a positive radius is convex; one having a negative radius is concave. An image-side refractive surface having a positive radius is concave; one having a negative radius is convex. The term "convex" as applied to a lens surface indicates that the lens surface is convex where the surface intersects the optical axis. The term "concave" as applied to a lens surface indicates that the lens surface is concave where the surface intersects the optical axis.

The term "refractive power" as applied to a lens designates the degree to which a lens converges or diverges light near the optical axis. "Positive refractive power" is refractive power that bends the ray toward the optical axis, i.e. converges light. "Negative refractive power" is refractive power that bends the ray away from the optical axis, i.e. diverges light.

The term "aperture stop" or simply "stop" as applied to a lens designates an opening that determines the size of the bundle of rays that pass through the lens system.

The term "focal length" as used herein means effective focal length and not front focal length nor rear focal length.

Embodiments of small form factor camera including a photosensor and a compact lens system with a large field of view (FOV) and a large aperture (low F-number) are described. Various embodiments of a compact lens system including five lens components with refractive power, including lens systems having wafer lens components, are described. These embodiments of compact lens systems may be used in the camera and provide a larger image with a lower F-number (larger aperture) than has been realized in conventional compact cameras. The camera may be implemented in a small package size while still capturing sharp, high resolution images, making embodiments of the camera suitable for use in small and/or mobile multipurpose devices such as cell phones, smartphones, pad or tablet computing devices, laptop, netbook, notebook, subnotebook, ultrabook computers, surveillance devices, and so on. However, aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

Embodiments of the compact lens systems are described for potential application to cameras having a ⅓ inch (6.15 mm diagonal) sensor. Example embodiments of large aperture lens systems may have about a 4.1 mm EFL (effective focal length), F/1.60 and F/1.80 aperture sizes, and 74 degree diagonal field of view (DFOV) (6.2-mm image circle diameter). Additional embodiments of the compact lens systems are also described for potential application to cameras having a 6.94 mm diagonal sensor. Example embodiments of such large aperture lens systems may have about a 4.61 mm EFL (effective focal length), F/2.0 aperture size, and 74 degree diagonal field of view (DFOV) (6.94-mm image circle diameter). Several example embodiments of compact low F-number lens systems are described. These lens system may be configured to include an electrically controlled electrochromic aperture mechanism.

FIGS. 1, 4, 7, 10, 27, 30, 35, 38, 41, 44, and 47 show cross-section views of the lens components for various example embodiments that include six refracting lens components. These examples are not intended to be limiting, and variations on the various parameters given for the lens system are possible while still achieving similar results.

The refractive lens components in the various embodiments may be composed of plastic materials. In at least some embodiments, the refractive lens elements may be composed of injection molded plastic material. However, other transparent optical materials may be used. Also note that, in a given embodiment, different ones of the lens elements may be composed of materials with different optical characteristics, for example different Abbe numbers and/or different refractive indices.

The camera may also include a frontal aperture stop (AS) located in front of (i.e., on the object side of) a first lens component. While FIGS. 1, 4, 7, 10, 27, 30, 35, 38, 41, 44, and 47 show a frontal aperture stop located at or near the front vertex of the lens system, the location of the aperture stop may be closer to or farther away from the vertex of the lens component. Further, the aperture stop may be located elsewhere in the lens system.

The camera may also, but not necessarily, include an infrared (IR) filter located between a last lens component of the lens system and the photosensor. The IR filter may, for example, be composed of a glass material. However, other materials may be used. Note that the IR filter does not affect the effective focal length of the lens system. Further note that the camera may also include other components in addition to those illustrated and described herein.

In the camera, the lens system forms an image at an image plane (IP) at or near the surface of the photosensor. The image size for a distant object is directly proportional to the effective focal length (f) of a lens system. The total track length (TTL) of the lens system is the distance on the optical axis (AX) between the front vertex at the object side surface of the first (object side) lens component and the image plane. For lens system having a large FOV and a low F-number, the TTL is normally greater than the effective focal length.

In at least some embodiments, the lens system may be configured such that the effective focal length f of the lens system is at or about 4.1 millimeters (mm), the F-number (focal ratio, or F-number) is at or about 1.8 and 1.6, the field of view (FOV) is at or about 74 degrees (although narrower or wider FOVs may be achieved), and the total track (TTL) is within the range of about 5.4 mm to about 5.6 mm. In at least two embodiments, the lens system may be configured such that the effective focal length f of the lens system is at or about 4.62 millimeters (mm), the F-number (focal ratio, or F-number) is at or about 2.0, the field of view (FOV) is at or about 74 degrees (although narrower or wider FOVs may be achieved), and the total track (TTL) is within the range of about 5.73 mm to about 5.74 mm. More generally, the lens system may be configured to satisfy the relation TTL/f>1.0.

In some example embodiments described herein, the lens system may be configured such that the effective focal length f of the lens system is 4.1 mm at reference wavelength 555 nm and the F-number is 1.8 or 1.6. The lens system may, for example, be configured with focal length f of 4.1 mm and F-number of 1.8 to satisfy specified optical, imaging, and/or packaging constraints for particular camera system applications. Note that the F-number, also referred to as the focal ratio, is defined as f/D, where D is the diameter of the entrance pupil, i.e., the effective aperture. As an example, at f=4.1 mm, an F-number of 1.8 is achieved with an effective aperture diameter of 2.28 mm. The example embodiment may also be configured with a field of view (FOV) at or about 74 degrees, a half FOV at or about 37 degrees. Total track length (TTL) of the example embodiments vary from about 5.4 mm to about 5.6 mm. The ratio of TTL/f varies within the range of about 1.32 to about 1.37 for the example embodiments.

However, note that the focal length f, F-number, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, F-number, field of view (FOV), imaging performance requirements, and packaging volume or size constraints.

In some embodiments, the lens system may be equipped with an adjustable iris (entrance) pupil or aperture stop. Using an adjustable aperture stop, the F-number (focal ratio) may be dynamically varied within a range. For example, if the lens is well corrected at f/1.8, at a given focal length f and FOV, then the focal ratio may be varied within the range of 1.8 to 8 (or higher) by adjusting the aperture stop, assuming that the aperture stop can be adjusted to the desired F-number setting. In some embodiments, the lens system may be used at faster focal ratio of f/1.6 with image quality performance at the same FOV (e. g. 74 degrees).

In some embodiments, the lens system may also be equipped with a focusing mechanism for focusing an object scene at infinity (object scene distance from camera >20 meters) to near object distance (<100 mm). For example, in some embodiments, the lens system as described herein may be equipped with adjustable focus mechanism wherein the lens system and/or photosensor at the image plane may be moved for focusing an object scene at distances ranging from greater than 20 meters to less than 100 mm.

While ranges of values may be given herein as examples of adjustable cameras and lens systems in which one or more optical parameters may be dynamically varied (e.g., using adjustable aperture stop and/or adjustable focus), embodiments of camera systems that include fixed (non-adjustable) lens systems in which values for optical and other parameters are within these ranges may be implemented.

Figure 7:
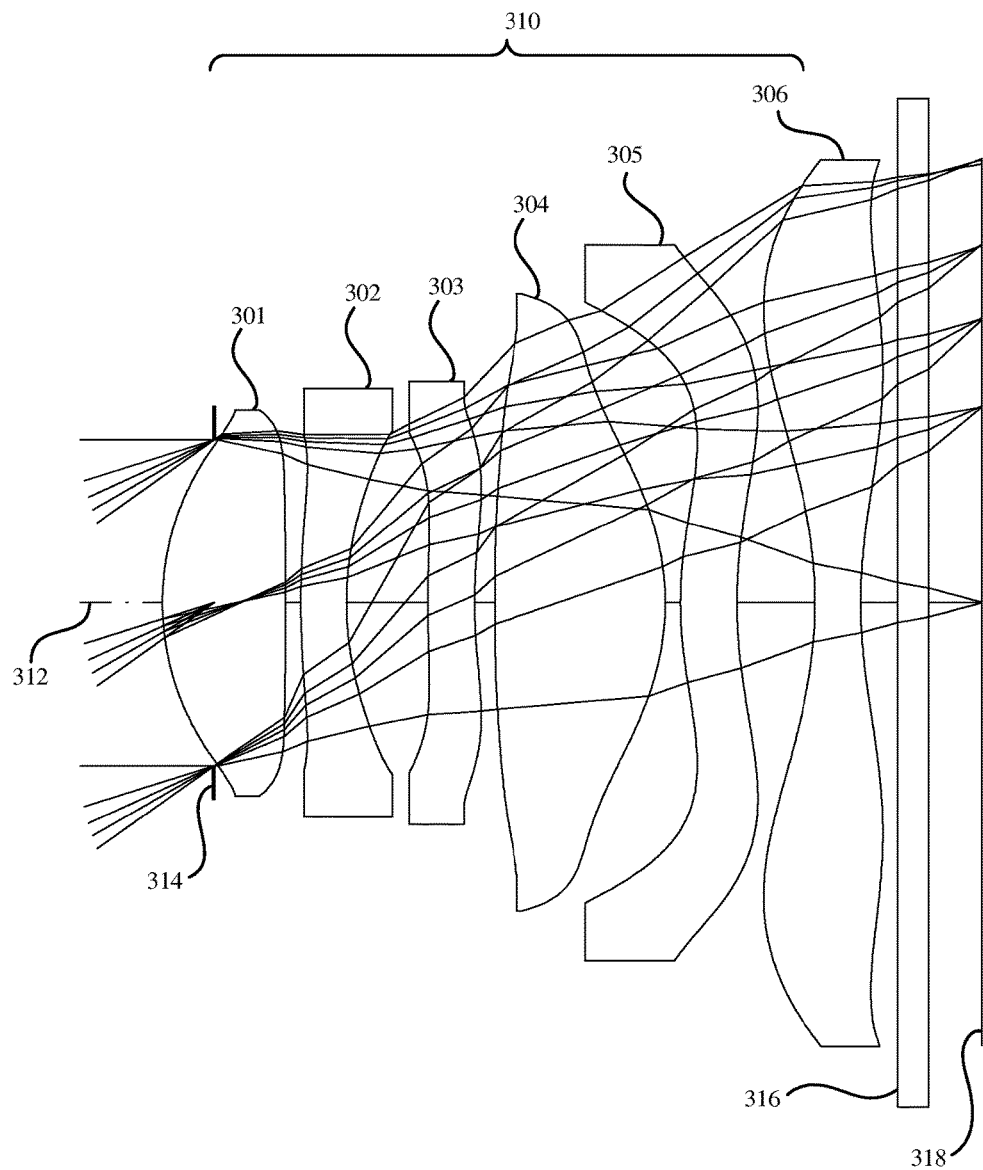
FIG. 7 is a cross-sectional illustration of another example embodiment of a lens system that includes six refractive lens elements.

Referring first to embodiments as illustrated in FIGS. 1 and 7, a compact lens system 110, 310 suitable for use in a camera may include six lens components. The six lens components 101-106 in the lens system 110 of FIG. 1 and the six lens components 301-306 in the lens system 310 of FIG. 7 each have a refractive power and form a lens system having a focal length of f. The six lens components of each of the lens systems 110, 310 are arranged along an optical axis (AX) 112, 312 from an object side to an image side as follows:

a first lens component 101, 301 having a positive refractive power, a focal length $f_1$, and a convex object side surface;
a second lens component 102, 302 having a negative refractive power and a focal length $f_2$;
a third lens component 103, 303 having a negative refractive power and a focal length $f_3$;
a fourth lens component 104, 304 having a positive refractive power and a focal length $f_4$;
a fifth lens component 105, 305 having a positive refractive power and a focal length $f_5$; and
a sixth lens component 106, 306 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 110, 310 form an image on or near the surface of an image sensor 118, 318. A cover material 116, 316, such as a cover glass or an infrared cut filter, may be placed between the lens systems 110, 310 and the image sensor 118, 318. A frontal aperture stop (AS) 114, 314 may be located on the object side of the first lens component 101, 301.

Referring now to embodiments as illustrated in FIGS. 1, and 7, a compact lens system 110, and 310 suitable for use in a camera may include six lens components. The six lens components 101-106 in the lens system 110 of FIG. 1, and the six lens components 301-306 in the lens system 310 of FIG. 7 each have a refractive power and form a lens system having a focal length of f. The lens component 101 of lens system 110 and lens component 301 of lens system 310 having positive refractive power, focal $f_1$, and a convex object-side surface. The lens component 101 and lens component 301 may also be biconvex in shape. The lens component 102 of lens system 110 and lens component 302 of lens system 310 having negative refractive power, a focal length $f_2$, and a convex object-side surface. The lens component 102 and lens component 302 may also be negative meniscus in shape. The lens component 103 of lens system 110 and lens component 303 of lens system 310 having negative refractive power, a focal length $f_3$, and a concave image-side surface. The lens component 103 and lens component 303 may also be negative meniscus in shape. The lens component 104 of lens system 110 and lens component 304 of lens system 310 having positive refractive power, a focal length $f_4$, and a convex image-side surface. The lens component 104 may also be positive meniscus in shape and lens component 304 may be biconvex in shape. The lens component 105 of lens system 110 and lens component 305 of lens system 310 having positive refractive power, a focal length $f_5$, and a convex object-side surface. The lens component 105 and lens component 305 may be positive meniscus in shape. The lens component 106 of lens system 110 and lens component 306 of lens system 310 having negative refractive power, a focal length $f_6$, and a concave image-side surface. The lens component 106 and lens component 306 may be biconcave in shape.

Referring now to embodiments as illustrated in FIGS. 4, 10, 27, 30, 35, and 38, a compact lens system 210, 410, 510, 610, 710, 810 suitable for use in a camera may include six lens components. The six lens components 201-206 in the lens system 210 of FIG. 4, the six lens components 401-406 in the lens system 410 of FIG. 10, the six lens components 501-506 in the lens system 510 of FIG. 27, the six lens components 601-606 in the lens system 610 of FIG. 30, the six lens components 701-706 in the lens system 710 of FIG. 35, and the six lens components 801-806 in the lens system 810 of FIG. 38 each have a refractive power and form a lens system having a focal length of f. The six lens components of each of the lens systems 210, 410, 510, 610, 710, and 810 are arranged along an optical axis (AX) 212, 412, 512, 612, 712, 812 from an object side to an image side as follows:

a first lens component 201, 401, 501, 601, 701, 801 having a positive refractive power, a focal length $f_1$, and a convex object side surface;
a second lens component 202, 402, 502, 602, 702, 802 having a negative refractive power and a focal length $f_2$;
a third lens component 203, 403, 503, 603, 703, 803 having a negative refractive power and a focal length $f_3$;
a fourth lens component 204, 404, 504, 604, 704, 804 having a positive refractive power and a focal length $f_4$;
a fifth lens component 205, 405, 505, 605, 705, 805 having a negative refractive power and a focal length $f_5$; and
a sixth lens component 206, 406, 506, 606, 706, 806 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 210, 410, 510, 610, 710, 810 form an image on or near the surface of an image sensor 218, 418, 518, 618, 718, 818. A cover material 216, 416, 516, 616, 716, 816 such as a cover glass or an infrared cut filter, may be placed between the lens systems 210, 410, 510, 610, 710, 810 and the image sensor 218, 418, 518. 618, 718, 818. A frontal aperture stop (AS) 214, 414, 514, 614, 714, 814, may be located on the object side of the first lens component 201, 401, 501, 601, 701, 801.

Referring to embodiments as illustrated in FIGS. 4, 10, 27, 30, 35, and 38, a compact lens system 210, 410, 510, 610, 710, and 810 suitable for use in a camera may include six lens components. The six lens components 201-206 in the lens system 210 of FIG. 4, the six lens components 401-406 in the lens system 410 of FIG. 10, the six lens components 501-506 in the lens system 510 of FIG. 27, the six lens components 601-606 in the lens system 610 of FIG. 30, the six lens components 701-706 in the lens system 710 of FIG. 35, and the six lens components 801-806 in the lens system 810 of FIG. 38 each have a refractive power and form a lens system having a focal length of f. The lens component 201 of lens system 210, the lens component 401 of lens system 410, the lens component 501 of lens system 510, the lens component 601 of lens system 610, the lens component 701 of lens system 710, and lens component 801 of lens system 810 having positive refractive power, focal $f_1$, and a convex object-side surface. The lens component 201, lens component 401, lens component 501, lens component 601, lens component 701, and lens component 801 may also be biconvex in shape. The lens component 202 of lens system 210, lens component 402 of lens system 410, lens component 502 of lens system 510, lens component 602 of lens system 610, lens component 702 of lens system 710 and lens component 802 of lens system 810 having negative refractive power, a focal length $f_2$, and a convex object-side surface. The lens component 202, lens component 402, lens component 502, lens component 602, lens component 702, and lens component 802 may also be negative meniscus in shape. The lens component 203 of lens system 210, lens component 403 of lens system 410, lens component 503 of lens system 510, lens component 603 of lens system 610, lens component 703 of lens system 710, and lens component 803 of lens system 810 having negative refractive power, a focal length $f_3$, and a concave object-side surface. The lens component 203, lens component 403, lens component 503, lens component 603, lens component 703, and lens component 803 may also be negative meniscus or biconcave in shape. The lens component 204 of lens system 210, the lens component 404 of lens system 410, the lens component 504 of lens system 510, the lens component 604 of lens system 610, the lens component 704 of lens system 710, and lens component 804 of lens system 810 having positive refractive power, a focal length $f_4$, and a convex image-side surface. The lens component 204, lens component 404, lens component 504, lens component 604, lens component 704 and lens component 804 may also be positive meniscus in shape. The lens component 205 of lens system 210, the lens component 405 of lens system 410, the lens component 505 of lens system 510, the lens component 605 of lens system 610, the lens component 705 of lens system 710, and lens component 805 of lens system 810 having negative refractive power, a focal length $f_5$, and a convex object-side surface. The lens component 205, lens component 405, lens component 505, lens component 605, lens component 705 and lens component 805 may be in the form of negative meniscus. The lens component 206 of lens system 210, the lens component 406 of lens system 410, the lens component 506 of lens system 510, the lens component 606 of lens system 610, the lens component 706 of lens system 710, and lens component 806 of lens system 810 having negative refractive power, a focal length $f_6$, and a concave image-side surface. The lens component 206, lens component 406, lens component 506, lens component 606, lens component 706, and lens component 806 may be biconcave in shape.

Figure 41:
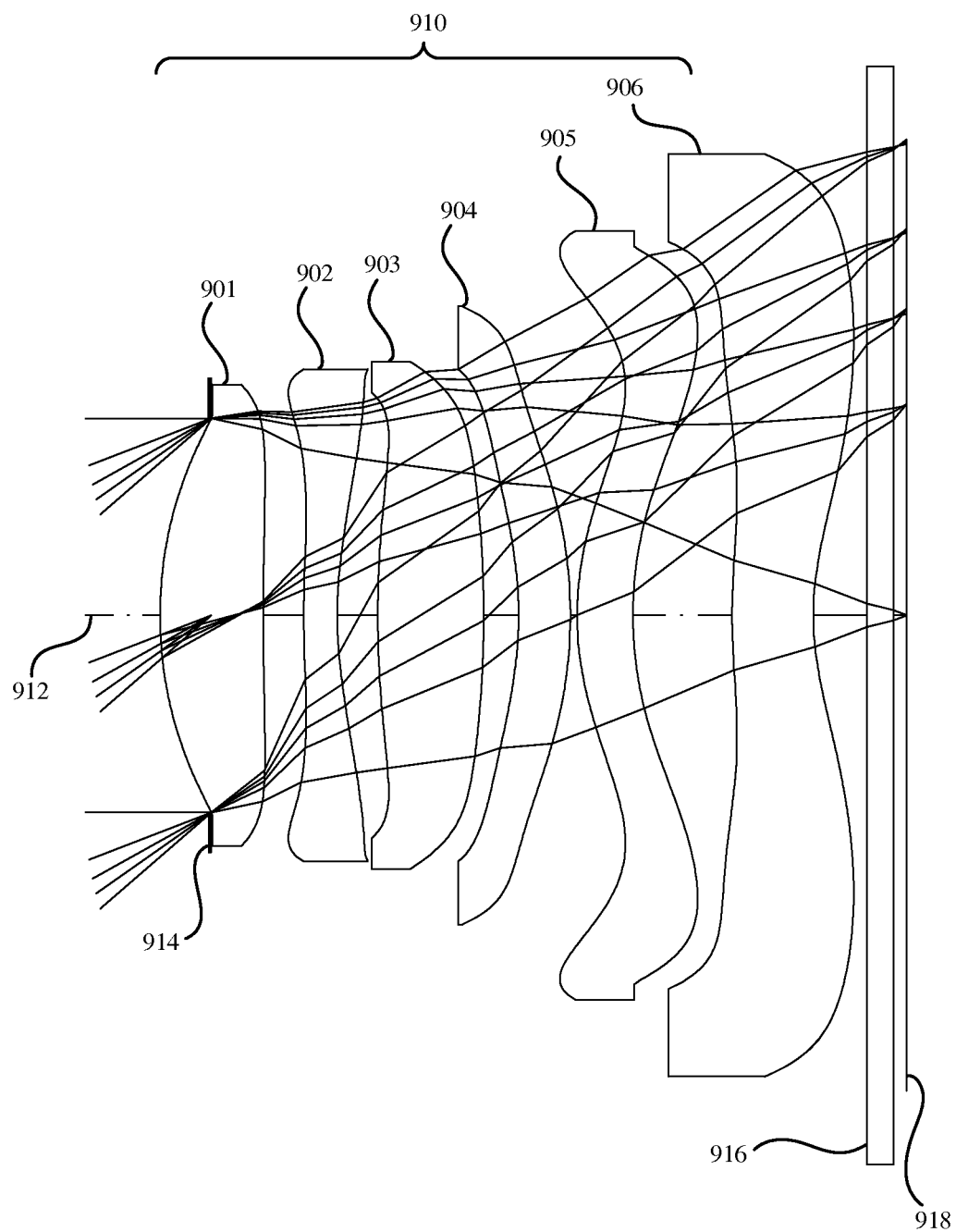
FIG. 41 is a cross-sectional illustration of another example embodiment of a lens system that includes six refractive lens elements.
Figure 44:
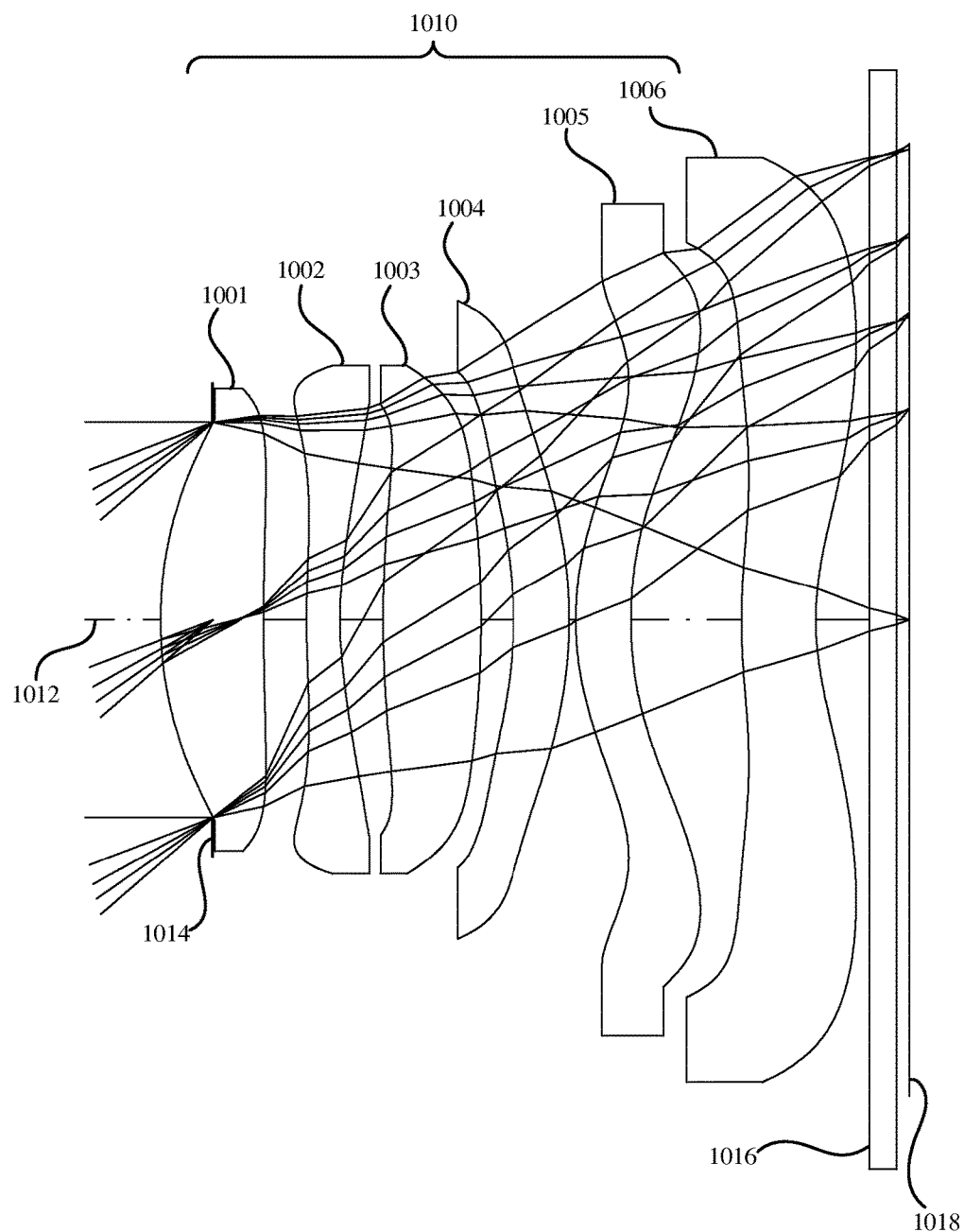
FIG. 44 is a cross-sectional illustration of another example embodiment of a lens system that includes six refractive lens elements.

Referring to embodiments as illustrated in FIGS. 41 and 44, a compact lens system 910, 1010 suitable for use in a camera may include six lens components. The six lens components 901-906 in the lens system 910 of FIG. 41 and the six lens components 1001-1006 in the lens system 1010 of FIG. 44 each have a refractive power and form a lens system having a focal length of f. The six lens components of each of the lens systems 910, 1010 are arranged along an optical axis (AX) 912, 1012 from an object side to an image side as follows:

a first lens component 901, 1001 having a positive refractive power, a focal length $f_1$, and a convex object side surface;

a second lens component 902, 1002 having a negative refractive power and a focal length $f_2$;

a third lens component 903, 1003 having a positive refractive power and a focal length $f_3$;

a fourth lens component 904, 1004 having a negative refractive power and a focal length $f_4$;

a fifth lens component 905, 1005 having a positive refractive power and a focal length $f_5$; and a sixth lens component 906, 1006 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 910, 1010 form an image on or near the surface of an image sensor 918, 1018. A cover material 916, 1016, such as a cover glass or an infrared cut filter, may be placed between the lens systems 910, 1010 and the image sensor 918, 1018. A frontal aperture stop (AS) 914, 1014 may be located on the object side of the first lens component 901, 1001.

Referring now to embodiments as illustrated in FIGS. 41, and 44, a compact lens system 910, and 1010 suitable for use in a camera may include six lens components. The six lens components 901-906 in the lens system 910 of FIG. 41, and the six lens components 1001-1006 in the lens system 1010 of FIG. 44 each have a refractive power and form a lens system having a focal length of f. The lens component 901 of lens system 910 and lens component 1001 of lens system 1010 having positive refractive power, focal $f_1$, and a convex object-side surface. The lens component 901 and lens component 1001 may also be positive meniscus in shape. The lens component 902 of lens system 910 and lens component 1002 of lens system 1010 having negative refractive power, a focal length $f_2$, and a convex object-side surface. The lens component 902 and lens component 1002 may also be negative meniscus in shape. The lens component 903 of lens system 910 and lens component 1003 of lens system 1010 having positive refractive power, a focal length $f_3$, and a convex object-side surface. The lens component 903 and lens component 1003 may also be biconvex in shape. The lens component 904 of lens system 910 and lens component 1004 of lens system 1010 having negative refractive power, a focal length $f_4$, and a concave object-side surface. The lens component 904 and lens component 1004 may be negative meniscus in shape. The lens component 905 of lens system 910 and lens component 1005 of lens system 1010 having positive refractive power, a focal length $f_5$, and a convex object-side surface. The lens component 905 and lens component 1005 may be positive meniscus in shape. The lens component 906 of lens system 910 and lens component 1006 of lens system 1010 having negative refractive power, a focal length $f_6$, and a concave image-side surface. The lens component 906 and lens component 1006 may be negative meniscus in shape.

Figure 47:
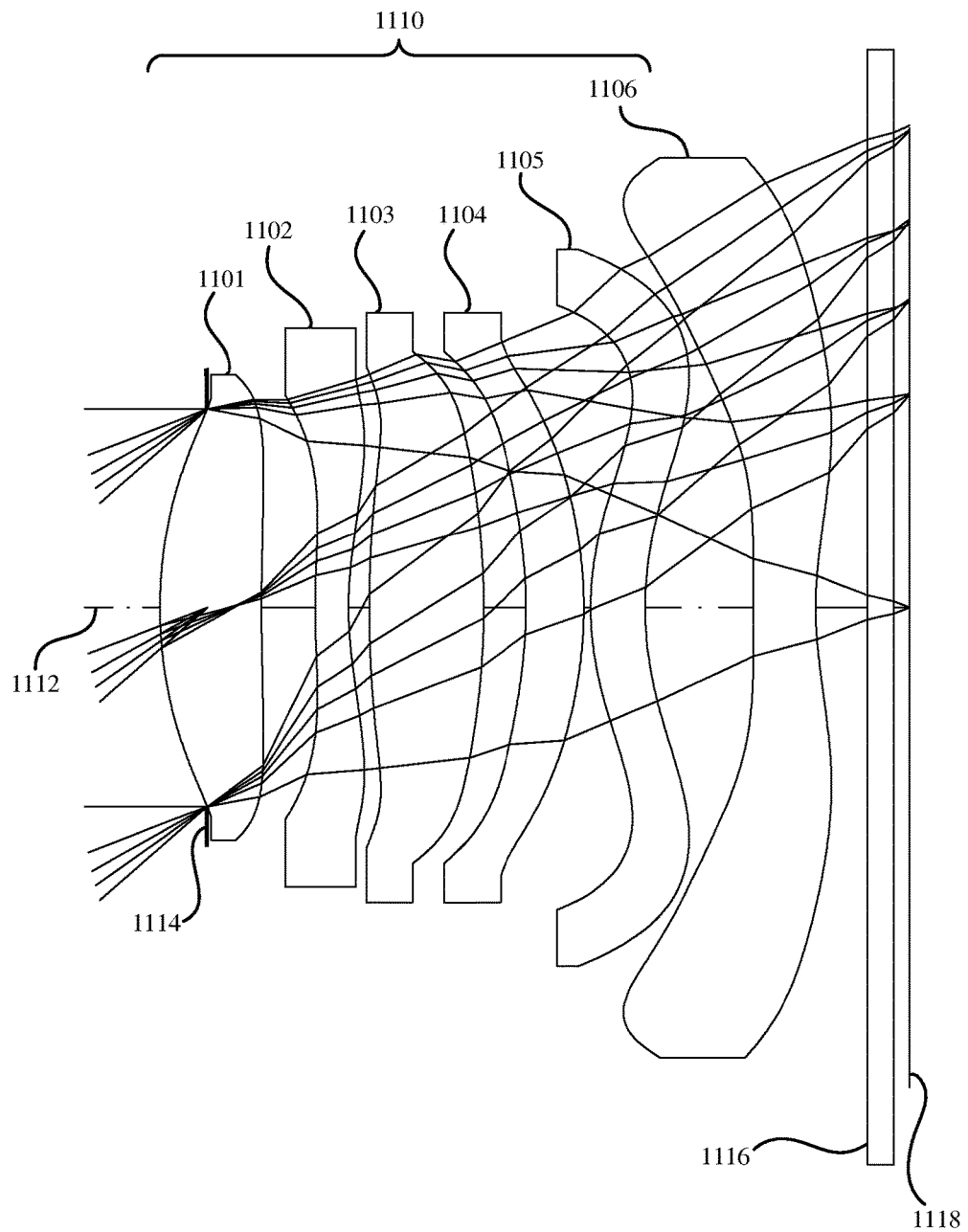
FIG. 47 is a cross-sectional illustration of another example embodiment of a lens system that includes six refractive lens elements.

Referring now to embodiments as illustrated in FIG. 47, a compact lens system 1110 suitable for use in a camera may include six lens components. The six lens components 1101-1106 in the lens system 1110 of FIG. 47 each have a refractive power and form a lens system having a focal length of f. The six lens components of each of the lens system 1110 are arranged along an optical axis (AX) 1112, from an object side to an image side as follows:

a first lens component 1101 having a positive refractive power, a focal length $f_1$, and a convex object side surface;

a second lens component 1102 having a negative refractive power and a focal length $f_2$;

a third lens component 1103 having a positive refractive power and a focal length $f_3$;

a fourth lens component 1104 having a positive refractive power and a focal length $f_4$;

a fifth lens component 1105 having a positive refractive power and a focal length $f_5$; and a sixth lens component 1106 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 1110 form an image on or near the surface of an image sensor 1118. A cover material 1116, such as a cover glass or an infrared cut filter, may be placed between the lens system 1110 and the image sensor 1118. A frontal aperture stop (AS) 1114 may be located on the object side of the first lens component 1101.

Referring now to embodiments as illustrated in FIG. 47, a compact lens system 1110 suitable for use in a camera may include six lens components. The six lens components 1101-1106 in the lens system 1110 of FIG. 47 each have a refractive power and form a lens system having a focal length of f. The lens component 1101 of lens system 1110 having positive refractive power, focal $f_1$, and a convex object-side surface. The lens component 1101 may also be positive meniscus in shape. The lens component 1102 of lens system 1110 having negative refractive power, a focal length $f_2$, and a convex object-side surface. The lens component 1102 may also be negative meniscus in shape. The lens component 1103 of lens system 1110 having positive refractive power, a focal length $f_3$, and a convex object-side surface. The lens component 1103 may also be biconvex in shape. The lens component 1104 of lens system 1110 having positive refractive power, a focal length $f_4$, and a concave object-side surface. The lens component 1104 may be positive meniscus in shape. The lens component 1105 of lens system 1110 having positive refractive power, a focal length $f_5$, and a convex object-side surface. The lens component 1105 may be positive meniscus in shape. The lens component 1106 of lens system 1110 having negative refractive power, a focal length $f_6$, and a concave image-side surface. The lens component 1106 may be negative meniscus in shape.

Embodiments of the lens systems described herein may use a wafer lens component for any or all of the lens components in the lens system. The wafer lens component is comprised as a unit of the combination of a polymeric laminate layer and a planar substrate. Thus the refractive power of the wafer lens component is provided by the laminate layer or layers and the planar substrate or substrates. The laminate layer and the planar substrate will generally have different characteristics such as the indices of refraction and Abbe numbers. These composite optical materials contribute to the refractive power of the wafer lens component and these composite material refractive indices are considered in the computation of the refractive power of the wafer lens or wafer lens group. Therefore, the wafer lens component differs optically from a lens element of the same geometry that is formed of a single transparent mass of refractive material and the planar substrate, which may be a planar glass substrate, of the wafer lens does enter into the lens computations.

The wafer lens component may be composed of a single or multiple layer laminate of polymeric or plastic materials on one or both sides of a planar substrate, which may be a planar glass substrate. In some embodiments, a wafer lens component may be composed of two planar substrates having a single or multiple layer laminate of polymeric or plastic materials on one side of each substrate and having the opposite sides of the substrates immediately adjacent one another. The first laminate layer faces the object side and the second laminate layer faces the image side. The piano surfaces of the two planar substrates may face one another either in full overall contact or in spaced parallel relation with the spacing being of such small magnitude that it does not enter into the lens computations.

The wafer lens component may include an electrochromic layer that provides a variable light transmittance in response to an applied electrical voltage. The electrochromic layer may serve the function of a variable aperture stop. The electrochromic layer may be applied to the planar substrate of the wafer lens component. In other embodiments the electrochromic layer may be located between the image side planar surface of a first wafer lens substrate and the object side planar surface of a second wafer lens substrate. The electrochromic layer may be composed of transparent film layer of electrically conductive organic or inorganic material, such as metallic oxides and conductive polymers.

FIG. 50A shows a side elevation of a wafer lens component 50. FIG. 50B shows a pictorial view of the wafer lens component 50. FIG. 50C shows an exploded pictorial view of the wafer lens component 50. The wafer lens component 50 has a planar substrate 54 with a refractive element 55 molded on a first piano surface of the planar substrate and a light controlling element 51 applied to the opposite piano surface of the planar substrate. While the light controlling element 51 is illustrated as having a substantial thickness for clarity, in some embodiments the light controlling element may be a thin film that is much thinner than what is suggested by the figures. in some embodiments the light controlling element may be 1 to 2 microns thick.

The light controlling element 51 may be in the form of an aperture stop that includes an opaque material which defines a transparent opening, such as a circular opening, centered on the optical axis. In another embodiment the light controlling element may be in the form of a neutral density filter that reduces the intensity of light uniformly over the entire surface.

Figure 54:
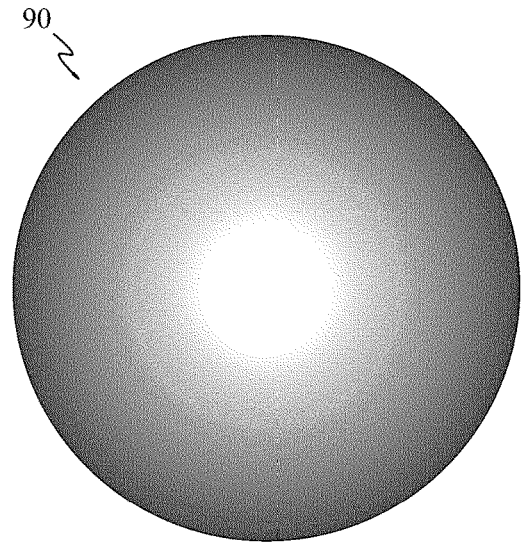
FIG. 54 shows a plan view of an apodized aperture.

In yet another embodiment the light controlling element may be in the form of an apodized aperture that reduces the intensity of light by a smoothly increasing amount as the distance from the optical axis increases, as suggested by FIG. 54. An apodized aperture may provide a smoothly increasing attenuation of transmitted light from a central transparent opening with substantially no attenuation to a fully opaque outer edge that fully attenuates transmitted light. In other embodiments, an apodized aperture may provide a smoothly increasing attenuation of transmitted light that begins with a substantial attenuation and/or ends before fully attenuating the light. For example, an apodized aperture may include a transparent circular opening centered on the optical axis joined to an opaque outer ring by an apodized ring. The apodized ring may provide a smoothly increasing attenuation of transmitted light that begins at the outer edge of the transparent circular opening with a substantial attenuation of perhaps 20% and ends at the inner edge of the opaque outer ring with less than full attenuation of perhaps 80%.

The light controlling element 51 may provide a variable light transmittance. In some embodiments, the light controlling element may be a thin film layer of conductive organic or inorganic material applied to the planar substrate 54 to provide an electrochromic lens component having variable light transmittance in response to an applied electrical voltage. In one embodiment, the electrochromic lens component provides a variable neutral density filter.

Figure 51:
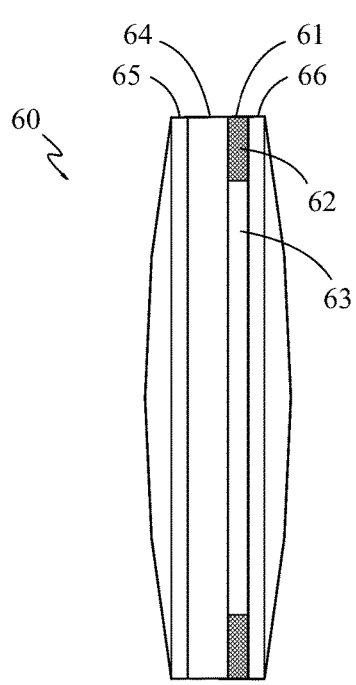
FIG. 51 shows a side elevation of another wafer lens component.

FIG. 51 shows a side elevation of another wafer lens component 60. The wafer lens component 60 has a planar substrate 64 with a first refractive element 65 molded on a first piano surface of the planar substrate and a light controlling element 61 applied to the opposite piano surface of the planar substrate. A second refractive element 66 is molded on the light controlling element 61 on the side of the light controlling element opposite from side applied to the piano surface of the planar substrate. The light controlling element 61 may be of any of the forms previously described in connection with FIGS. 50A-50C.

Figure 52:
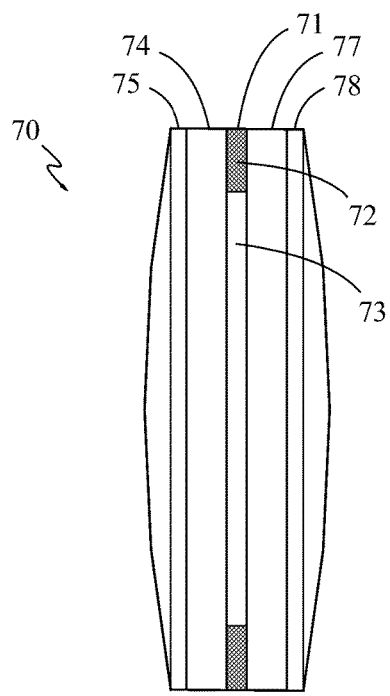
FIG. 52 shows a side elevation of yet another wafer lens component.

FIG. 52 shows a side elevation of yet another wafer lens component 70. The wafer lens component 70 has a first planar substrate 74 with a first refractive element 75 molded on a first piano surface of the first planar substrate. The wafer lens component 70 further has a second planar substrate 77 with a second refractive element 78 molded on a second piano surface of the second planar substrate. The first refractive element 75 and the second refractive element 78 are arranged to form the two outside elements of the wafer lens component 70. A light controlling element 71 is placed between the first planar substrate 74 and the second planar substrate 77 to be supported by the piano surfaces of the planar substrates opposite the piano surfaces on which the refractive elements 75, 78 are molded. The light controlling element 71 may be of any of the forms previously described in connection with FIGS. 50A-50C. The placement of a light controlling element 71 between two planar substrates 74, 77 may be advantageous when the light controlling element is thin, for example only a few microns thick.

Figure 53:
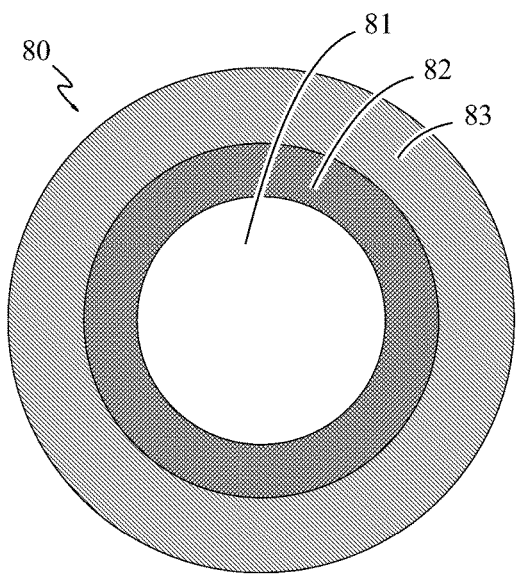
FIG. 53 shows a plan view of an electrochromic lens component that provides a variable aperture stop.

FIG. 53 shows a plan view of an electrochromic lens component 80 that provides a variable aperture stop. The embodiment illustrated includes a transparent circular opening 81 centered on the optical axis. The transparent circular opening 81 is surrounded by two concentric annular rings 82, 83. The concentric annular rings may be electrochromic films that are adjustable between being substantially transparent to being substantially opaque to provide a solid state equivalent of a mechanical aperture stop.

In another embodiment an electrochromic lens component may provide an apodized aperture 90 of the type illustrated in FIG. 54 with a variable intensity profile distribution across the aperture opening for the light energy transmitted through the optical system.

FIGS. 55-63 illustrate embodiments of electrochromic lens components that may be used to provide a light control for some embodiments of the lens system described herein.

Figure 55:
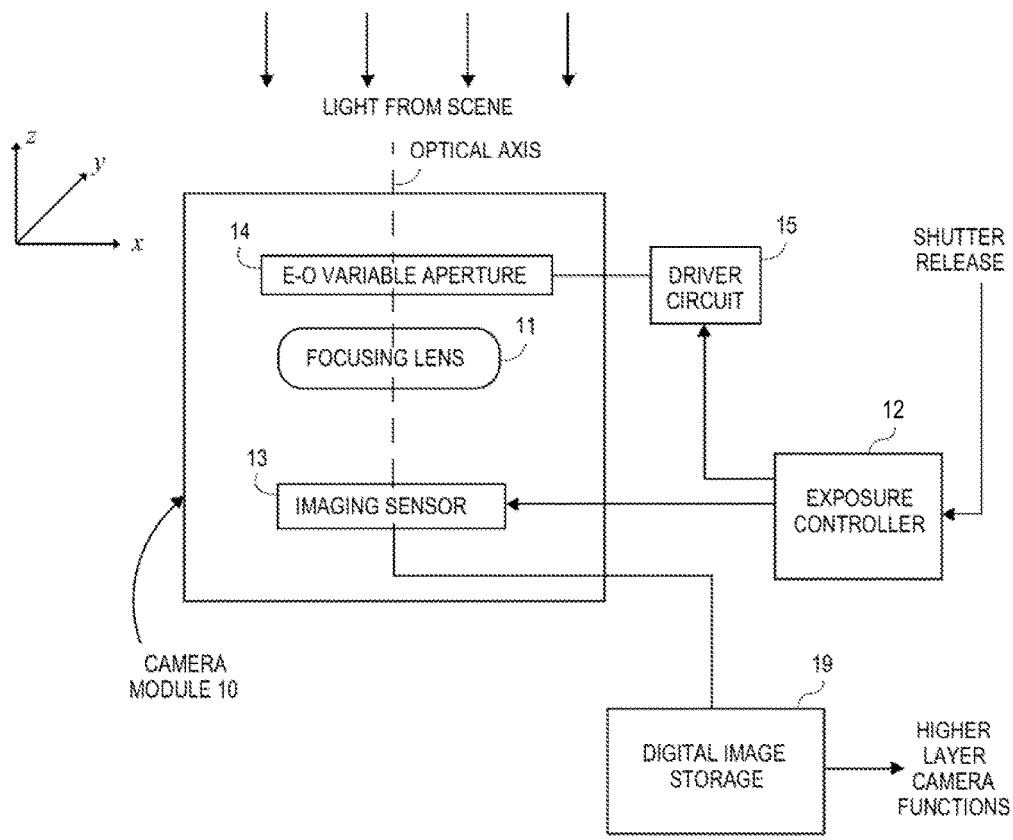
FIG. 55 is a block diagram of camera-related elements including a camera module and associated electronics circuitry.

FIG. 55 is a block diagram of the camera module 10 together with electronic circuit elements that are needed to implement the camera function. Note that there may be additional functions that are implemented in the consumer electronics device as is known to those of ordinary skill in the art but that are not described here in the interest of conciseness, e.g. communication network interfaces, display screens, touch screens, keyboards, and audio transducers. The camera module 10 has an imaging sensor 13 that is part of an optical system, which also includes a focusing lens 11 and an electro-optically (E-O) variable aperture 14. These optical components are aligned to an optical axis as shown. Note however, that while in this particular example all of the optical components are in a straight line, in other embodiments there may be a mirror or other optical deflector that allows one or more of the components to be positioned off of a straight line. Nevertheless, those components may still be considered "aligned with the optical axis." What is shown in FIG. 55 is a particularly efficient mechanism (in terms of packaging) that can fit within the tight confines of a low z-height device such as a smart phone, a tablet computer, or a laptop computer, where, in particular, all of the optical interfaces are positioned substantially parallel to a front or rear face of the external housing of the device. In other words, each optical component lies flat within an x-y plane with its height given in the z-direction shown.

The imaging sensor 13 may be any conventional solid-state imaging sensor such as a complementary metal oxide semiconductor (CMOS) sensor chip, which presents an interface to an exposure controller 12 to receive certain parameters for determining an exposure for taking a picture. The sensor parameters may include pixel integration time, which may be set by the exposure controller 12 in accordance with any suitable exposure control algorithm that considers various input variables (e.g., level of scene illumination and the availability of a flash or strobe illumination). The exposure controller 12 may automatically perform the algorithm to determine an appropriate exposure setting, and then signal the imaging sensor to update its parameters in response to a manual shutter release command (e.g., in response to a mechanical or virtual shutter button being actuated by a user of the device). The exposure controller 12 may be implemented as a programmed processor or as a completely hardwired logic state machine together with stored parameter options. Once a digital image has been captured by the imaging sensor 13 under the chosen exposure setting, it may be transferred to a digital image storage 19 (e.g., solid state volatile or non-volatile memory), prior to being further processed or analyzed by higher layer camera functions that yield for example a still picture file (e.g., in a JPEG format) or a video file (e.g., in a digital movie format).

Also included in the camera module 10 is a focusing lens 11 which may include one or more lens components that serve to focus light from the scene onto the imaging sensor 13 (thereby producing an optical image on an active pixel array portion of the imaging sensor 13). The focusing lens 11 may be one of the lens systems described herein. The focusing lens 11 may be part of either a fixed focus optical subsystem, or a variable focus subsystem that implements an autofocus mechanism. In the case of an auto focus mechanism, additional control parameters relating to lens position can be set by the exposure controller 12 for each exposure to be taken, as is apparent to those of ordinary skill in the art.

The camera module 10 also has the E-O variable aperture 14, which for the purposes of the block diagram is shown as being positioned in front of the focusing lens 11 on the optical path. When used with embodiments of the lens system described herein, the E-O variable aperture 14 will be located within the focusing lens 11. The aperture 14 effectively implements a pupil whose width or size is electrically variable. The aperture 14 may be positioned at any suitable aperture location along the optical axis in front of the imaging sensor 13. When the aperture 14 has been electrically controlled into a small or narrow pupil, highly collimated rays are admitted by it, which results in a sharp focus at an image plane of the optical system. On the other hand, when the aperture 14 is configured into a large or wide pupil, un-collimated rays are admitted resulting in an optical image that is sharp around what the focusing lens 11 is focusing on, and may be blurred otherwise. The aperture 14 thus determines how collimated the admitted rays of light from the scene are, that ultimately come to a focus in an image plane. The aperture 14 also determines the amount of incident light or how many incoming rays are admitted, and thus how much light reaches the imaging sensor, where of course the narrower the aperture the darker the digital image that is captured by the sensor 13 (for a given integration time). Control of the effective pupil size of the aperture 14 is achieved using an electronic driver circuit 15, which may receive a control signal or command from the exposure controller 12 that may represent the desired size of the effective pupil. The driver circuit 15 translates this input command into a drive voltage that is applied to the input transparent conductors of the aperture 14, as described below.

Figure 56:
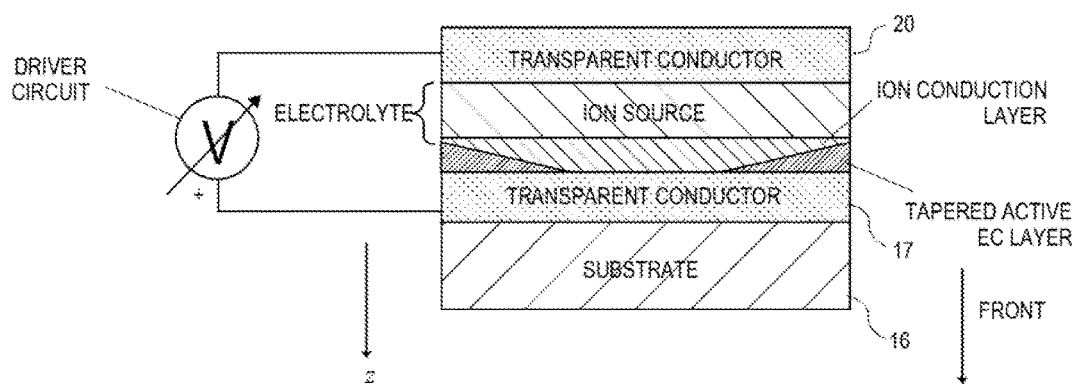
FIG. 56 is a cutaway view of an E-O variable aperture in accordance with an embodiment of the invention.

Turning now to FIG. 56, a cutaway view of the aperture 14 in accordance with an embodiment of the invention is shown. As can be seen, the aperture 14 has a stack that includes a front transparent conductor medium 17 which in this example is connected to the "+" terminal of the driver circuit, an electrolyte medium, an active EC medium, and a rear transparent conductor medium 20 (connected to the complimentary terminal of the driver circuit). In one embodiment, the elements of the stack are formed to be in contact with one another as they are depicted in the figure, i.e. the electrolyte medium is formed as a layer whose surface is in contact with the rear transparent conductor layer 20, and whose opposite surface is in contact with the active EC medium, e.g. an active EC layer, while a surface of the latter is in contact with the front transparent conductor layer 17.

In one embodiment, the electrolyte medium consists of an ion source medium that is adjacent to the rear transparent conductor 20 and is in contact with an ion conduction medium, which in turn is adjacent to the active EC layer. Here, an ion source layer is formed that is not in contact with the active EC layer, but rather is in contact with the ion conduction layer, the latter being in contact with the active EC layer. In other words, the ion conduction layer is entirely sandwiched between the ion source layer and the active EC layer. This arrangement may also be found in other embodiments of the aperture 14, for instance as they are depicted in the cut away views of FIGS. 31-33.

The ion source layer stores suitable ions, for example, lithium ions, that will be used for activating the EC layer when a sufficient charge field, that may be generally vertically directed in the context of the figures here, has been generated between the transparent conductor layers 17, 20. In addition, the ion source layer should be sufficiently clear or transparent to allow light rays from the scene to pass through (in a generally vertical direction in the context of the figures here). The ion source layer may also be referred to as a counter electrode layer.

The ion conduction layer allows for high mobility of the ions that have been produced by the ion source when entering the active EC layer.

The transparent conductor layers 17, 20 in the front and rear are formed on a piano surface of a substrate 16 as shown in FIG. 56. The stack-up of layers, shown in all of the figures here as starting with the transparent conductor layer 17, may be formed on upon another. The substrate is an element of a wafer lens as previously described. The substrate may be made of glass, polycarbonate, or other suitable material or composition that is transparent enough for use in an optical system of a consumer electronics camera and that can be used to support the formation of the transparent conductor layers 17, 20 and one or two refractive components.

A transparent conductor may be, for example, a layer of indium tin oxide (ITO) or other transparent conductive material that is formed as a relatively thin layer. The transparent conductor provides a conductive path for charge from the driver circuit to be applied to the ion source while at the same time allowing the free passage of light rays from the scene. In this case, the front transparent conductor layer 17 is formed on a rear face of the front substrate 16. Note that the references here to "front" and "rear" are only to make it easier to describe the structure of the aperture 14 and are not intended to be otherwise limiting. For example, in one embodiment, the incident light enters that stack up through the front substrate 16 that is at the bottom of the stack shown in FIG. 56; the aperture 14 may also work where the incident light from the scene enters the aperture in the reverse direction, e.g. through a rear substrate.

Still referring to FIG. 56, in this embodiment, the active EC layer is tapered at its edge as shown, forming a gradual ring rather than having an abrupt or step-like edge. The ring-shape is apparent as viewed from above (not shown). In other words, while the EC layer spreads substantially perpendicular to an optical axis of the camera module 10 (see FIG. 55) it does not have uniform thickness and instead has a tapered thickness that drops to essentially zero within an empty inner region of the EC layer as shown in FIG. 56. In this case, this empty inner region is substantially aligned with or centered with the optical axis. The downward tapering of the EC layer makes way for the material of the ion conduction layer to fill that gap, resulting in a substantially frusto-conical shape for the ion conduction layer as seen in FIG. 56. The tapered active EC layer thus presents a minimum pupil width for the aperture 14, being in this case coextensive with the bottom of the tapered active EC layer.

In operation, the aperture 14 presents effectively a wide pupil so long as there is insufficient current through the outer region of the EC medium, which can be achieved when essentially zero voltage is being applied by the driver circuit to the front and rear transparent conductors. When the driver increases the voltage, ions are forced to travel from the electrolyte medium through the tapered active EC layer, which darkens that outer region of the EC layer. Here it should be noted that the darkness of the EC layer depends on the thickness at that point, in addition to the strength of the current at that point. Thus, the darkness change in the tapered EC layer is gradual in that the darkness increases as one moves outward, away from the center optical axis, for a given fixed voltage. The shape of the taper at the edge of the EC layer may be tuned in order to tune the diffraction qualities of the optical system. This may help create a sharper image on the imaging sensor 13 (see FIG. 55) than an E-O aperture that has an abrupt edge within the active EC layer. For example, tuning the edge of the EC layer may help reduce color aliasing artifacts by reducing spatial frequency response at very high frequencies, and increasing low spatial frequency response (sharpness).

Although not shown in the drawings, a top view of the aperture 14 reveals that the inner region which may be centrally aligned with the optical axis may be formed into any suitable shape, although it is expected that a circular shape may produce improved results in that it matches the naturally circular shape of a lens component of the focusing lens 11. Also, while there are several references here to a "ring" or "ring-like" shape, this does not mean that the external boundary of that shape is necessarily also circular, but rather that the shape is merely annular in that there is an essentially empty inner region surrounded by a non-empty outer region.

The overall process of activation and deactivation of the EC layer is reversible, so that the outer region of the active EC layer can transition from a substantially clear (transparent) state into a colored or dark state (in response to sufficient current being produced through it) and back (when the activation voltage is removed).

In one embodiment, in its clear state (e.g., at zero drive voltage), the aperture 14 has at least 95 percent transmission of light in a visible band of interest (for consumer electronics digital photography); when the effective pupil diameter is then decreased by three "aperture stop" steps (where each step reduces the diameter by a factor of square root of 2, or about 1.414, hence a halving of the effective area of the pupil), the aperture 14 should still exhibit at least 75 percent light transmission.

Figure 60:
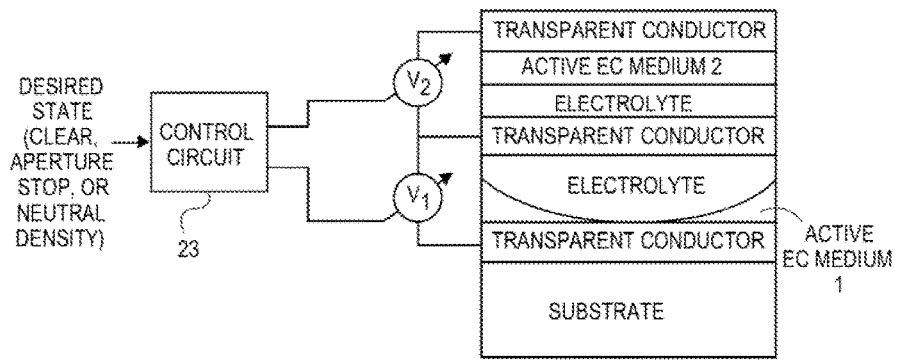
FIG. 60 is a cutaway view of a camera E-O aperture structure that can have at least three states, including a neutral density filter state.

In one embodiment, referring now to FIG. 60, a stack-up according to FIG. 56 having active EC medium 1 is combined with another stack-up having EC medium 2. This enables the structure as a whole (shown in FIG. 60) to be controlled or switched into three states, namely a clear state, a dark aperture stop (or stopped down) state, and a neutral density state in which the aperture as a whole exhibits substantially homogeneous reduction in intensity of light from the scene (across all visible colors or wavelengths of interest). A control circuit 23 translates the input request into suitable driver voltage settings of variable voltage sources V1 and V2 which in turn cause the active EC media 1, 2, respectively, to exhibit the proper opacity.

Figure 57:
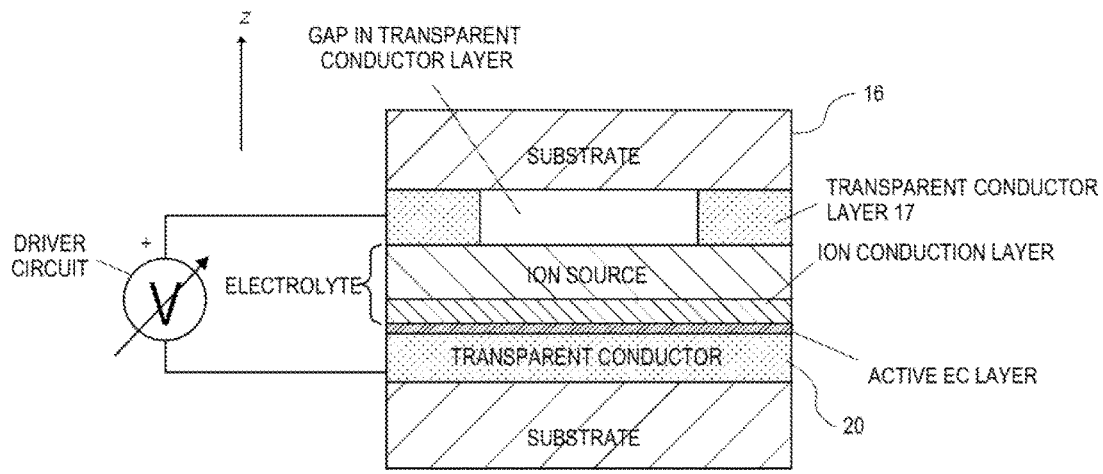
FIG. 57 is a cutaway view of an E-O variable aperture in accordance with another embodiment.

Turning now to FIG. 57, a cut away view of another embodiment of the invention is shown, where in this case the aperture stack is formed such that its front transparent conductor medium or layer 17 is a patterned layer. In particular, as shown in FIG. 57, the front transparent conductor layer 17 has a gap or hole formed in it (e.g., through chemical or mechanical etching) that is substantially aligned with or centered with the optical axis. This gap results in insufficient current being generated through the portion of the active EC layer that lies directly under the gap, to activate that portion of the EC medium. In other words, a ring-like current is generated through the active EC layer (when the activation voltage is applied by the driver circuit). This ensures that the inner region of the aperture stack remains essentially clear, forming a minimum effective pupil width, substantially coextensive with the gap in the transparent conductor layer 17, at a high activation voltage, and yields a progressively larger pupil width as the activation voltage is reduced. In this embodiment, the EC medium consists of an active EC layer that is substantially perpendicular to the optical axis but that also has essentially uniform thickness as shown. The voltage applied by the driver circuit may be modulated or changed continuously from a low or minimum level such as zero volts, which yields a low opacity in the outer region of the EC layer, to a high voltage that yields a high opacity in the outer region of the EC layer.

Figure 58:
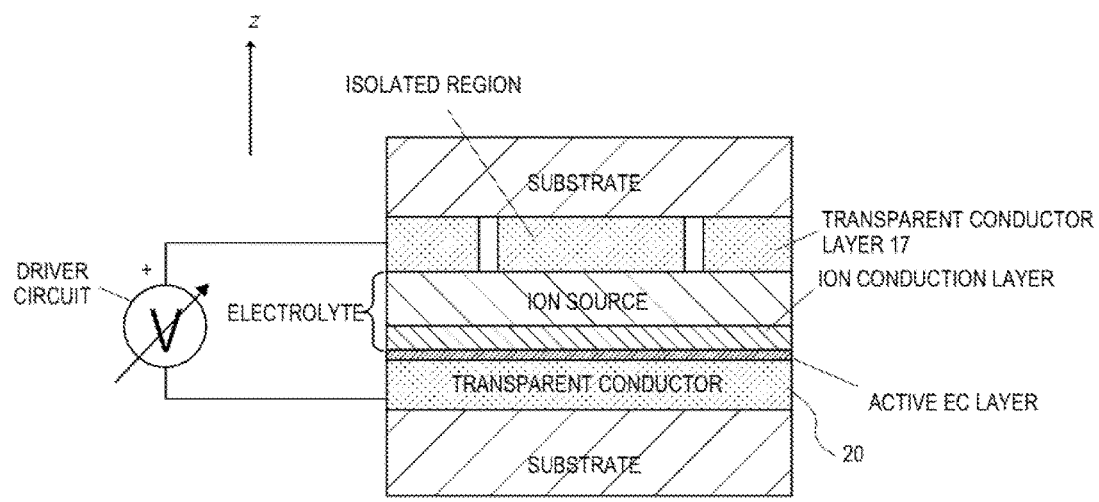
FIG. 58 is a cutaway view of yet another embodiment.

Referring now to FIG. 58, this cut away view illustrates an embodiment where the front transparent conductor layer medium 17 of the aperture stack contains an inner transparent conductor plug region, also referred to as an isolated region, i.e. electrically isolated from an outer region of the front transparent conductor medium 17. This isolated region may be essentially centered or aligned with the optical axis. It may remain electrically floating or it may alternatively be tied to a different voltage than the outer region of the front transparent conductor medium 17, while the latter is being driven to an activation voltage by the driver circuit. This mechanism again produces a ring-like current through an outer region of the active EC layer, thereby maintaining very low opacity in the inner region of the active EC layer. Thus, similar to the embodiments described above, at a high drive voltage, the outer region of the active EC layer (which is subjected to the ring-like current) reaches high opacity, while its inner region is subjected to essentially no or very low current and thus remains at low opacity.

It should be noted that a further advantage of the embodiment of FIG. 58 over that of FIG. 57 may be that the difference in optical property between the inner region of the optical path through the aperture 14 (centered or aligned with the optical axis), and the outer region of the optical path (which is subjected to greater opacity by the active EC layer) is reduced, when the drive voltage is minimum and the pupil size is at its widest. In other words, light rays from the scene that pass through the inner region of the aperture 14 will be subjected to essentially the same optical characteristics as the light rays that travel through the outer region (assuming that the effect of the physical gap shown between the isolated region and the outer region of the front transparent conductor layer 17 in FIG. 58 can be ignored). This might not be the case with the embodiment of FIG. 56 (because of the tapered active EC layer) and with the embodiment of FIG. 57 (because of the substantial gap in the transparent conductor layer 17).

Figure 59:
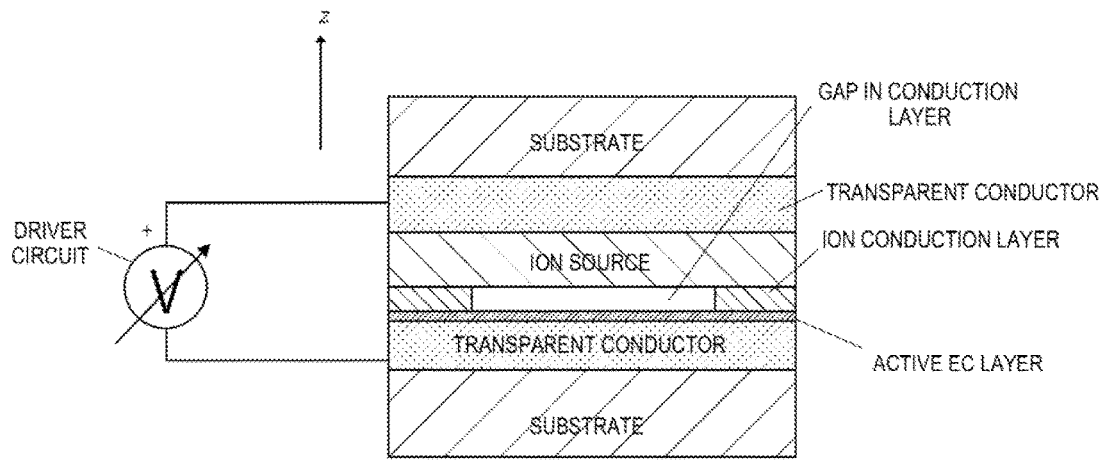
FIG. 59 is a cutaway view of a further embodiment of the E-O variable aperture.

Turning now to FIG. 59, in yet another embodiment of the aperture stack, the ion conduction medium or layer becomes a patterned layer as shown, by forming a gap or hole in what may be an otherwise uniformly thick ion conduction layer. The hole may be substantially aligned or centered with the optical axis as shown. This means that when the activation voltage is applied by the driver circuit, not enough ions from the ion source layer will be traveling through the (empty) inner region of the ion conduction layer, and thus should not impact the inner region of the active EC layer that lies directly underneath the hole. Thus, there should be no substantial darkening of the inner region of the active EC layer. Once again, a minimum effective pupil width is achieved in this case, using a different mechanism than those described in FIGS. 30-32. Once again, a ring-like current is generated through the EC layer (when the activation voltage is applied by the driver circuit) in order to reduce the width of the aperture. The minimum width or area of the aperture may correspond to essentially the size of the hole in the ion conduction layer.

Figure 61:
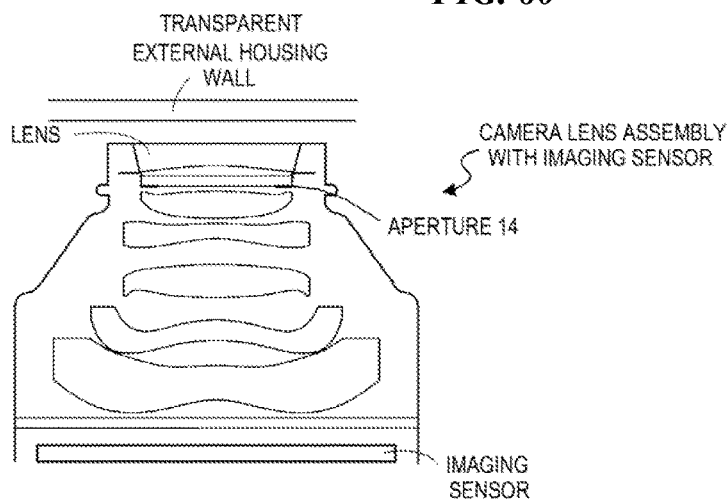
FIG. 61 shows an optical system of a camera module integrated in a consumer electronics device, in which the E-O aperture may be placed.

FIG. 61 shows an optical system of a camera module integrated in a consumer electronics device, in which the E-O aperture may be placed. The lens assembly includes a lens and an image sensor. The object side of the lens may be adjacent a transparent external housing wall for the consumer electronics device such that the optical axis of the lens extends through the transparent external housing wall. The E-O aperture 14 is included in the first lens component on the object side of the lens. The lens component that includes the E-O aperture 14 is the lens component nearest the transparent external housing wall.

Figure 62:
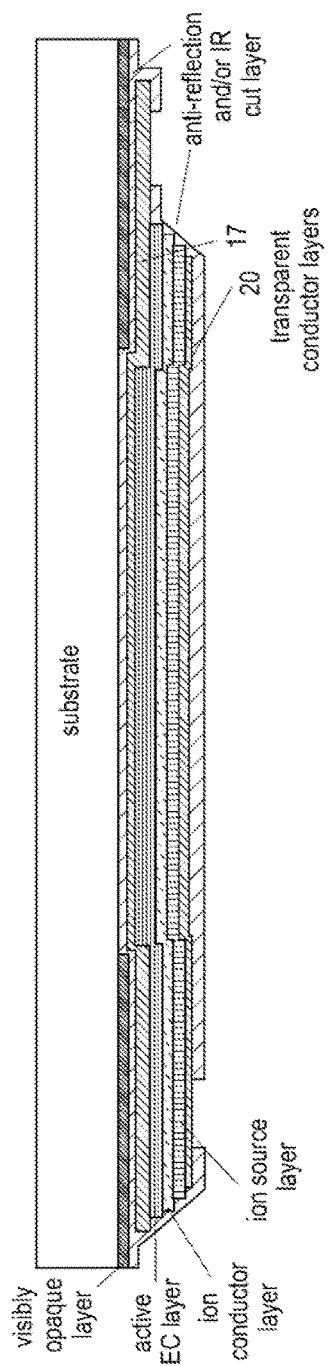
FIG. 62 is a cut-away view of an electro-optic aperture.

Turning now to FIG. 62, a section view of an electro-optic aperture is shown in accordance with another embodiment of the invention. A stack of the aperture here is similar to the embodiment of FIG. 56 in that there is a substrate on which a transparent conductor medium or layer 17 has been formed. As suggested above, the substrate may be made of any suitable material such as sapphire or glass or other sufficiently transparent material on which the stack of the electro-optic aperture and a refractive element may be formed. In contact with the transparent conductor medium 17 is an active EC layer, an opposite surface of which is in contact with an ion conduction layer. The latter is in contact with an ion source layer. This entire sandwich is bounded by the front and rear transparent conductor layers 17, 20. In the embodiment of FIG. 62, there is also a front anti-reflection and/or infrared (IR) cut layer that has been formed between the front transparent conductor layer 17 and the substrate. In addition, the imaging path through the aperture has been defined, in this case, by the addition of a visibly opaque layer having an inner opening. The visibly opaque layer in this example has been applied directly to the substrate, and is formed between the substrate and the adjacent anti-reflection and/or IR cut layer. Note also that openings are formed in the front anti-reflection and/or IR cut layer and a rear anti-reflection layer, so as to allow electrical contacts (not shown) to directly connect with the front and rear transparent conductor layers 17, 20, in order to apply the electro-optic aperture's activation voltage. In this case, the front and rear anti-reflection and/or IR cut layers entirely envelop or cover the aperture stack, except for the regions needed to make electrical contact (as shown).

Figure 63:
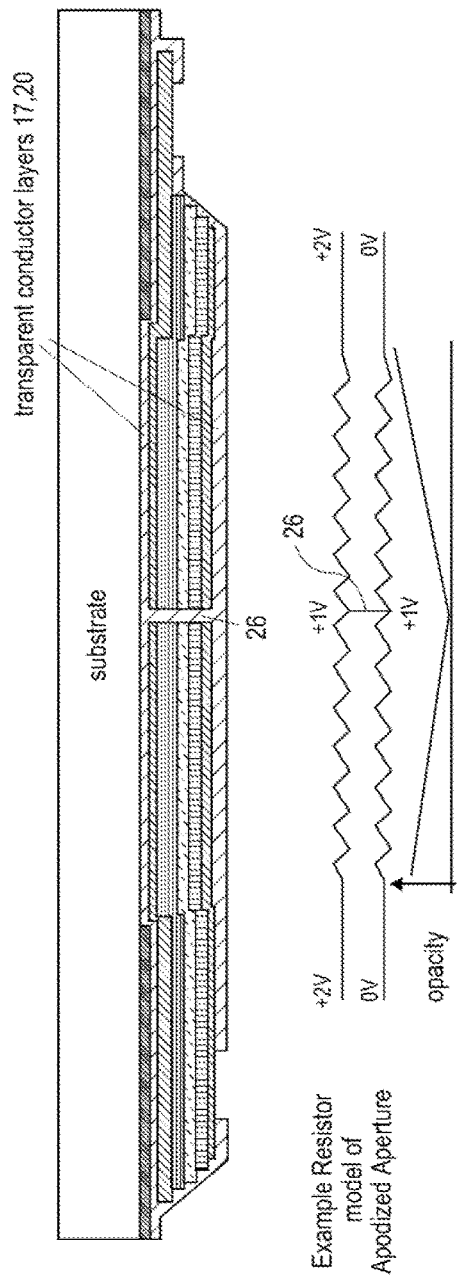
FIG. 63 is a cut-away view of an embodiment of the invention in which a conductive section has been added to directly connect the transparent conductor layers, within the imaging path.

Turning now to FIG. 63, another embodiment of the invention is shown in which the stack of FIG. 62 has been modified by the addition of a conductive section 26. This is described in FIG. 63 as being a small electrical short that is located approximately at the center of the imaging path, directly connecting the two transparent conductor layers 17, 20. In one embodiment, this conductive section or short 26 is relatively small, for example, on the order of about 10 micrometers thick or wide. The conductive section may be formed somewhat similar to how a via is formed in a microelectronic manufacturing process between different metal layers of an integrated circuit. Note that the conductive section 26 may be made of the same material as the front and rear transparent conductor mediums 17, 20.

FIG. 63 also shows an example resistor circuit model of such an "apodized" aperture, in which an activation voltage of in this case 2 Volts is being applied to the two transparent conductor layers 17, 20. The conductive section 26 by virtue of being located at the center of the imaging path will have the midpoint voltage of about +1 Volt. Note, however, that the potential across the active EC medium will vary from essentially zero volts at the center (due to the presence of the conductive section 26) and progressively greater towards the periphery of the imaging path, here up to 2 Volts at the periphery. This means that the EC medium is least opaque at the center, and progressively more opaque moving outward to the periphery. It can also be seen that if the conductive section 26 is made thicker or larger, the smallest or minimum pupil size of the aperture may also be larger, because the region of the EC layer across which there is zero voltage is larger.

Although FIG. 63 shows the conductive section 26 as being oriented at about 90° relative to the front and rear transparent conductor layers 17, 20, and is located closer to a center rather than a periphery of a cross-section of the imaging path, an alternative may be to locate and orient or shape the conductive section 26 differently. In addition, there may be more than one such discrete conductive section or short that directly connects the transparent conductor layers 17, 20.

Figure 64:
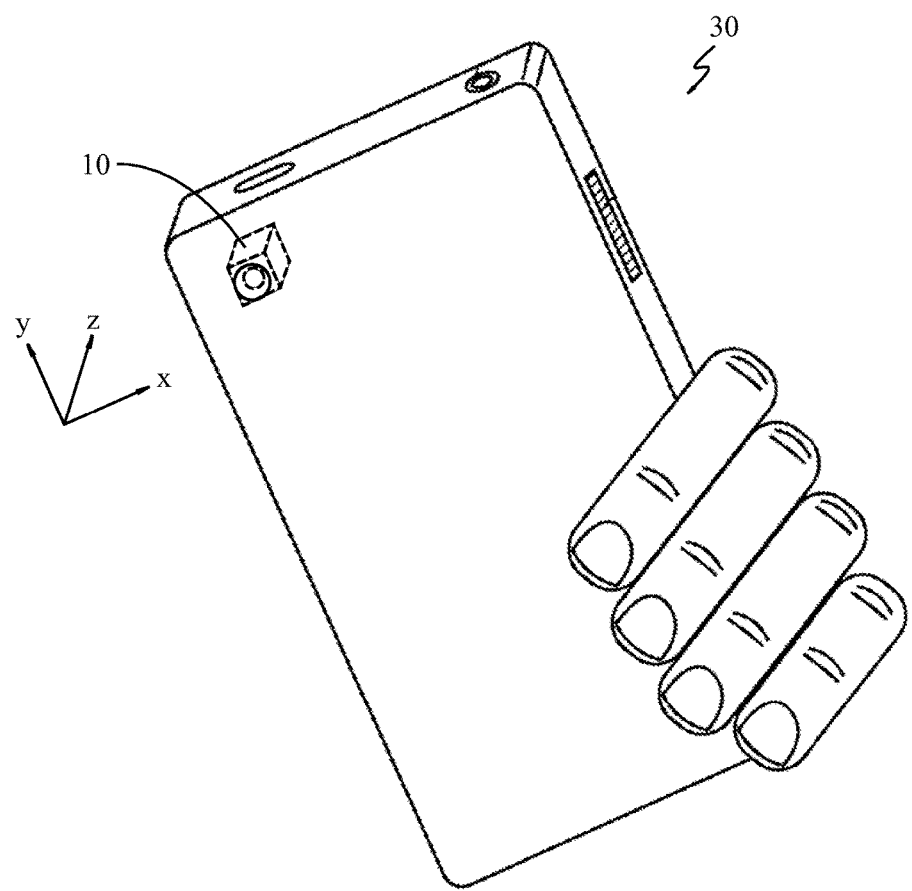
FIG. 64 is a perspective view of a portable wireless communications device in which a camera module is integrated.

Referring now to FIG. 64, a perspective view of a portable wireless communications device 30 in which a camera module 10 using a lens system in accordance with an embodiment of the invention is integrated. The device in this case may be a smart phone or a tablet computer, which is a handheld device in the sense of being intended for use while held in a single hand of the user. Of course, the camera module 10 may alternatively be integrated in other types of portable wireless devices, such as laptop or notebook computers, and it may also be integrated within non-portable devices such as desktop personal computers, television monitors, or any other electronic device that has a particularly short profile in the Z-axis (Z-height). In the case of the smart phone or tablet computer, the device has an outer housing in which is integrated a cellular network wireless communications circuit that enables the device to function as a mobile telephony terminal or end station. The portable wireless communications device may have an outer housing whose Z-height is in the range of 8 mm-13 mm, thereby being particularly fitting to receive therein a camera module that has a Z-height within the range of 6 mm-9 mm. The lens systems described herein are suitable for creating compact lens systems having a low F-number and a wide field of view that may be used in such camera modules.

FIG. 1 is a cross-sectional illustration of an example embodiment of a compact lens system 110 having a first lens component $L_1$ 101 that is a single lens element. An aperture stop AS 114 is located on the object side of the first lens component $L_1$ 101. The lens system 110 includes six lens components 101-106 with refractive power. The parts of the lens system 110 are arranged along an optical axis AX of the lens system from the first object side lens component $L_1$ 101 to the sixth image side lens component $L_6$ 106 (from left to right in the drawing). The lens system 110 forms an image at the surface of a photosensor 118. In some embodiments, an infrared (IR) filter 116 may be located between the sixth lens component $L_6$ 106 and the photosensor 118.

The fourth lens component $L_4$ 104 of the lens system 110 has positive refractive power, positive focal length $f_4$, and a concave object side surface. In addition, lens component $L_4$ of lens system 110 is positive meniscus in shape and has negative vertex radii of curvature $R_7$ and $R_8$, where $R_7$ is the radius of the object side surface and $R_8$ is the radius of the image side surface, the values for both radii being at the optical axis 112. Further, $R_8 > R_7 - D_7$, where $D_7$ is the thickness of the lens at the optical axis 112.

Figure 2:
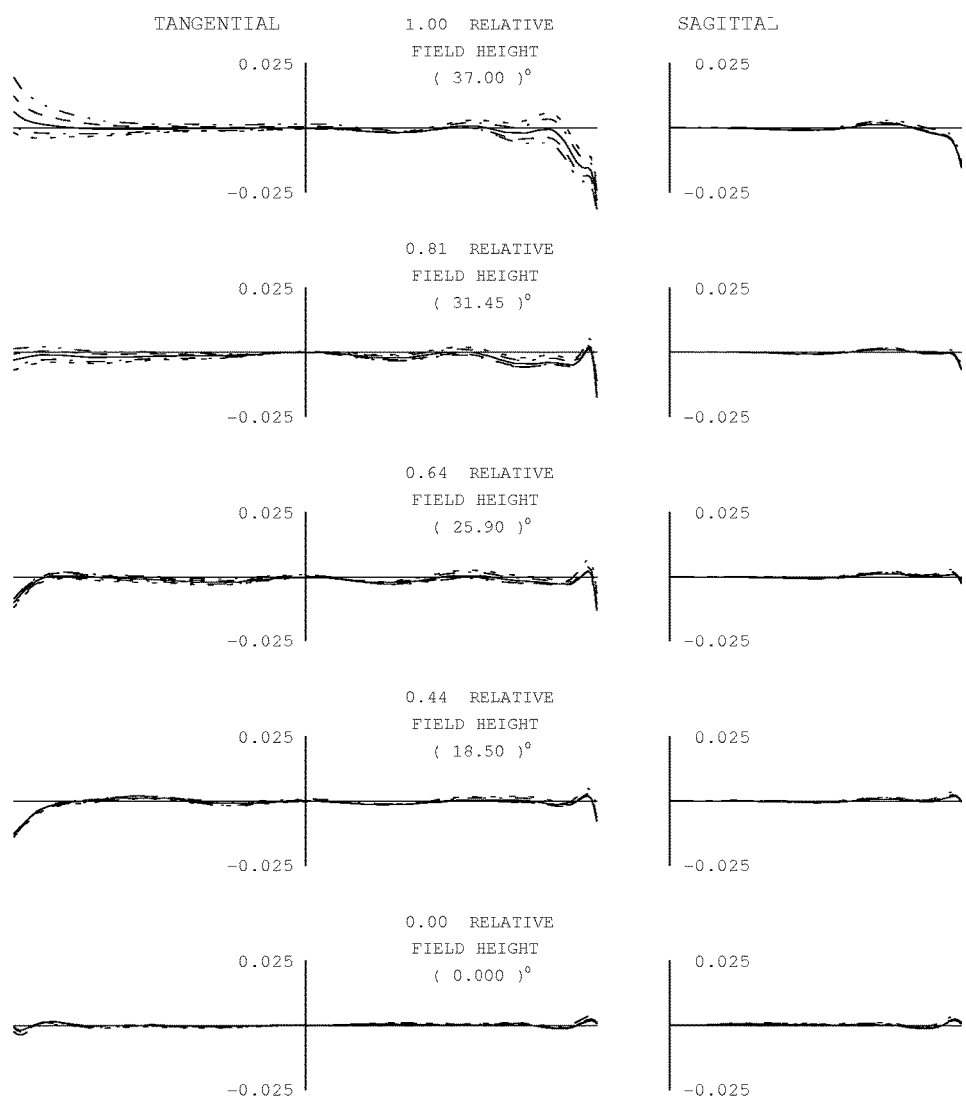
FIG. 2 shows the polychromatic ray aberration curves over the half field of view and over the visible spectral band ranging 470 nm to 650 nm for the lens system illustrated in FIG. 1.

FIG. 2 shows the polychromatic ray aberration curves over the half field of view (HFOV=37.0 degrees) over the visible spectral band ranging from 470 nm to 650 nm for a lens system 110 as illustrated in FIG. 1 and described in Tables 1A and 1B.

Figure 3:
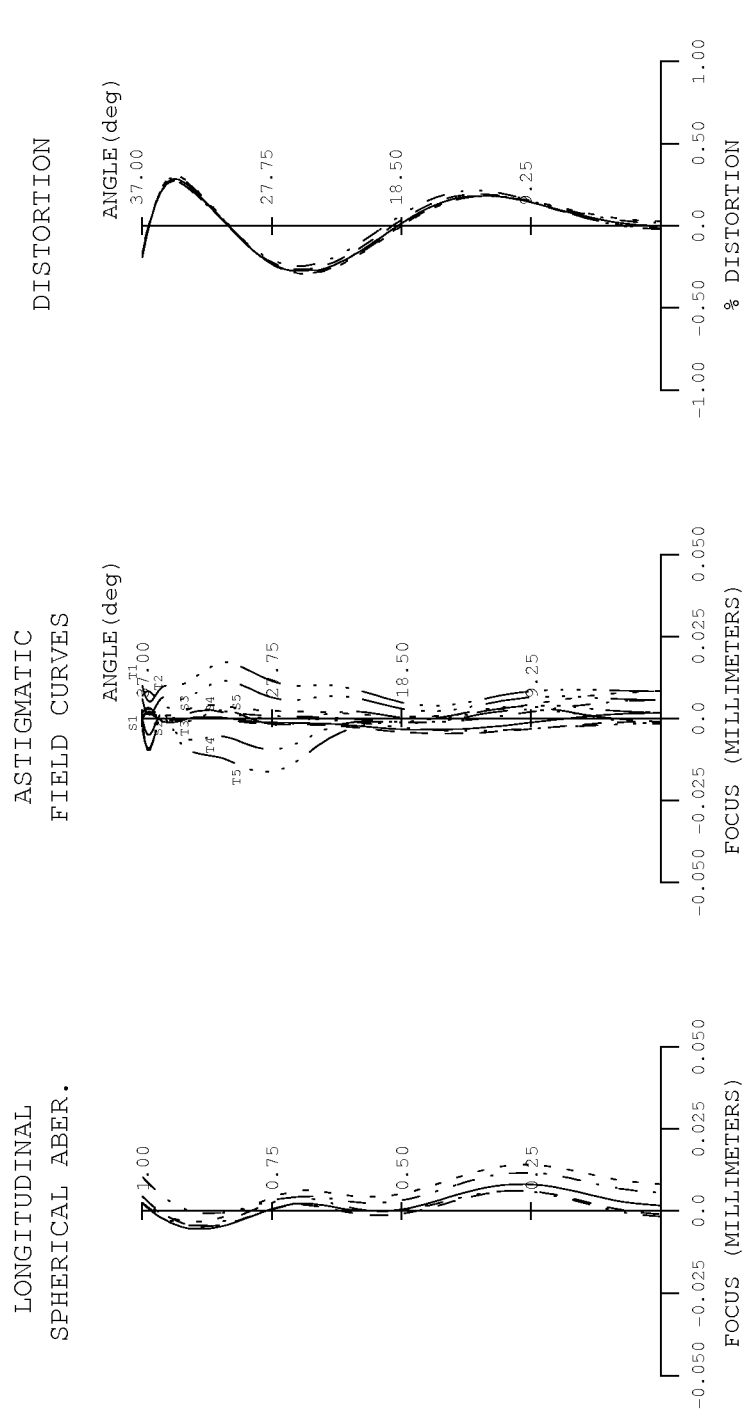
FIG. 3 shows the polychromatic curves of spherical aberration, astigmatism, and distortion over the visible band ranging 470 nm to 650 nm for the lens system illustrated in FIG. 1.

FIG. 3 shows the polychromatic curves for the chromatic variations of spherical aberration, astigmatic field curves, and distortion for the lens system 110 as illustrated in FIG. 1 and described in Tables 1A and 1B.

Figure 4:
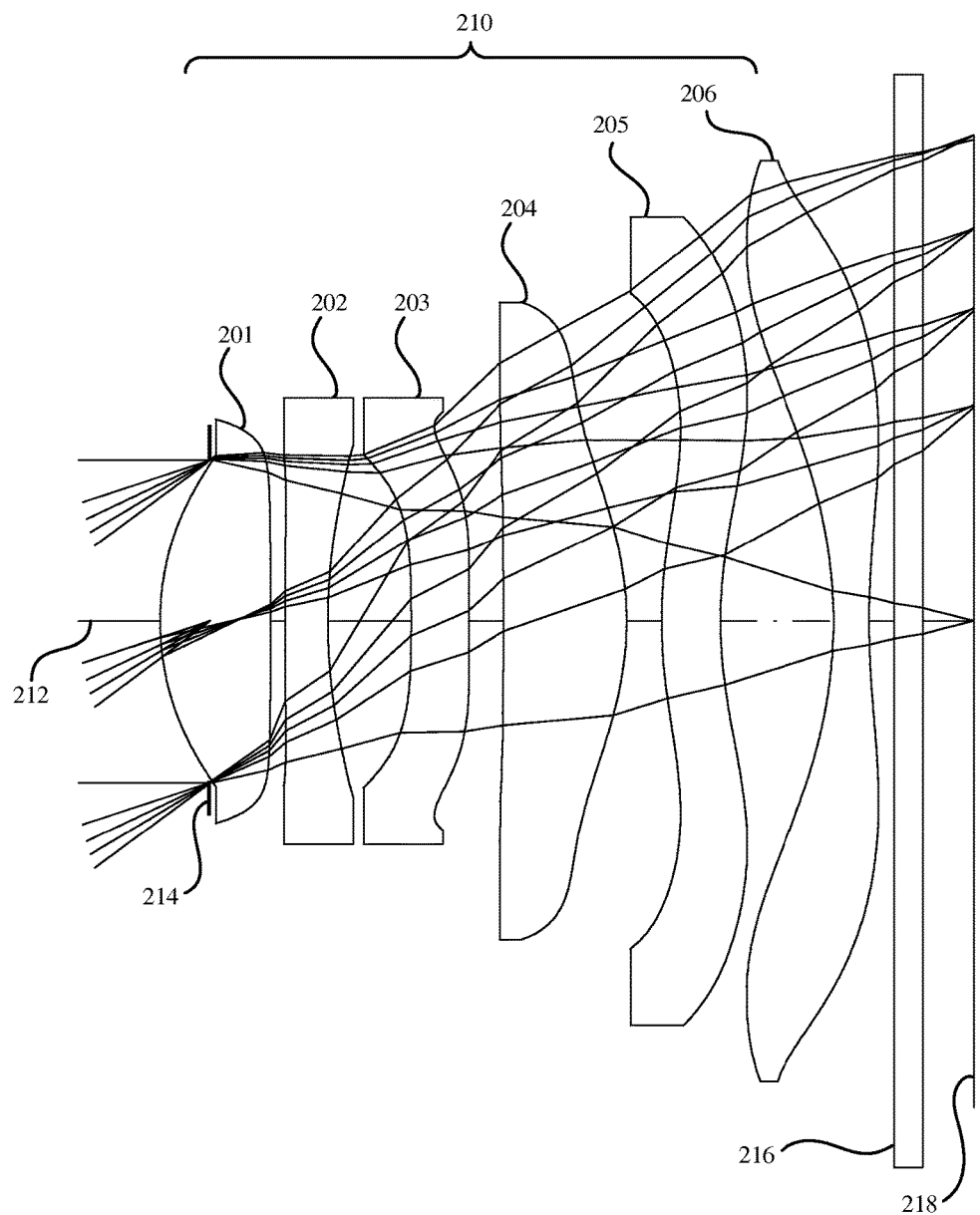
FIG. 4 is a cross-sectional illustration of another example embodiment of a lens system that includes six refractive lens elements.

FIG. 4 is a cross-sectional illustration of another example embodiment of a compact lens system 210 having a first lens component $L_1$ 201 with positive refractive power. An aperture stop AS 214 is located on the object side of the first lens component $L_1$ 201. The lens system 210 includes six lens components 201-206 with refractive power. The parts of the lens system 210 are arranged along an optical axis AX of the lens system from the first object side lens component $L_1$ 201 to the sixth image side lens component $L_6$ 206 (from left to right in the drawing). The lens system 210 forms an image at the surface of a photosensor 218. In some embodiments, an infrared (IR) filter 216 may be located between the sixth lens component $L_6$ 205 and the photosensor 218.

The six lens components $L_1$, $L_2$, $L_3$, $L_4$, $L_5$, $L_6$ 201-206 of the lens system 210 may be composed of plastic materials with refractive indices and Abbe numbers as listed in Table 2A.

The fourth lens component $L_4$ 204 of the lens system 210 has positive refractive power, positive focal length $f_4$, and a concave object side surface. In addition, lens component $L_4$ of lens system 210 is positive meniscus in shape and has negative vertex radii of curvature $R_7$ and $R_8$, where $R_7$ is the radius of the object side surface and $R_8$ where is the radius of the image side surface, the values for both radii being at the optical axis 212. Further, $R_8 > R_7 - D_7$, where $D_7$ is the thickness of the lens at the optical axis 212.

Figure 5:
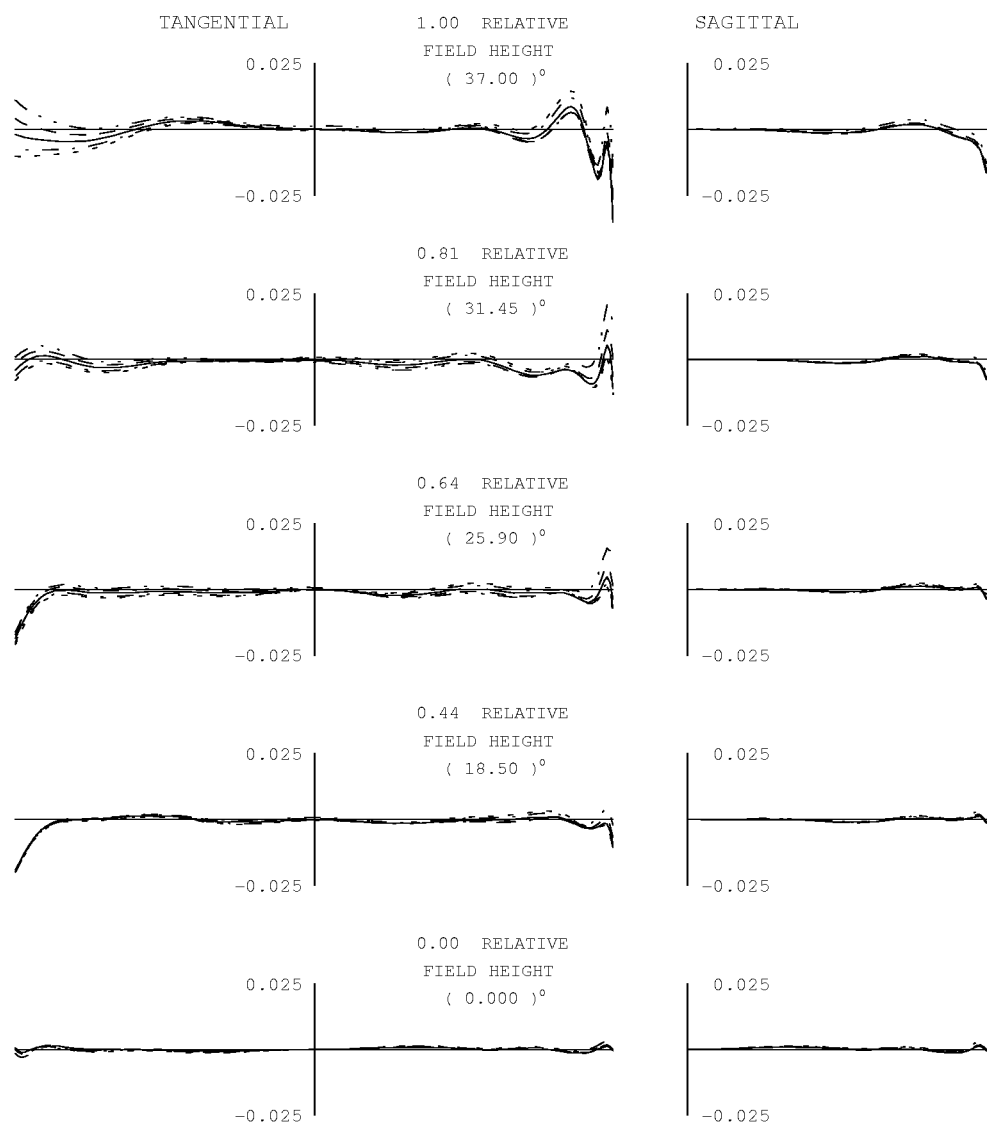
FIG. 5 shows the polychromatic ray aberration curves over the half field of view and over the visible spectral band ranging 470 nm to 650 nm for the lens system illustrated in FIG. 4.

FIG. 5 shows the polychromatic ray aberration curves over the half field of view (HFOV=37.0 degrees) over the visible spectral band ranging from 470 nm to 650 nm for a lens system 210 as illustrated in FIG. 4 and described in Tables 2A and 2B.

Figure 6:
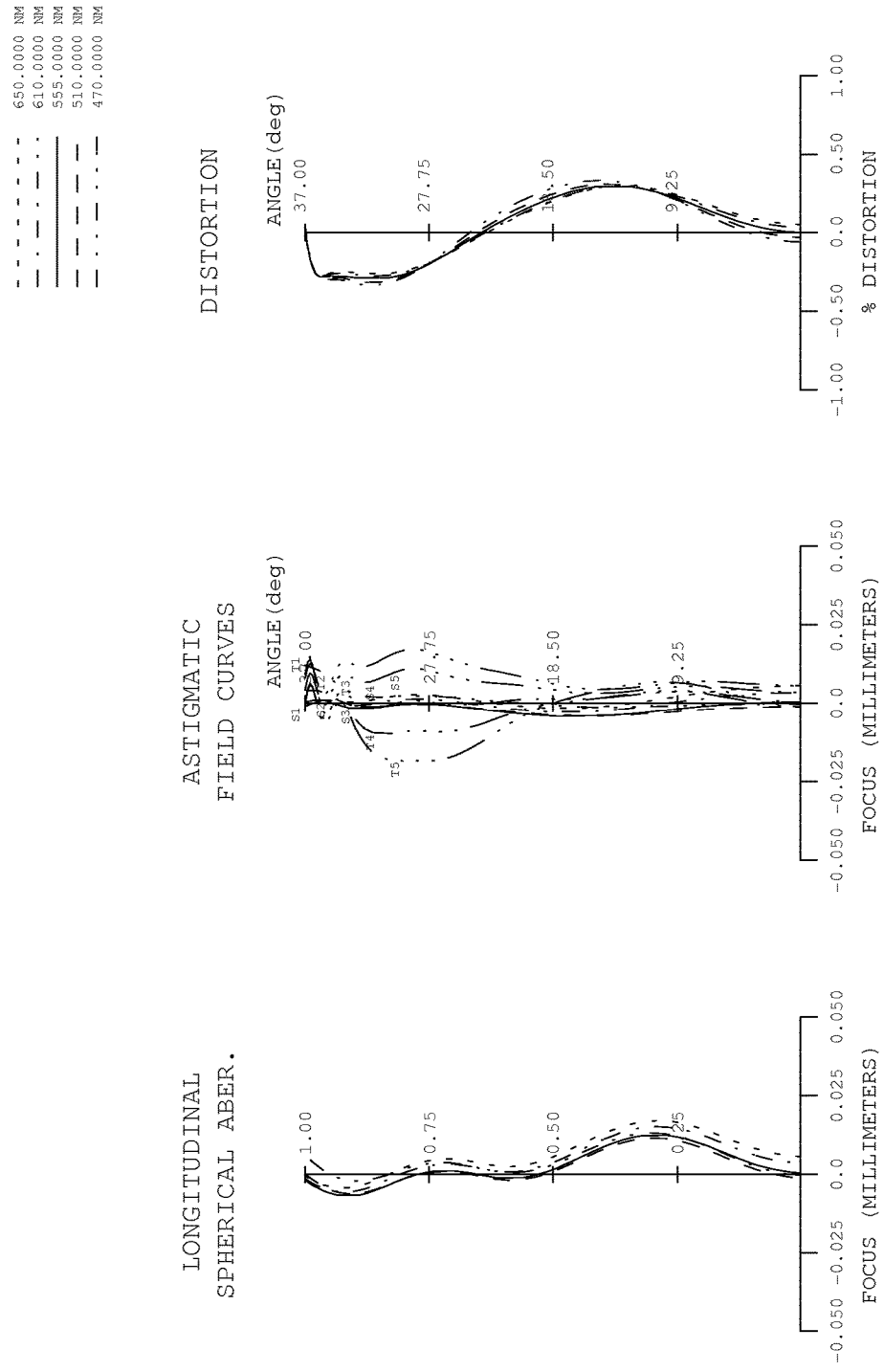
FIG. 6 shows the polychromatic curves of spherical aberration, astigmatism, and distortion over the visible band ranging 470 nm to 650 nm for the lens system illustrated in FIG. 4.

FIG. 6 shows the polychromatic curves for the chromatic variations of spherical aberration, astigmatic field curves, and distortion for the lens system 210 as illustrated in FIG. 4 and described in Tables 2A and 2B.

FIG. 7 is a cross-sectional illustration of another example embodiment of a compact lens system 310 having a first lens component $L_1$ 301 with positive refractive power having a convex object-side surface. An aperture stop AS 314 is applied to the object side of the first lens component $L_1$. The lens system 310 includes six lens components 301-306 with refractive power. The parts of the lens system 310 are arranged along an optical axis AX of the lens system from the first object side lens component $L_1$ 301 to the sixth image side lens component $L_6$ 306 (from left to right in the drawing). The lens system 310 forms an image at the surface of a photosensor 318. In some embodiments, an infrared (IR) filter 316 may be located between the sixth lens component $L_6$ 306 and the photosensor 318.

The aperture stop 314 may be a fixed aperture stop in the form of an opening, such as a circular opening, centered on the optical axis. The system may be configured to include an electrochromic aperture mechanism to provide an aperture stop in the form of an electrochromic lens component having variable light transmittance in response to an applied electrical voltage. The electrochromic aperture component may provide a central transparent opening that can be adjusted by an applied voltage that provides a variable intensity profile distribution across the aperture opening for the light energy transmitted through the optical system.

The fourth lens component $L_4$ 304 of the lens system 310 has positive refractive power, positive focal length $f_4$, and a concave object side surface. In addition, lens component $L_4$ of lens system 310 is biconvex in shape and has positive vertex radius of curvature $R_7$, and negative vertex radius $R_8$, where $R_7$ is the radius of the object side surface and where $R_8$ is the radius of the image side surface, the values for both radii being at the optical axis 312. Further, $R_8 < R_7 - D_7$, where $D_7$ is the thickness of the lens at the optical axis 312.

Figure 8:
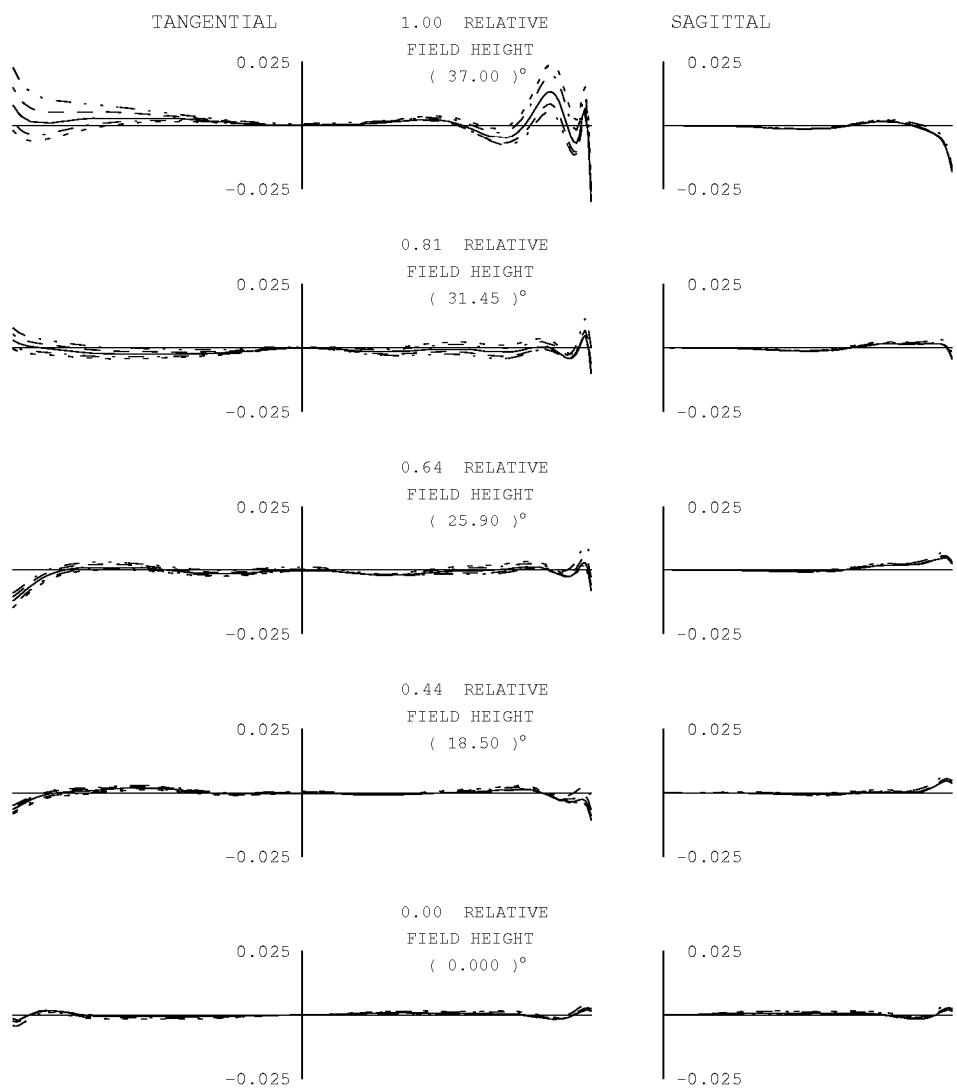
FIG. 8 shows the polychromatic ray aberration curves over the half field of view and over the visible spectral band ranging 470 nm to 650 nm for the lens system illustrated in FIG. 7.

FIG. 8 shows the polychromatic ray aberration curves over the half field of view (HFOV=37.0 degrees) over the visible spectral band ranging from 470 nm to 650 nm for a lens system 310 as illustrated in FIG. 7 and described in Tables 3A and 3B.

Figure 9:
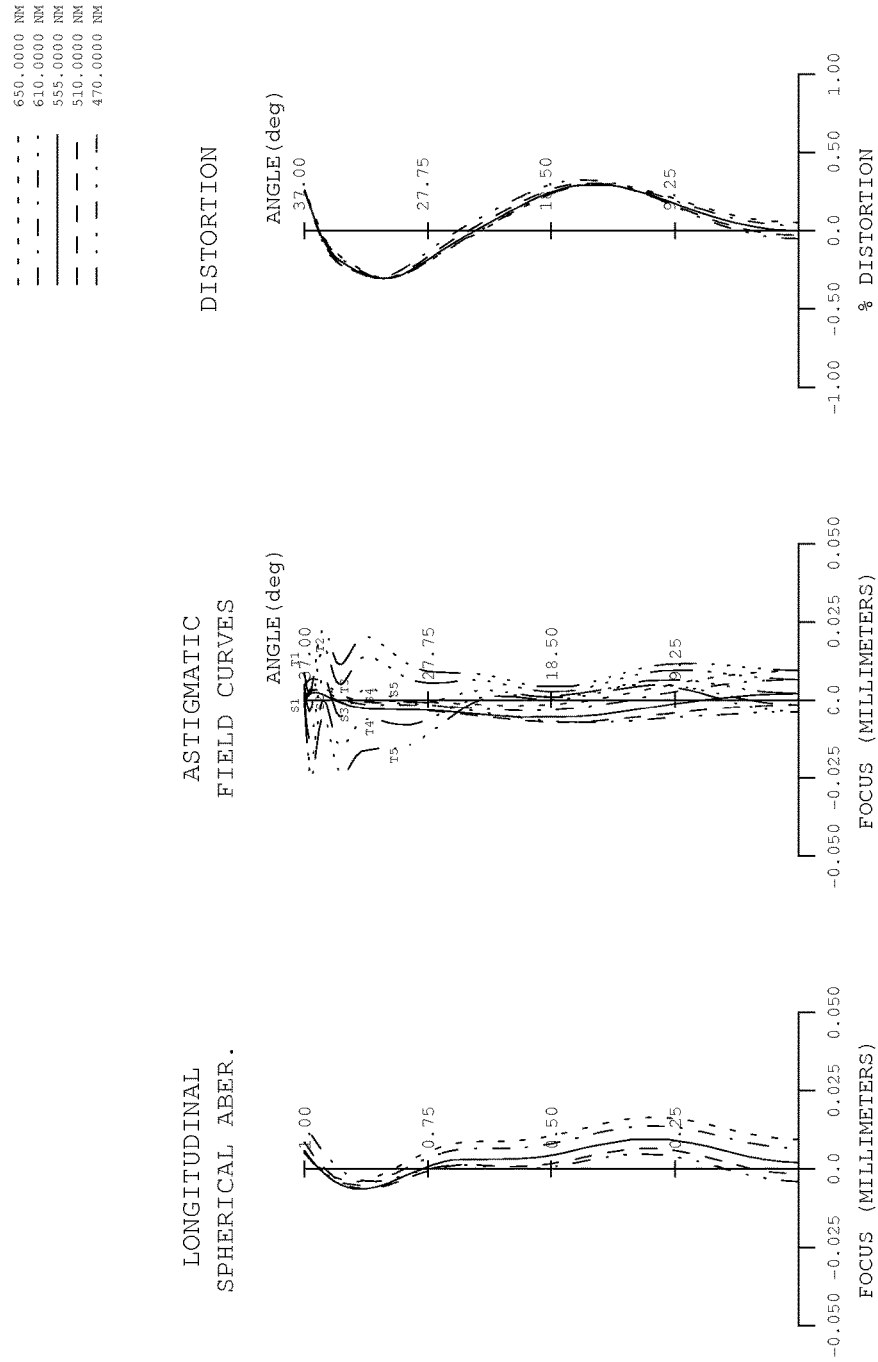
FIG. 9 shows the polychromatic curves of spherical aberration, astigmatism, and distortion over the visible band ranging 470 nm to 650 nm for the lens system illustrated in FIG. 7.

FIG. 9 shows the polychromatic curves for the chromatic variations of spherical aberration, astigmatic field curves, and distortion for the lens system 310 as illustrated in FIG. 7 and described in Tables 3A and 3B.

Figure 10:
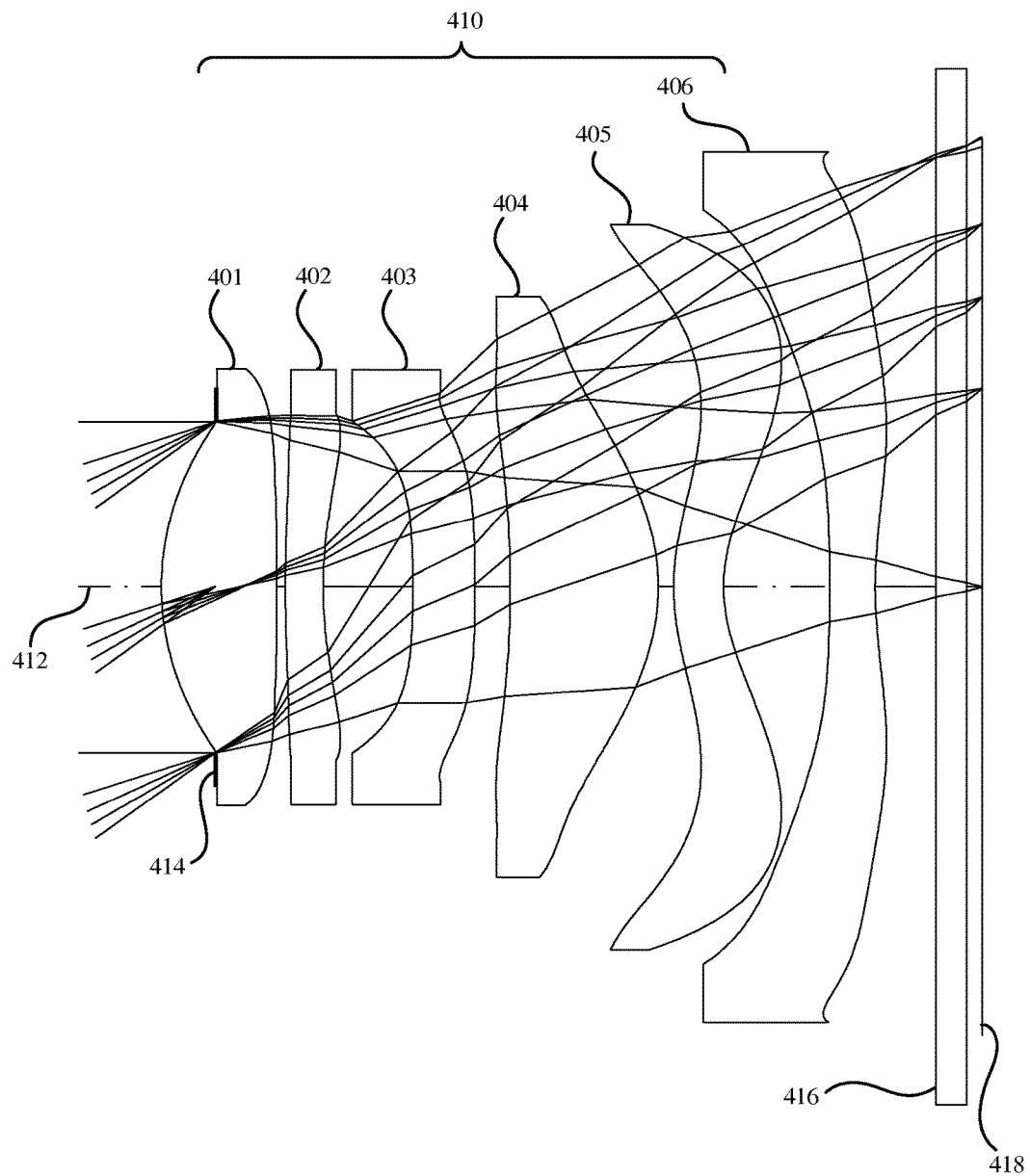
FIG. 10 is a cross-sectional illustration of another example embodiment of a lens system that includes six refractive lens elements.

FIG. 10 is a cross-sectional illustration of another example embodiment of a compact lens system 410 having a first lens component $L_1$ 401 with refractive power having a convex object-side surface. An aperture stop AS 414 is applied to the object side of the first lens component $L_1$. The lens system 410 includes six lens components 401-406 with refractive power. The parts of the lens system 410 are arranged along an optical axis AX of the lens system from the first object side lens component $L_1$ 401 to the sixth image side lens component $L_6$ 406 (from left to right in the drawing). The lens system 410 forms an image at the surface of a photosensor 418. In some embodiments, an infrared (IR) filter 416 may be located between the sixth lens component $L_6$ 406 and the photosensor 418.

The aperture stop 414 may be a fixed aperture stop in the form of an opening, such as a circular opening, centered on the optical axis. The system may be configured to include an electrochromic aperture mechanism to provide an aperture stop in the form of an electrochromic lens component having variable light transmittance in response to an applied electrical voltage. The electrochromic aperture component may provide a central transparent opening that can be adjusted by an applied voltage that provides a variable intensity profile distribution across the aperture opening for the light energy transmitted through the optical system.

The fourth lens component $L_4$ 404 of the lens system 410 has positive refractive power, positive focal length $f_4$, and a concave object side surface. In addition, lens component $L_4$ of lens system 410 is positive meniscus in shape and has negative vertex radii of curvature $R_7$ and $R_8$, where $R_7$ is the radius of the object side surface and where $R_8$ is the radius of the image side surface, the values for both radii being at the optical axis 412. Further, $R_8 > R_7 - D_7$, where $D_7$ is the thickness of the lens at the optical axis 412.

Figure 11:
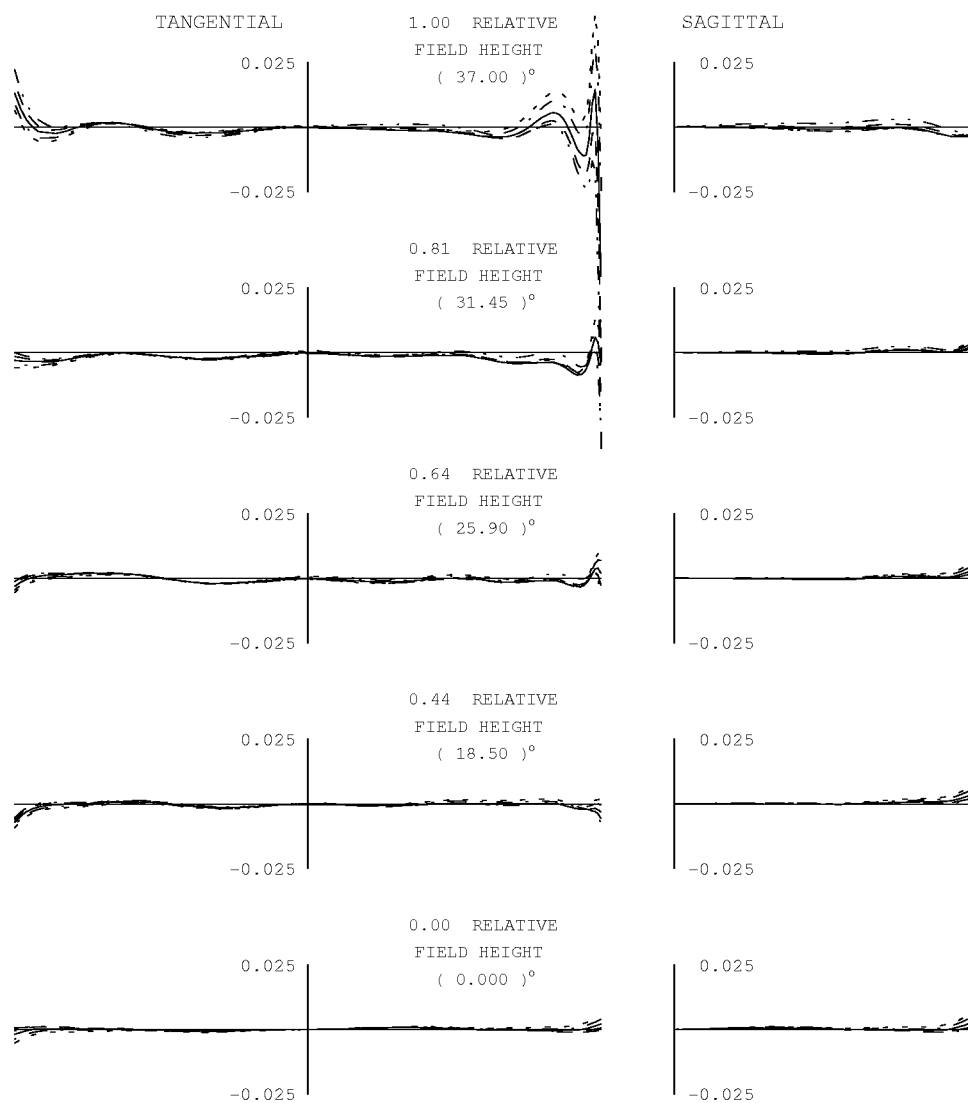
FIG. 11 shows the polychromatic ray aberration curves over the half field of view and over the visible spectral band ranging 470 nm to 650 nm for the lens system illustrated in FIG. 10.

FIG. 11 shows the polychromatic ray aberration curves over the half field of view (HFOV=37.0 degrees) over the visible spectral band ranging from 470 nm to 650 nm for a lens system 410 as illustrated in FIG. 10 and described in Tables 4A and 4B.

Figure 12:
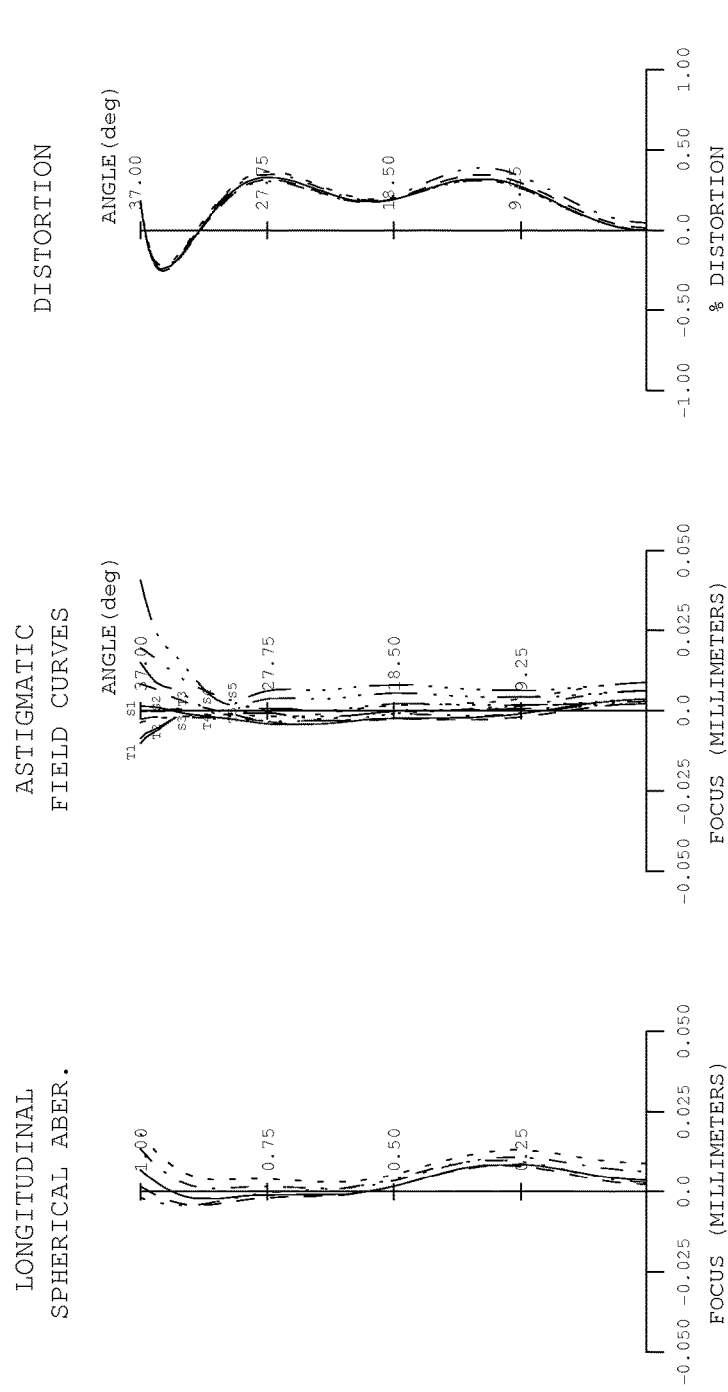
FIG. 12 shows the polychromatic curves of spherical aberration, astigmatism, and distortion over the visible band ranging 470 nm to 650 nm for the lens system illustrated in FIG. 10.

FIG. 12 shows the polychromatic curves for the chromatic variations of spherical aberration, astigmatic field curves, and distortion for the lens system 410 as illustrated in FIG. 10 and described in Tables 4A and 4B.

Figure 13:
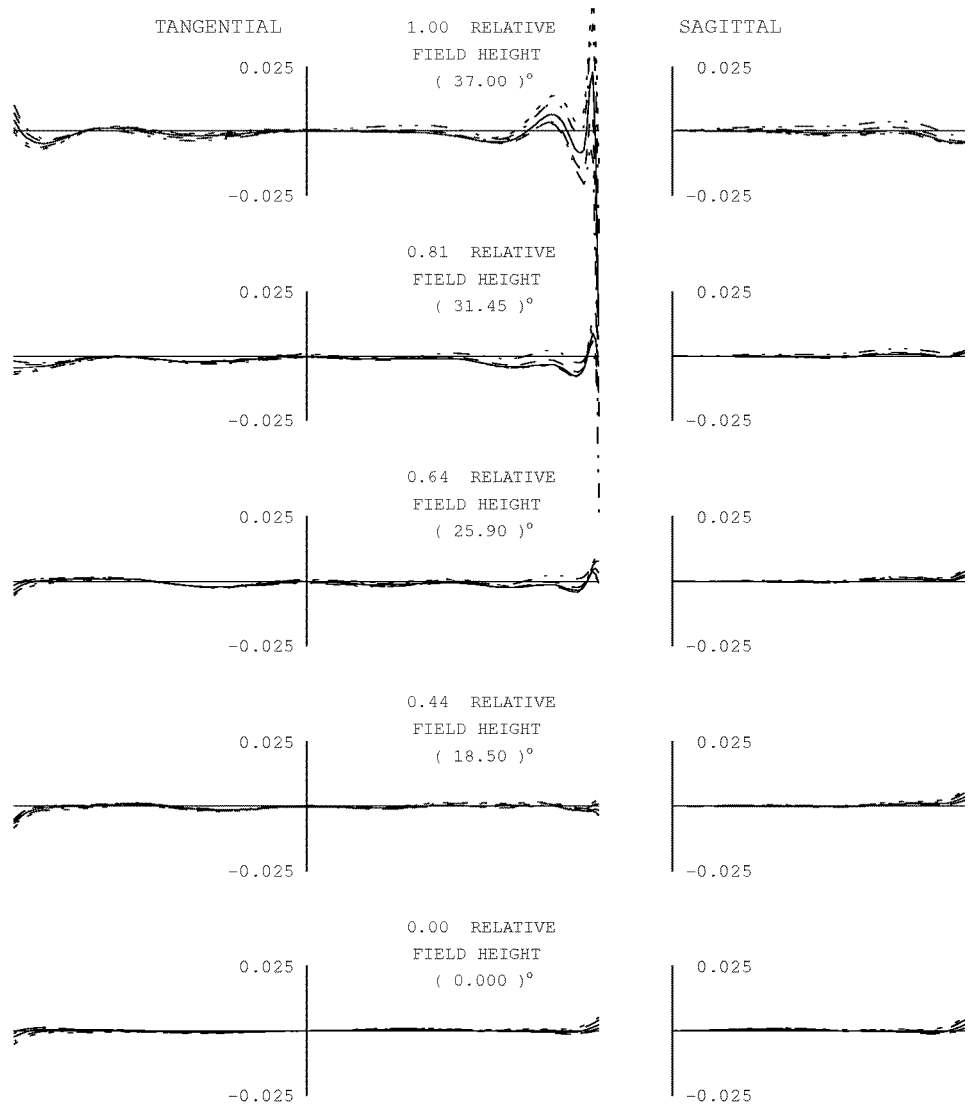
FIG. 13 shows the polychromatic ray aberration curves over the half field of view and over the visible spectral band ranging 470 nm to 650 nm for another example embodiment of a lens system with cross-sectional configuration similar to that lens system illustrated in FIG. 10.

FIG. 13 shows the polychromatic ray aberration curves over the half field of view (HFOV=37.0 degrees) over the visible spectral band ranging from 470 nm to 650 nm for another example embodiment with cross-sectional illustration similar to lens system 410 as illustrated in FIG. 10 and with optical prescription described in Tables 5A and 5B.

Figure 14:
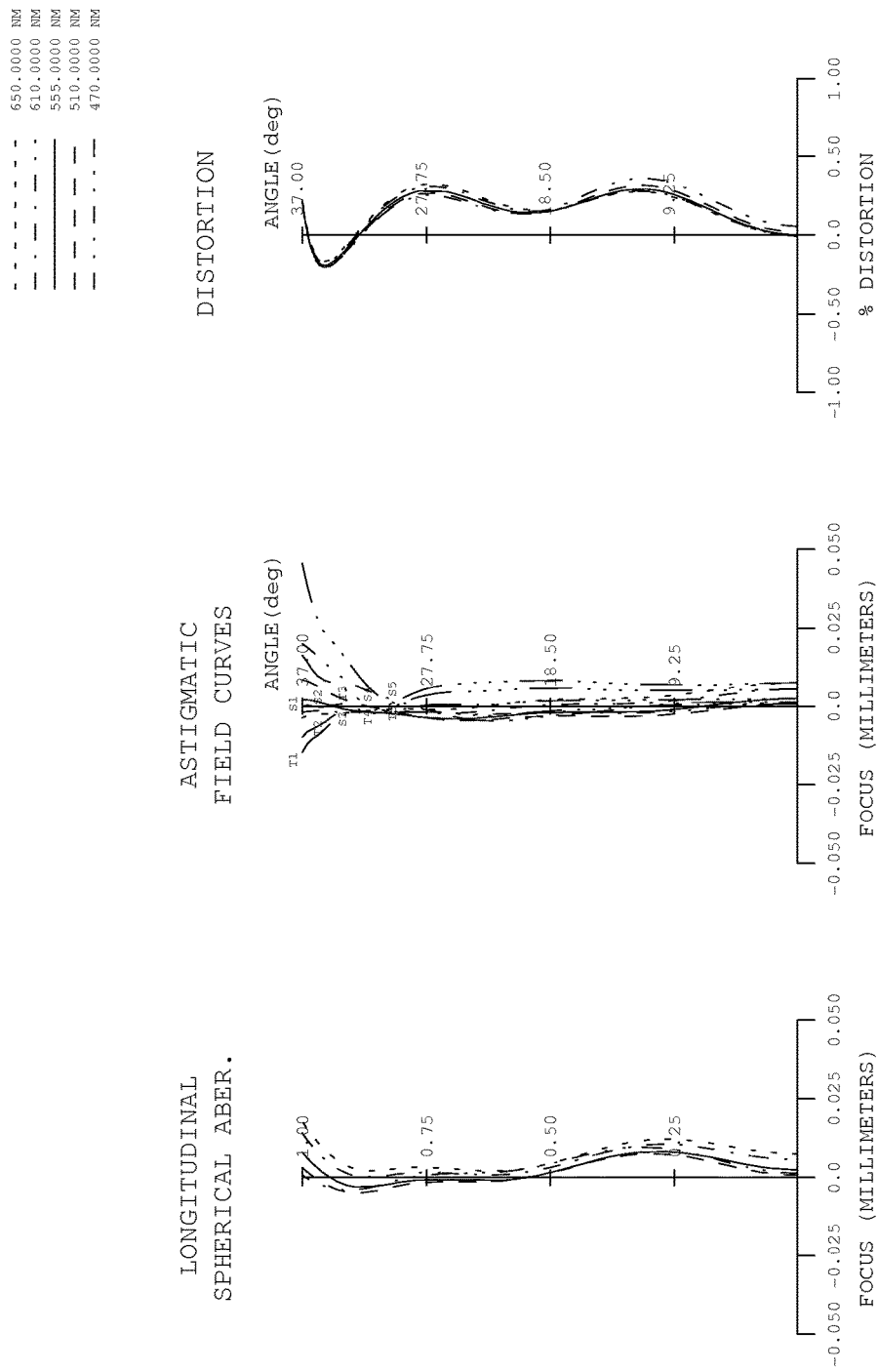
FIG. 14 shows the polychromatic curves of spherical aberration, astigmatism, and distortion over the visible band ranging 470 nm to 650 nm for another example embodiment of a lens system with cross-sectional configuration similar to that lens system illustrated in FIG. 10.

FIG. 14 shows the polychromatic curves for the chromatic variations of spherical aberration, astigmatic field curves, and distortion for another example embodiment with cross-sectional illustration similar to lens system 410 as illustrated in FIG. 10 and with optical prescription described in Tables 5A and 5B.

Figure 15:
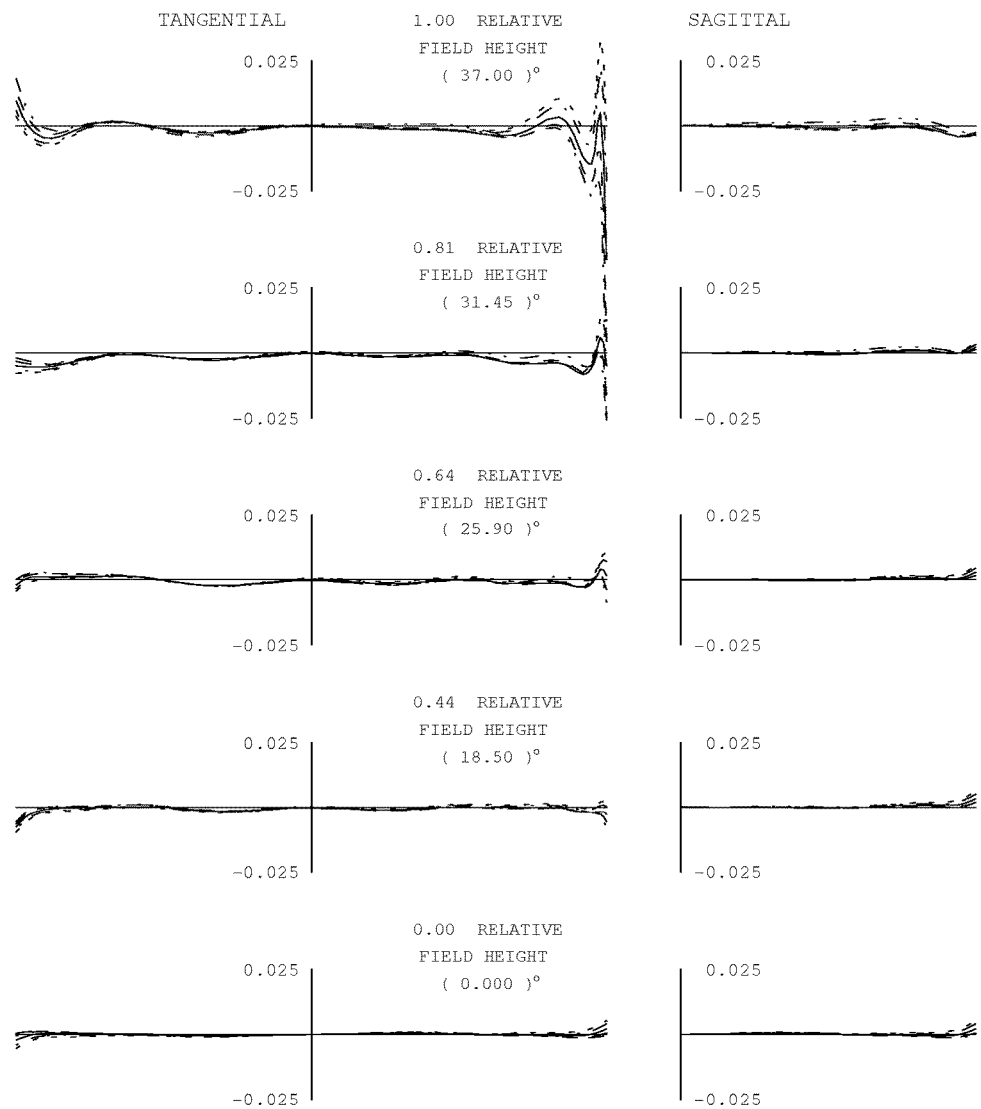
FIG. 15 shows the polychromatic ray aberration curves over the half field of view and over the visible spectral band ranging 470 nm to 650 nm for another example embodiment of a lens system with cross-sectional configuration similar to that lens system illustrated in FIG. 10.

FIG. 15 shows the polychromatic ray aberration curves over the half field of view (HFOV=37.0 degrees) over the visible spectral band ranging from 470 nm to 650 nm for another example embodiment with cross-sectional illustration similar to lens system 410 as illustrated in FIG. 10 and with optical prescription described in Tables 6A and 6B.

Figure 16:
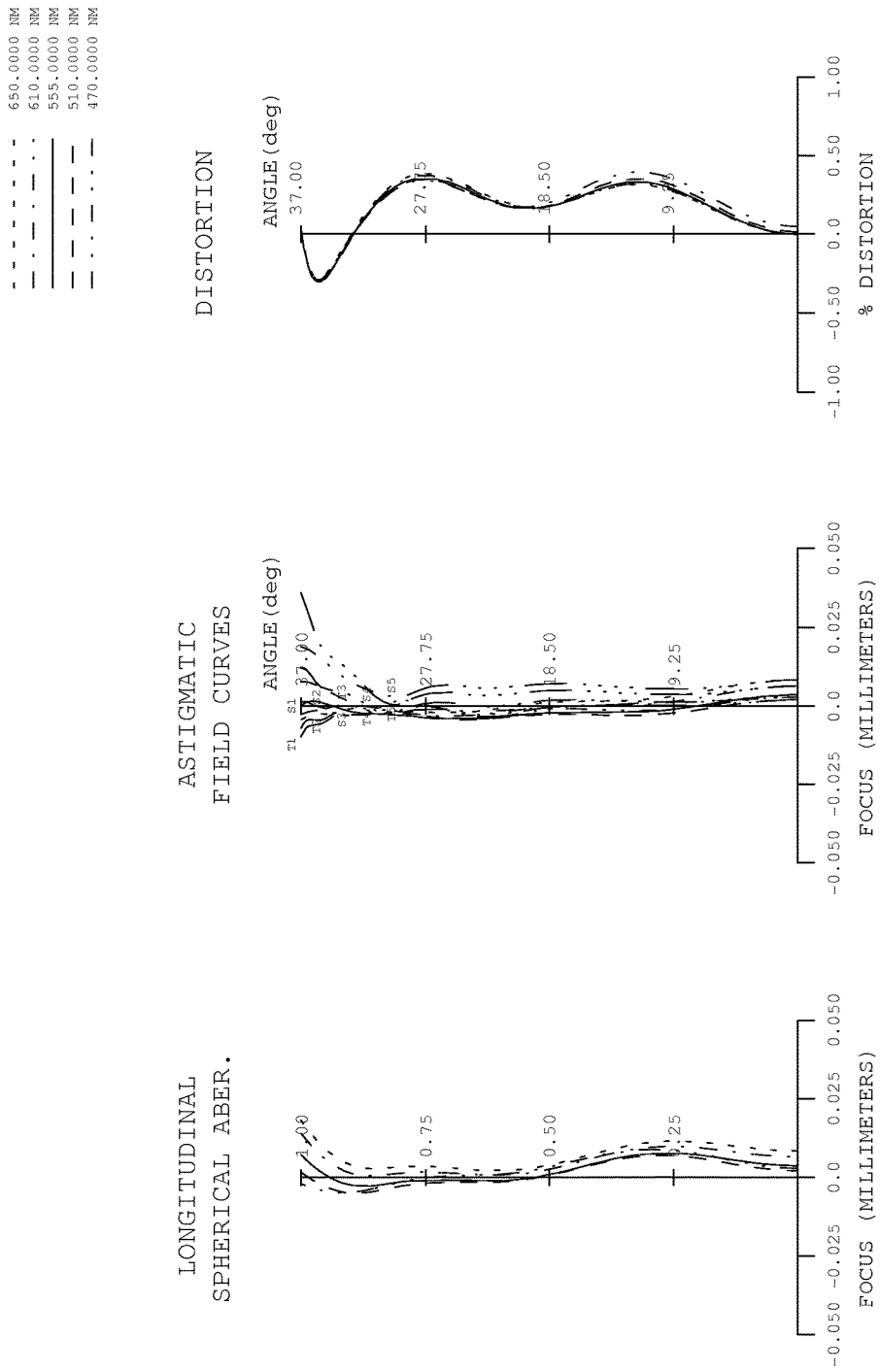
FIG. 16 shows the polychromatic curves of spherical aberration, astigmatism, and distortion over the visible band ranging 470 nm to 650 nm for another example embodiment of a lens system with cross-sectional configuration similar to that lens system illustrated in FIG. 10.

FIG. 16 shows the polychromatic curves for the chromatic variations of spherical aberration, astigmatic field curves, and distortion for another example embodiment with cross-sectional illustration similar to lens system 410 as illustrated in FIG. 10 and with optical prescription described in Tables 6A and 6B.

Figure 17:
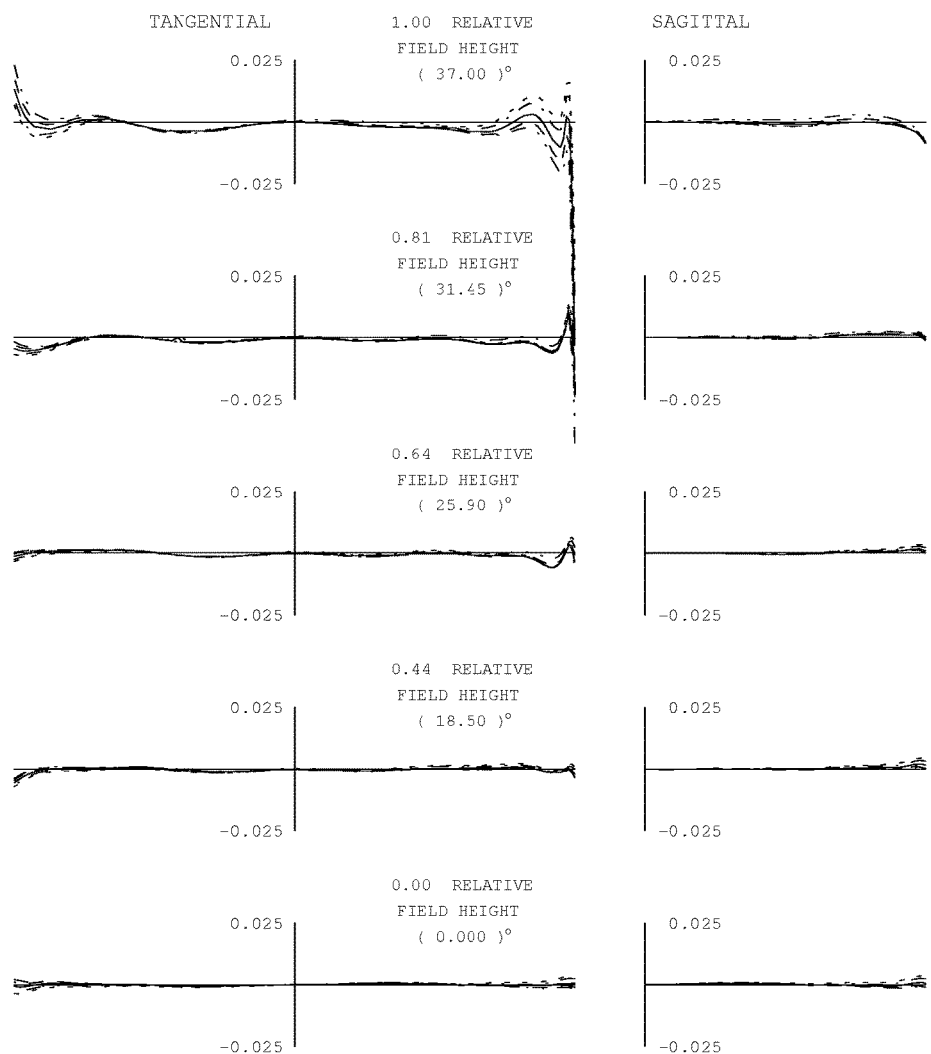
FIG. 17 shows the polychromatic ray aberration curves over the half field of view and over the visible spectral band ranging 470 nm to 650 nm for another example embodiment of a lens system with cross-sectional configuration similar to that lens system illustrated in FIG. 10.

FIG. 17 shows the polychromatic ray aberration curves over the half field of view (HFOV=37.0 degrees) over the visible spectral band ranging from 470 nm to 650 nm for another example embodiment with cross-sectional illustration similar to lens system 410 as illustrated in FIG. 10 and with optical prescription described in Tables 7A and 7B.

Figure 18:
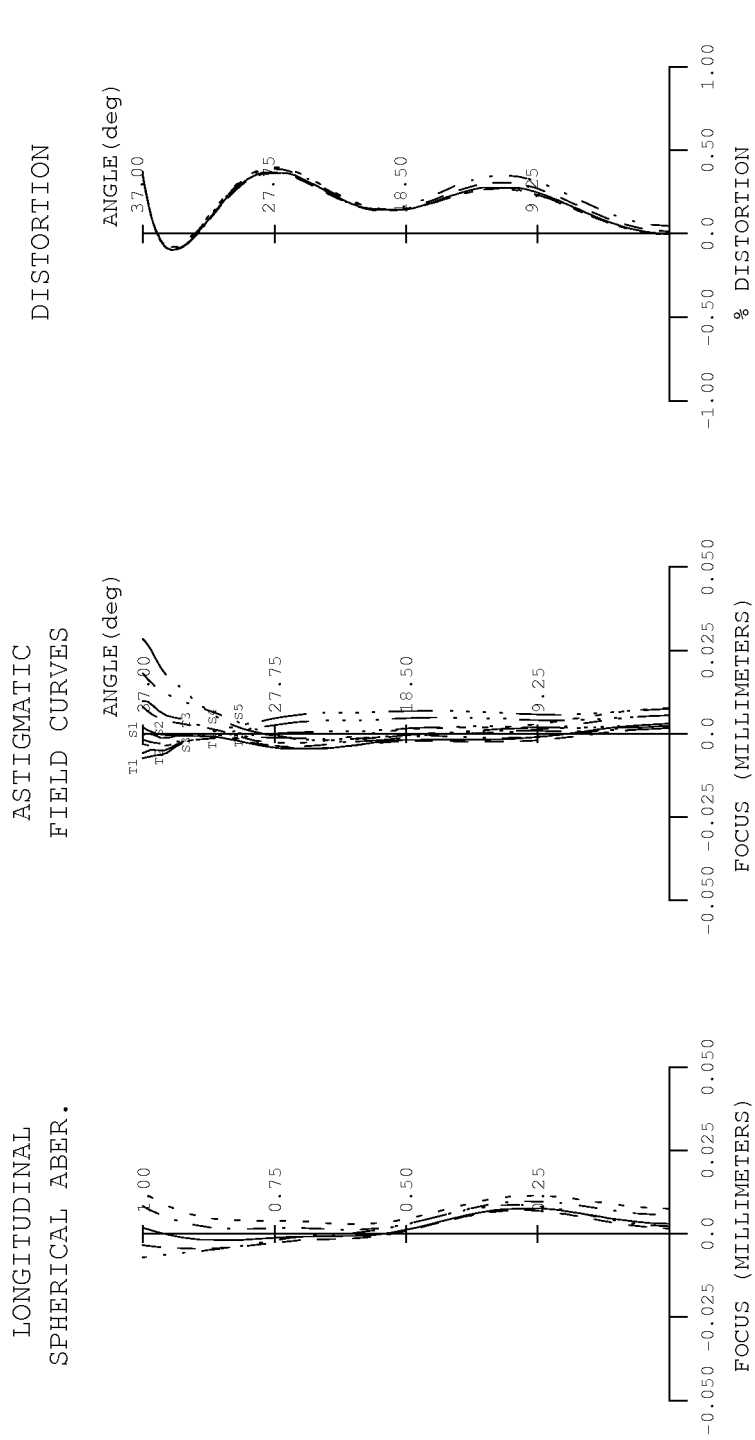
FIG. 18 shows the polychromatic curves of spherical aberration, astigmatism, and distortion over the visible band ranging 470 nm to 650 nm for another example embodiment of a lens system with cross-sectional configuration similar to that lens system illustrated in FIG. 10.

FIG. 18 shows the polychromatic curves for the chromatic variations of spherical aberration, astigmatic field curves, and distortion for another example embodiment with cross-sectional illustration similar to lens system 410 as illustrated in FIG. 10 and with optical prescription described in Tables 7A and 7B.

Figure 19:
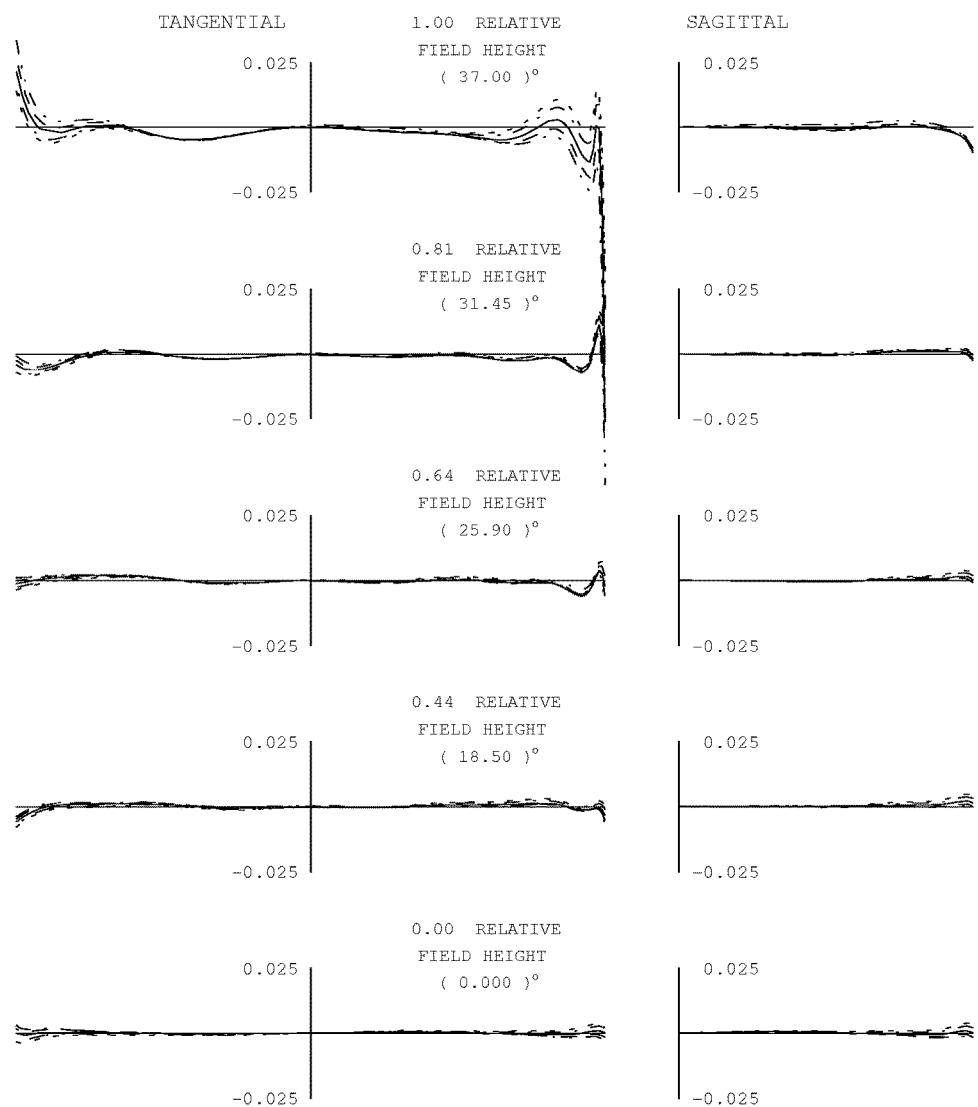
FIG. 19 shows the polychromatic ray aberration curves over the half field of view and over the visible spectral band ranging 470 nm to 650 nm for another example embodiment of a lens system with cross-sectional configuration similar to that lens system illustrated in FIG. 10.

FIG. 19 shows the polychromatic ray aberration curves over the half field of view (HFOV=37.0 degrees) over the visible spectral band ranging from 470 nm to 650 nm for another example embodiment with cross-sectional illustration similar to lens system 410 as illustrated in FIG. 10 and with optical prescription described in Tables 8A and 8B.

Figure 20:
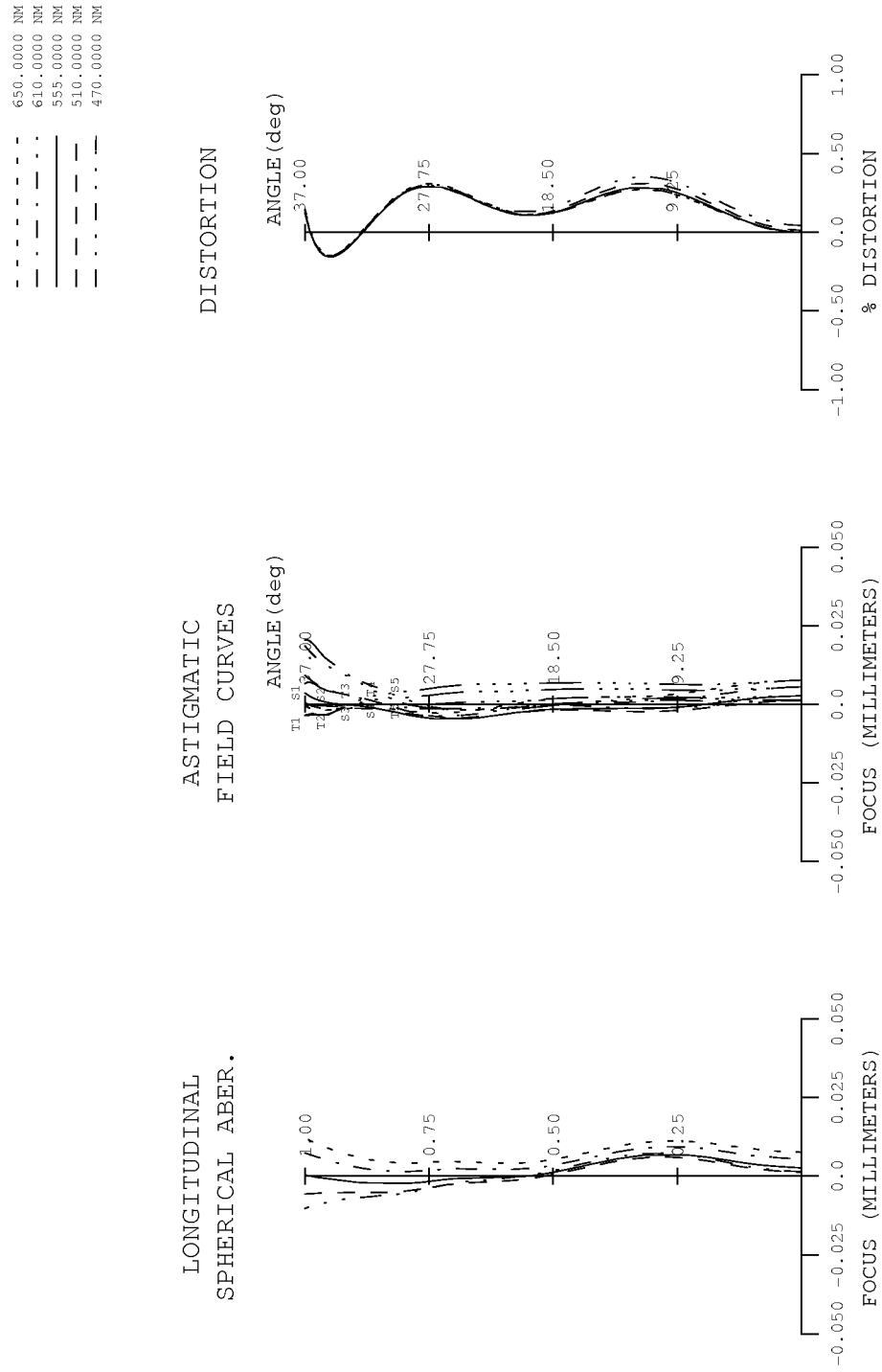
FIG. 20 shows the polychromatic curves of spherical aberration, astigmatism, and distortion over the visible band ranging 470 nm to 650 nm for another example embodiment of a lens system with cross-sectional configuration similar to that lens system illustrated in FIG. 10.

FIG. 20 shows the polychromatic curves for the chromatic variations of spherical aberration, astigmatic field curves, and distortion for another example embodiment with cross-sectional illustration similar to lens system 410 as illustrated in FIG. 10 and with optical prescription described in Tables 8A and 8B.

Figure 21:
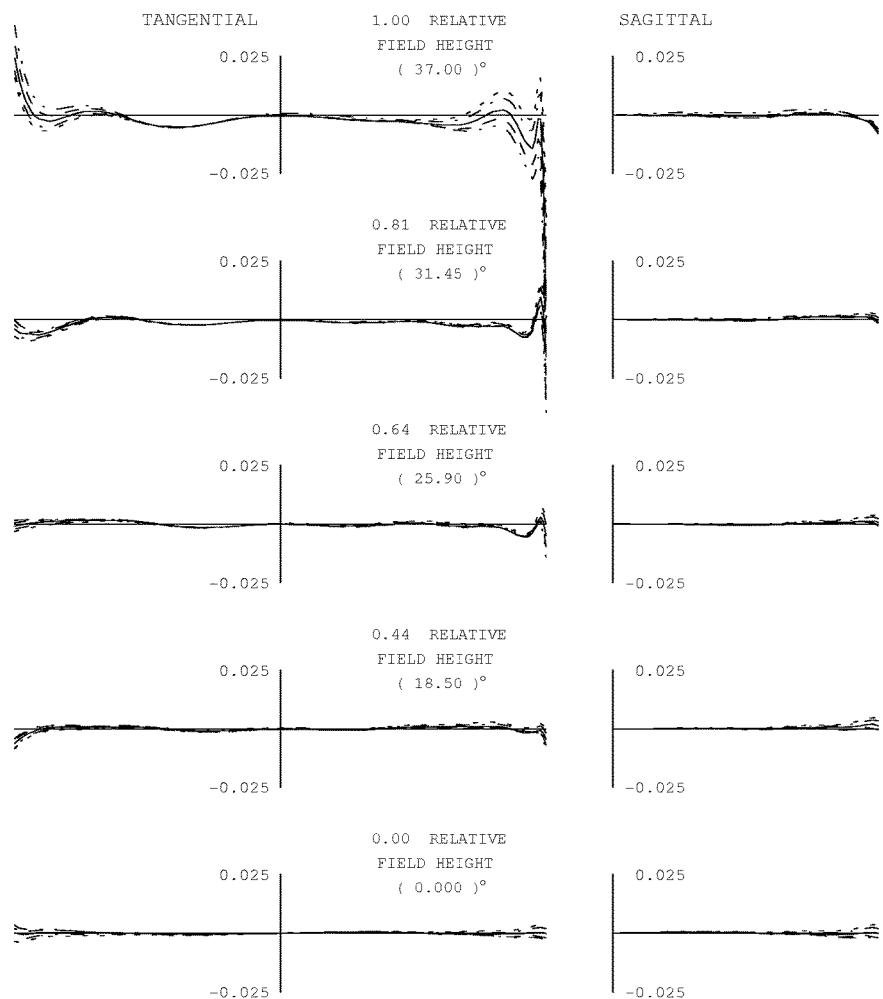
FIG. 21 shows the polychromatic ray aberration curves over the half field of view and over the visible spectral band ranging 470 nm to 650 nm for another example embodiment of a lens system with cross-sectional configuration similar to that lens system illustrated in FIG. 10.

FIG. 21 shows the polychromatic ray aberration curves over the half field of view (HFOV=37.0 degrees) over the visible spectral band ranging from 470 nm to 650 nm for another example embodiment with cross-sectional illustration similar to lens system 410 as illustrated in FIG. 10 and with optical prescription described in Tables 9A and 9B.

Figure 22:
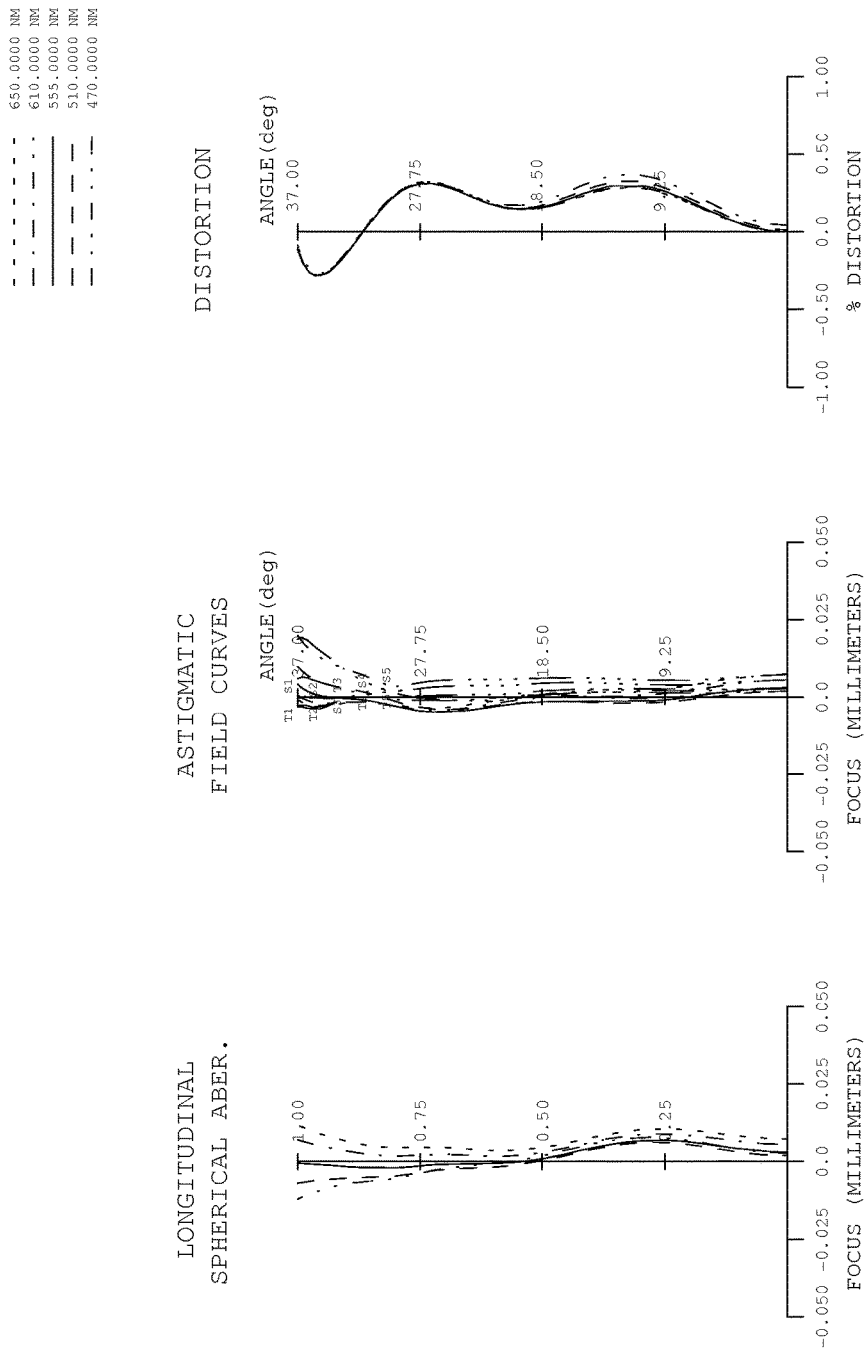
FIG. 22 shows the polychromatic curves of spherical aberration, astigmatism, and distortion over the visible band ranging 470 nm to 650 nm for another example embodiment of a lens system with cross-sectional configuration similar to that lens system illustrated in FIG. 10.

FIG. 22 shows the polychromatic curves for the chromatic variations of spherical aberration, astigmatic field curves, and distortion for another example embodiment with cross-sectional illustration similar to lens system 410 as illustrated in FIG. 10 and with optical prescription described in Tables 9A and 9B.

Figure 23:
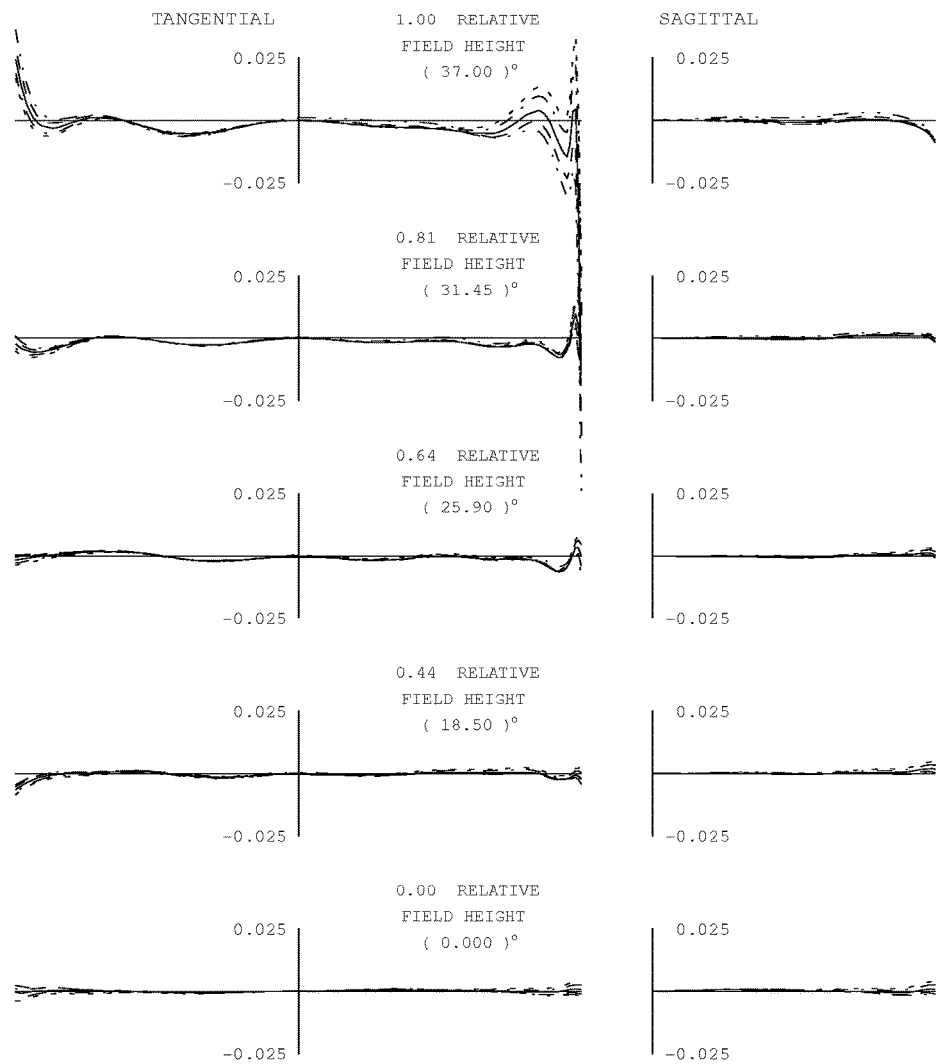
FIG. 23 shows the polychromatic ray aberration curves over the half field of view and over the visible spectral band ranging 470 nm to 650 nm for another example embodiment of a lens system with cross-sectional configuration similar to that lens system illustrated in FIG. 10.

FIG. 23 shows the polychromatic ray aberration curves over the half field of view (HFOV=37.0 degrees) over the visible spectral band ranging from 470 nm to 650 nm for another example embodiment with cross-sectional illustration similar to lens system 410 as illustrated in FIG. 10 and with optical prescription described in Tables 10A and 10B.

Figure 24:
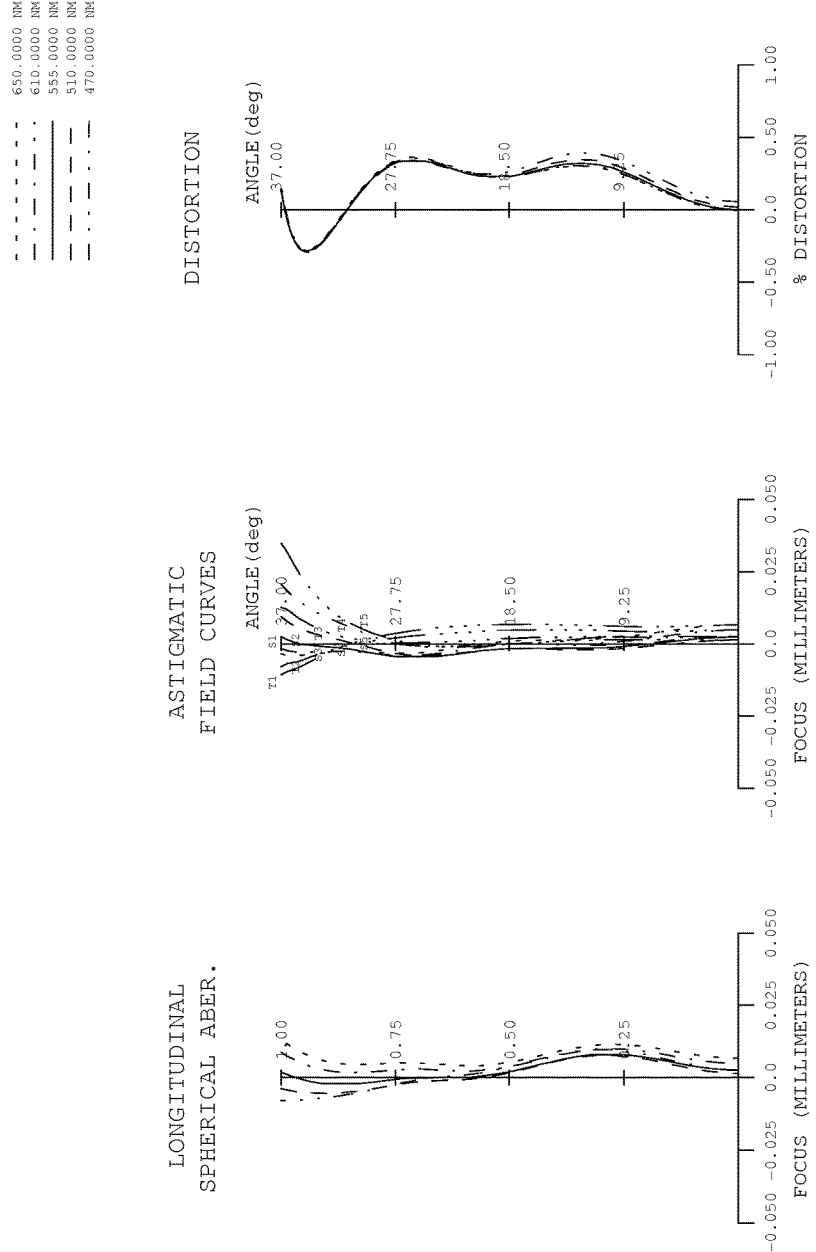
FIG. 24 shows the polychromatic curves of spherical aberration, astigmatism, and distortion over the visible band ranging 470 nm to 650 nm for another example embodiment of a lens system with cross-sectional configuration similar to that lens system illustrated in FIG. 10.

FIG. 24 shows the polychromatic curves for the chromatic variations of spherical aberration, astigmatic field curves, and distortion for another example embodiment with cross-sectional illustration similar to lens system 410 as illustrated in FIG. 10 and with optical prescription described in Tables 10A and 10B.

Figure 25:
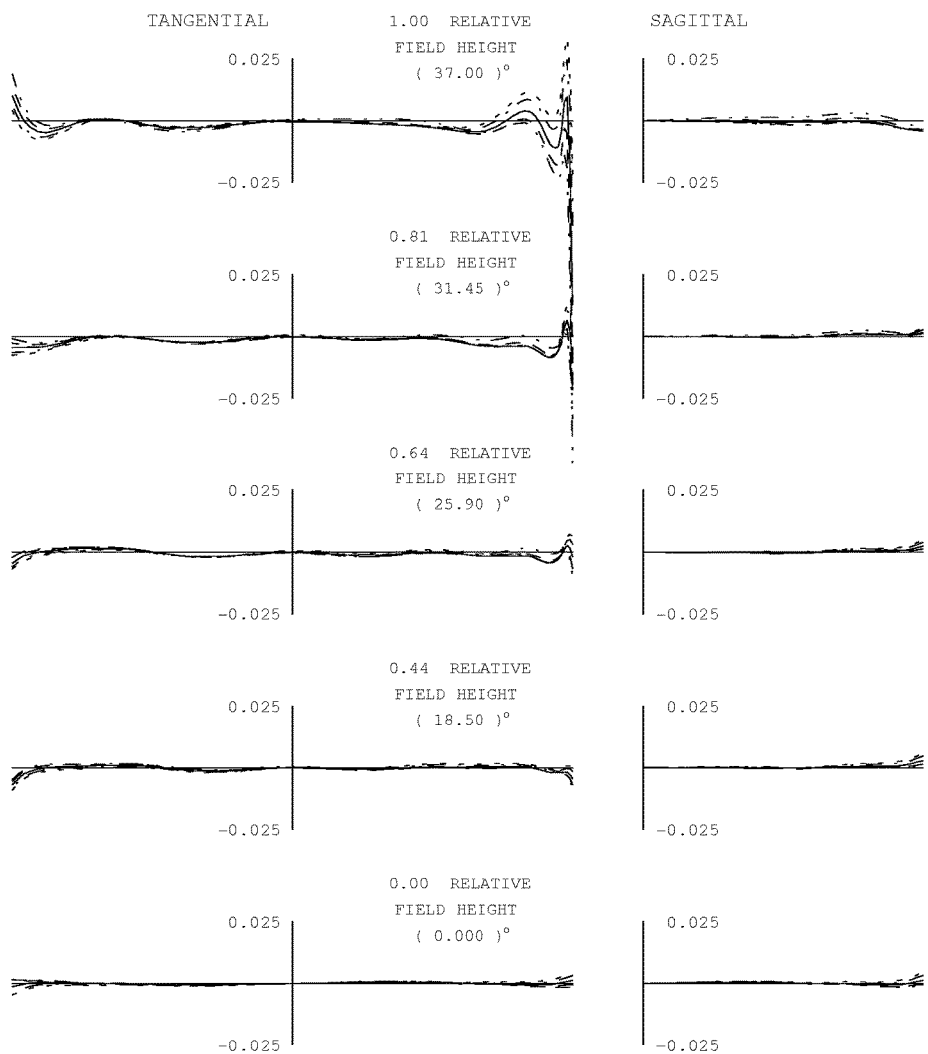
FIG. 25 shows the polychromatic ray aberration curves over the half field of view and over the visible spectral band ranging 470 nm to 650 nm for another example embodiment of a lens system with cross-sectional configuration similar to that lens system illustrated in FIG. 10.

FIG. 25 shows the polychromatic ray aberration curves over the half field of view (HFOV=37.0 degrees) over the visible spectral band ranging from 470 nm to 650 nm for another example embodiment with cross-sectional illustration similar to lens system 410 as illustrated in FIG. 10 and with optical prescription described in Tables 11A and 11B.

Figure 26:
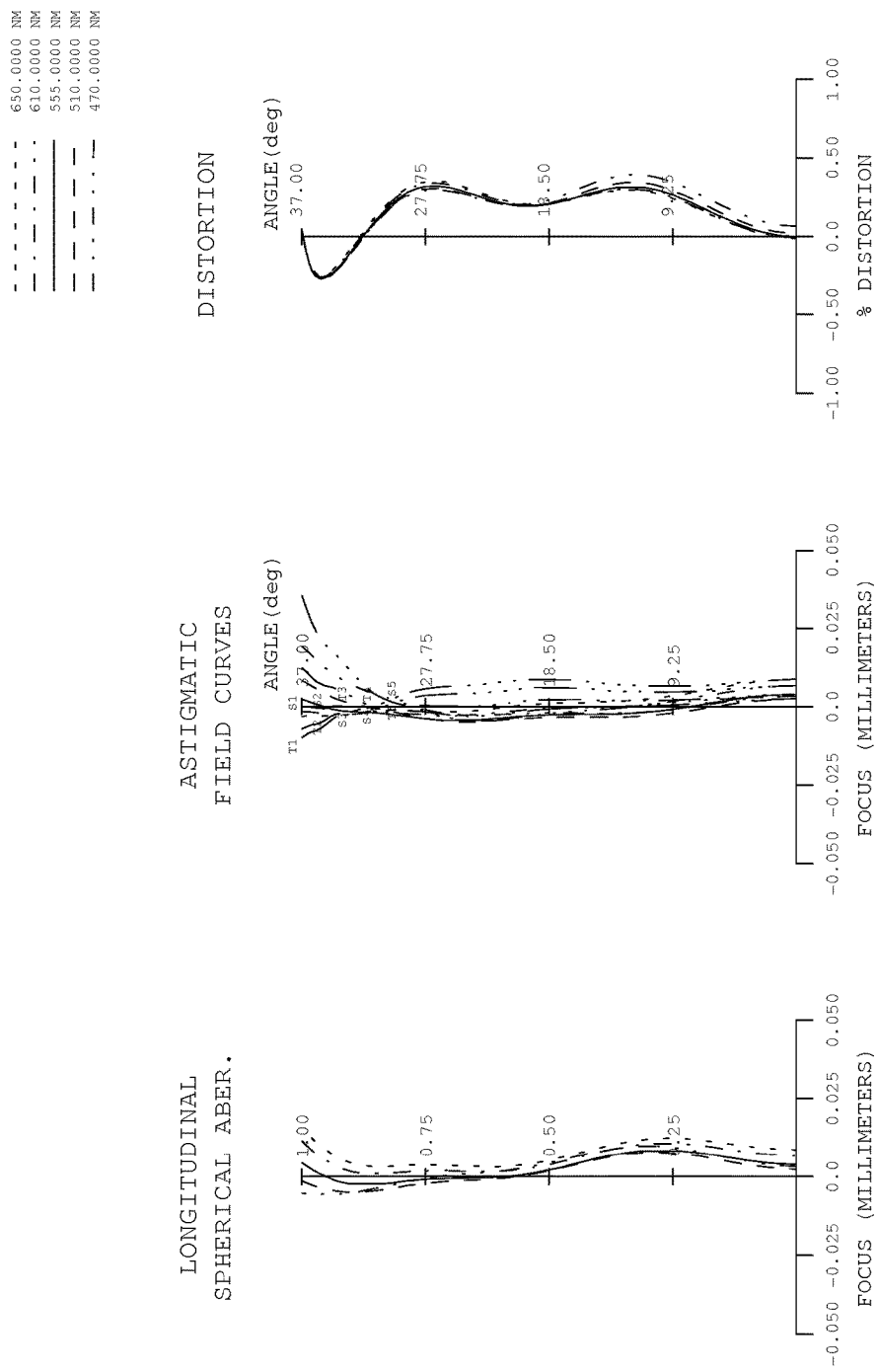
FIG. 26 shows the polychromatic curves of spherical aberration, astigmatism, and distortion over the visible band ranging 470 nm to 650 nm for another example embodiment of a lens system with cross-sectional configuration similar to that lens system illustrated in FIG. 10.

FIG. 26 shows the polychromatic curves for the chromatic variations of spherical aberration, astigmatic field curves, and distortion for another example embodiment with cross-sectional illustration similar to lens system 410 as illustrated in FIG. 10 and with optical prescription described in Tables 11A and 11B.

Figure 27:
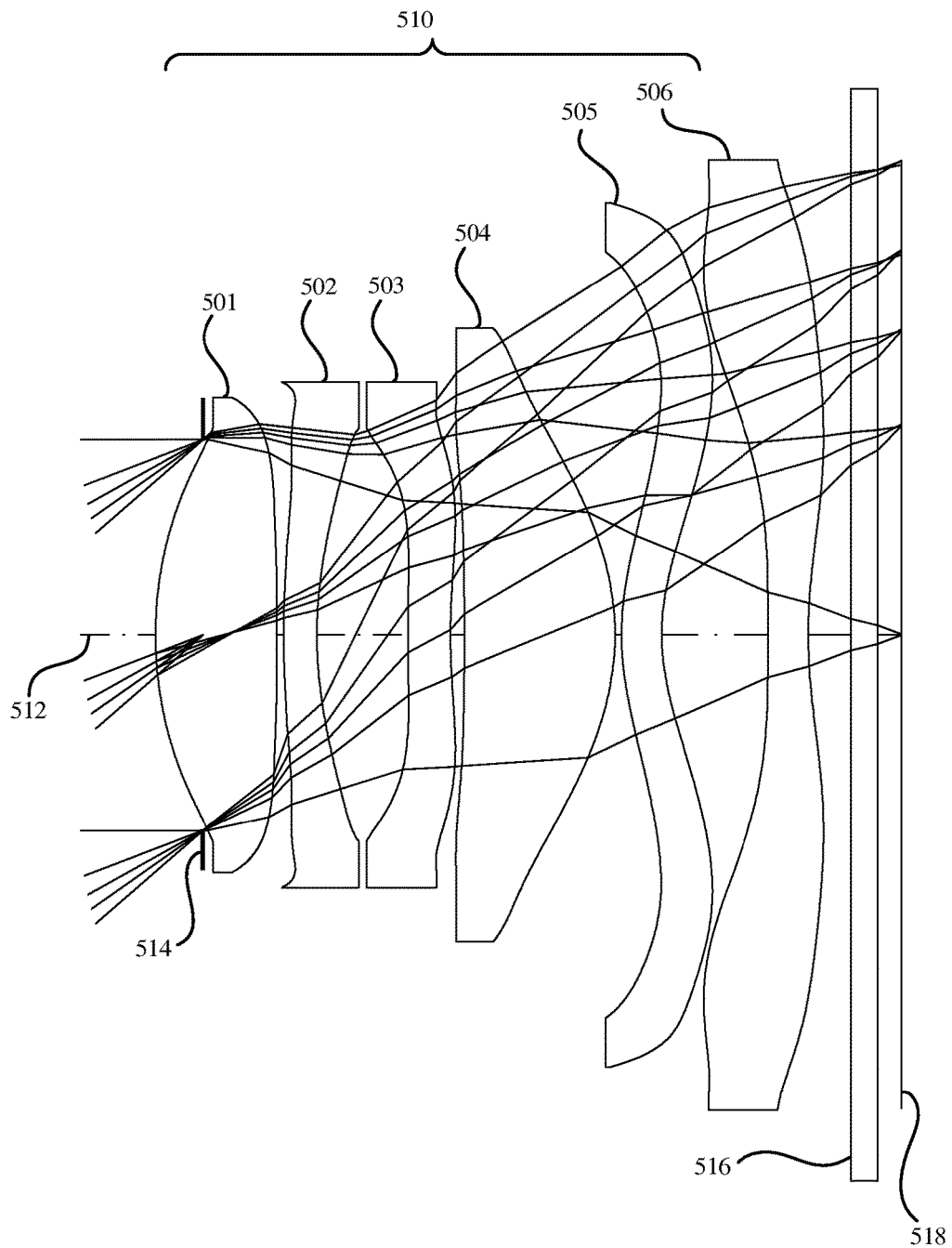
FIG. 27 is a cross-sectional illustration of another example embodiment of a lens system that includes six refractive lens elements.

FIG. 27 is a cross-sectional illustration of another example embodiment of a compact lens system 510 having a first lens component $L_1$ 501 with refractive power having a convex object-side surface. An aperture stop AS 514 is applied to the object side of the first lens component $L_1$. The lens system 510 includes six lens components 501-506 with refractive power. The parts of the lens system 510 are arranged along an optical axis AX of the lens system from the first object side lens component $L_1$ 501 to the sixth image side lens component $L_6$ 506 (from left to right in the drawing). The lens system 510 forms an image at the surface of a photosensor 518. In some embodiments, an infrared (IR) filter 516 may be located between the sixth lens component $L_6$ 506 and the photosensor 518.

The lens system 510 may be equipped and used with a standard iris type aperture stop. The lens system 510 may also be equipped with an electrochromic aperture that comprises a transparent layer of conductive organic polymer or inorganic material having variable light transmittance in response to an applied electrical voltage.

The fourth lens component $L_4$ 504 of the lens system 510 has positive refractive power, positive focal length $f_4$, and a concave object side surface. In addition, lens component $L_4$ of lens system 510 is positive meniscus in shape and has negative vertex radii of curvature $R_7$ and $R_8$, where $R_7$ is the radius of the object side surface and where $R_8$ is the radius of the image side surface, the values for both radii being at the optical axis 512. Further, $R_8 > R_7 - D_7$, where $D_7$ is the thickness of the lens at the optical axis 512.

Figure 28:
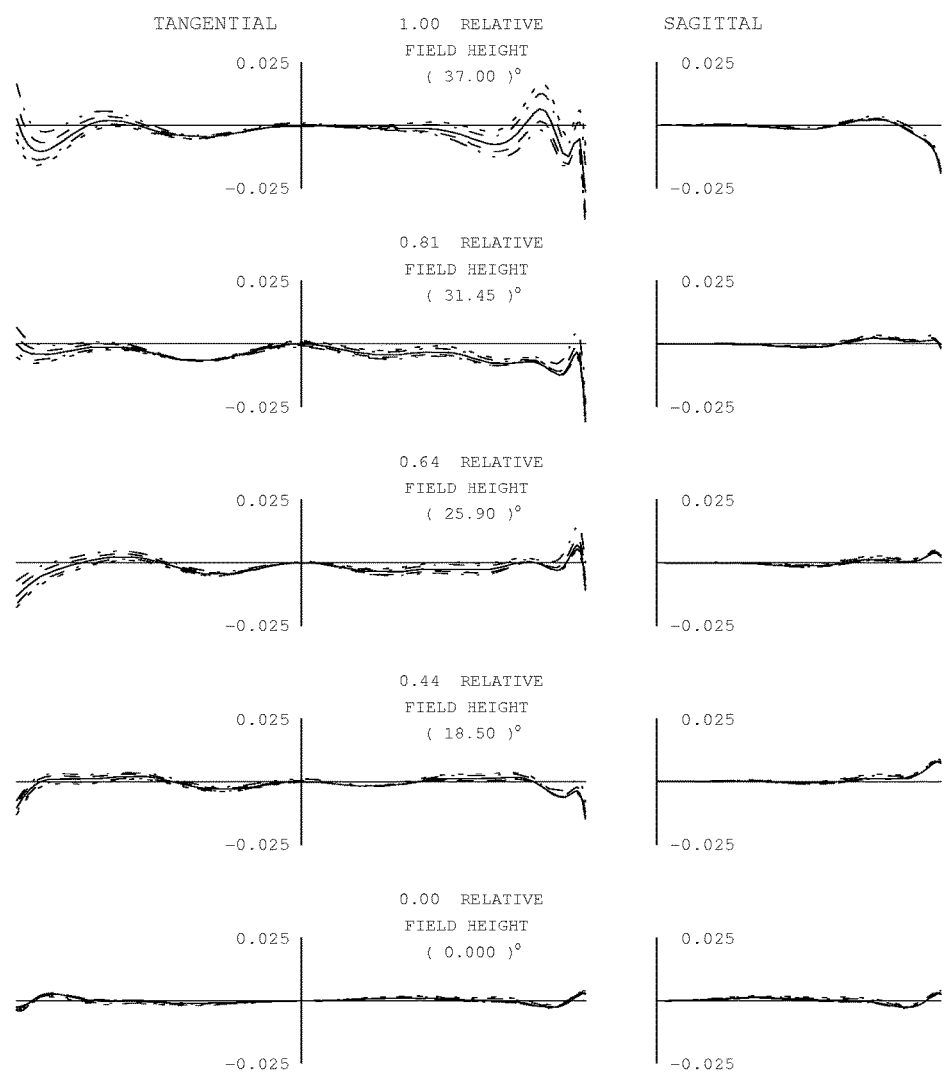
FIG. 28 shows the polychromatic ray aberration curves over the half field of view and over the visible spectral band ranging 470 nm to 650 nm for the lens system illustrated in FIG. 27.

FIG. 28 shows the polychromatic ray aberration curves over the half field of view (HFOV=37.0 degrees) over the visible spectral band ranging from 470 nm to 650 nm for a lens system 510 as illustrated in FIG. 27 and described in Tables 12A and 12B.

Figure 29:
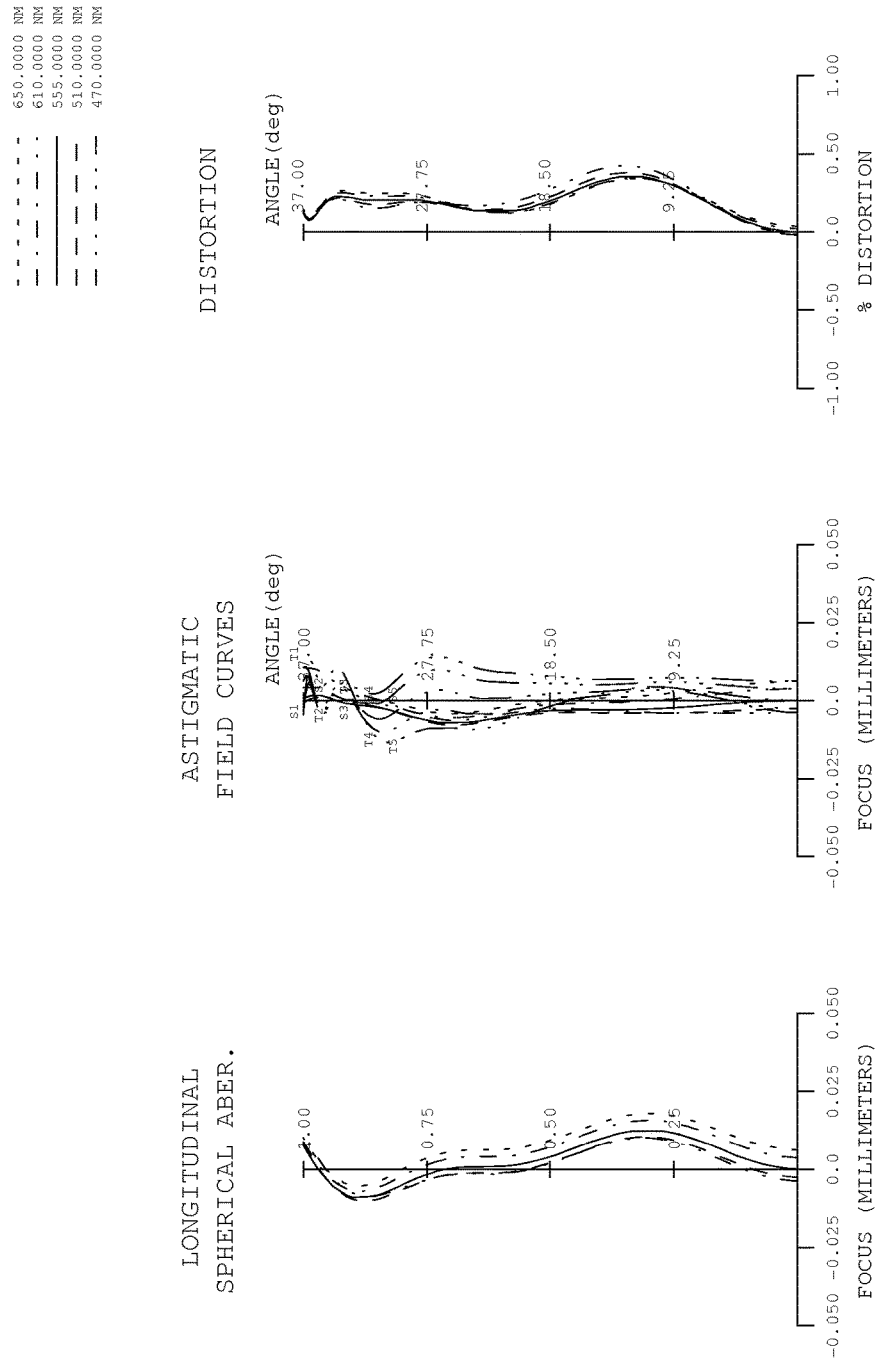
FIG. 29 shows the polychromatic curves of spherical aberration, astigmatism, and distortion over the visible band ranging 470 nm to 650 nm for the lens system illustrated in FIG. 27.

FIG. 29 shows the polychromatic curves for the chromatic variations of spherical aberration, astigmatic field curves, and distortion for the lens system 510 as illustrated in FIG. 27 and described in Tables 12A and 12B.

Figure 30:
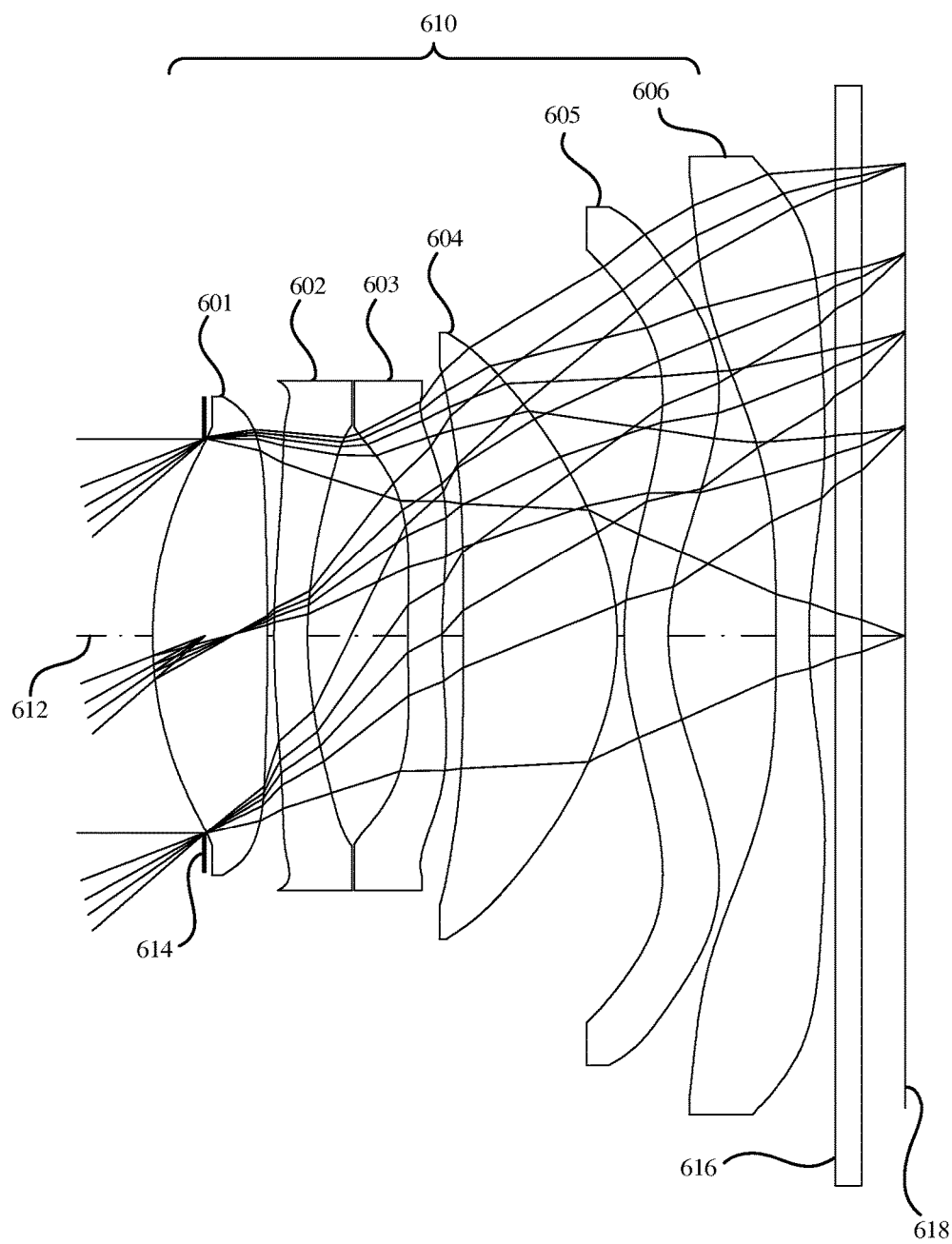
FIG. 30 is a cross-sectional illustration of another example embodiment of a lens system that includes six refractive lens elements.

FIG. 30 is a cross-sectional illustration of an example embodiment of a compact lens system 610 having a first lens component $L_1$ 601 with refractive power having a convex object-side surface. An aperture stop AS 614 is applied to the object side of the first lens component $L_1$. The lens system 610 includes six lens components 601-606 with refractive power. The parts of the lens system 610 are arranged along an optical axis AX of the lens system from the first object side lens component $L_1$ 601 to the sixth image side lens component $L_6$ 606 (from left to right in the drawing). The lens system 610 forms an image at the surface of a photosensor 618. In some embodiments, an infrared (IR) filter 616 may be located between the sixth lens component $L_6$ 606 and the photosensor 618.

The lens system 610 may be equipped and used with a standard iris type aperture stop. The lens system 610 may also be equipped with an electrochromic aperture that comprises a transparent layer of conductive organic polymer or inorganic material having variable light transmittance in response to an applied electrical voltage.

The fourth lens component $L_4$ 604 of the lens system 610 has positive refractive power, positive focal length $f_4$, and a concave object side surface. In addition, lens component $L_4$ of lens system 610 is positive meniscus in shape and has negative vertex radii of curvature $R_7$ and $R_8$, where $R_7$ is the radius of the object side surface and where $R_8$ is the radius of the image side surface, the values for both radii being at the optical axis 612. Further, $R_8 > R_7 - D_7$, where $D_7$ is the thickness of the lens at the optical axis 612.

Figure 31:
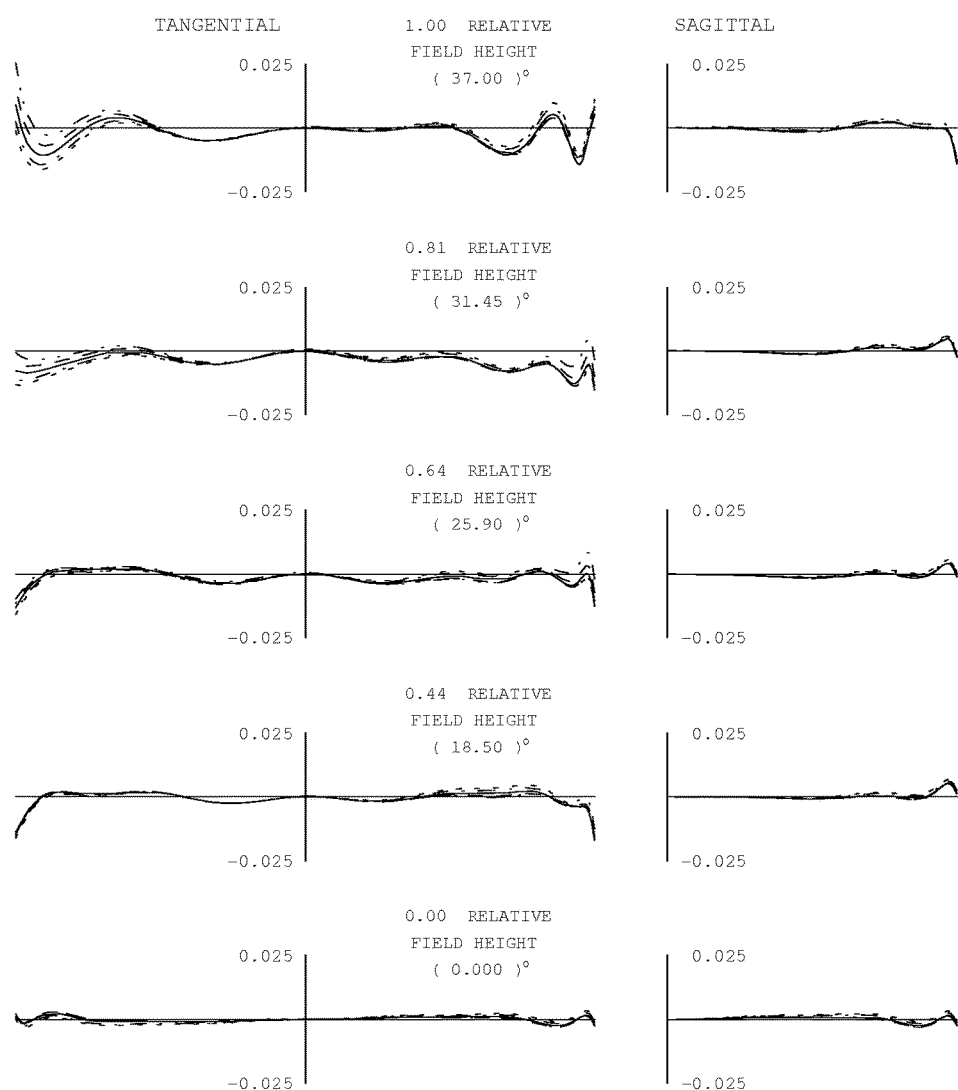
FIG. 31 shows the polychromatic ray aberration curves over the half field of view and over the visible spectral band ranging 470 nm to 650 nm for the lens system illustrated in FIG. 30.

FIG. 31 shows the polychromatic ray aberration curves over the half field of view (HFOV=37.0 degrees) over the visible spectral band ranging from 470 nm to 650 nm for a lens system 610 as illustrated in FIG. 30 and described in Tables 13A and 13B.

Figure 32:
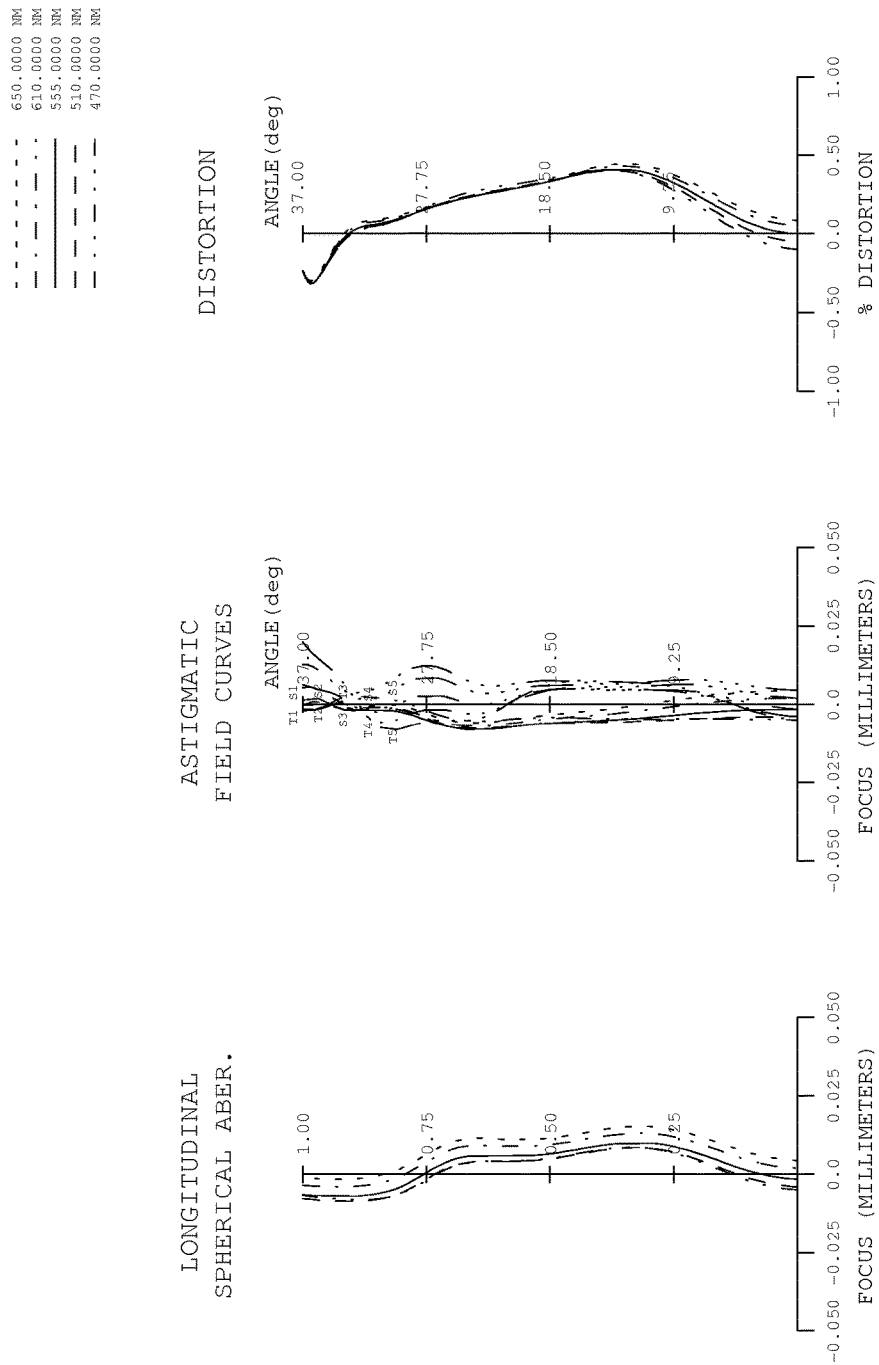
FIG. 32 shows the polychromatic curves of spherical aberration, astigmatism, and distortion over the visible band ranging 470 nm to 650 nm for the lens system illustrated in FIG. 30.

FIG. 32 shows the polychromatic curves for the chromatic variations of spherical aberration, astigmatic field curves, and distortion for the lens system 610 as illustrated in FIG. 30 and described in Tables 13A and 13B.

Figure 33:
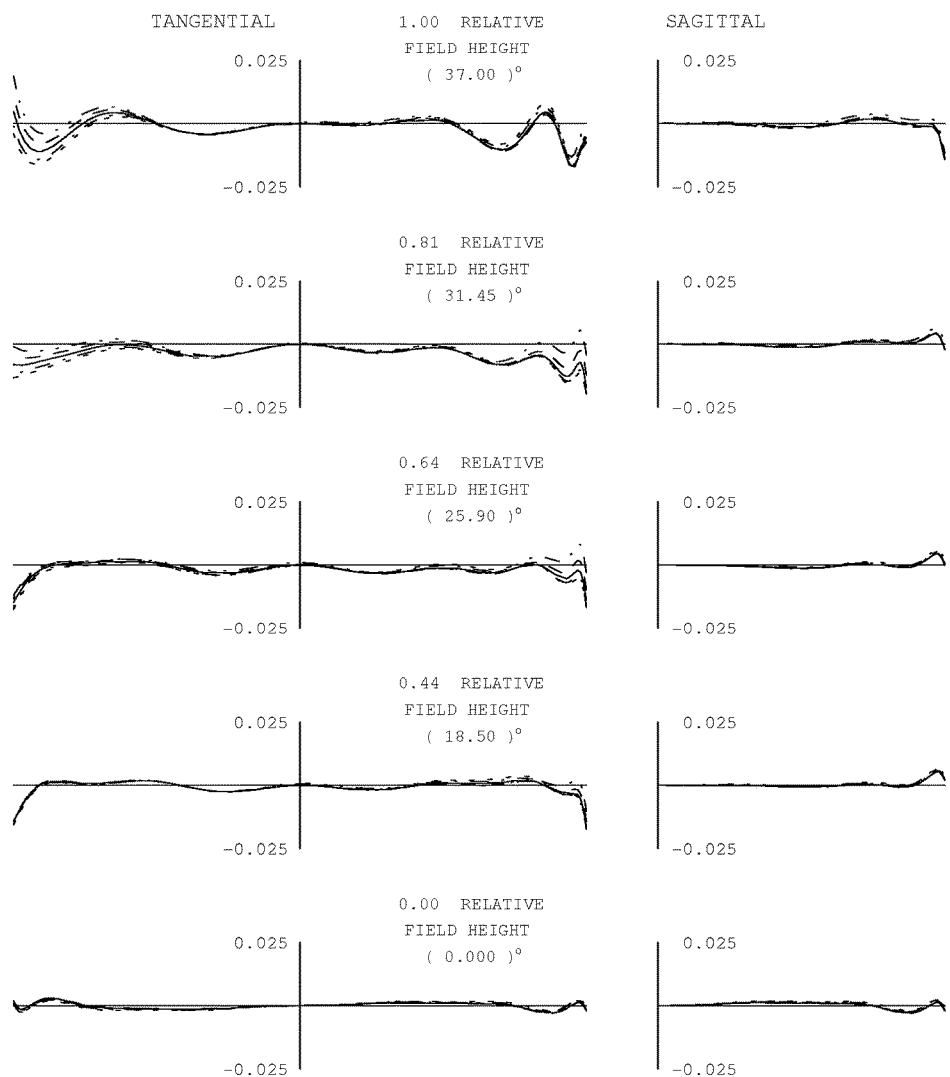
FIG. 33 shows the polychromatic ray aberration curves over the half field of view and over the visible spectral band ranging 470 nm to 650 nm for another example embodiment of a lens system with cross-sectional configuration similar to that lens system illustrated in FIG. 30.

FIG. 33 shows the polychromatic ray aberration curves over the half field of view (HFOV=37.0 degrees) over the visible spectral band ranging from 470 nm to 650 nm for another example embodiment with cross-sectional illustration similar to lens system 610 as illustrated in FIG. 30 and with optical prescription described in Tables 14A and 14B.

Figure 34:
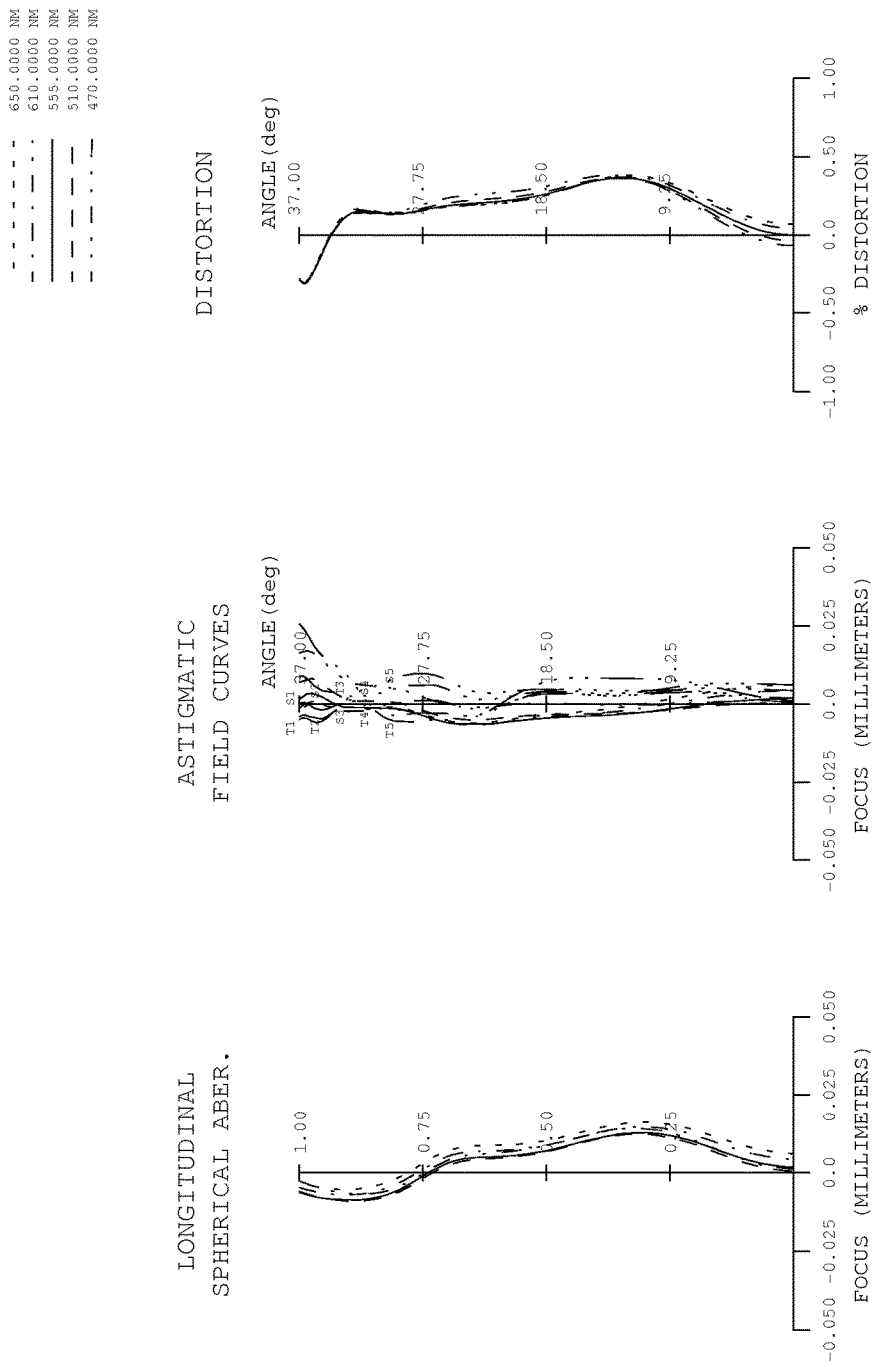
FIG. 34 shows the polychromatic curves of spherical aberration, astigmatism, and distortion over the visible band ranging 470 nm to 650 nm for another example embodiment of a lens system with cross-sectional configuration similar to that lens system illustrated in FIG. 30.

FIG. 34 shows the polychromatic curves for the chromatic variations of spherical aberration, astigmatic field curves, and distortion for another example embodiment with cross-sectional illustration similar to lens system 610 as illustrated in FIG. 30 and with optical prescription described in Tables 14A and 14B.

Figure 35:
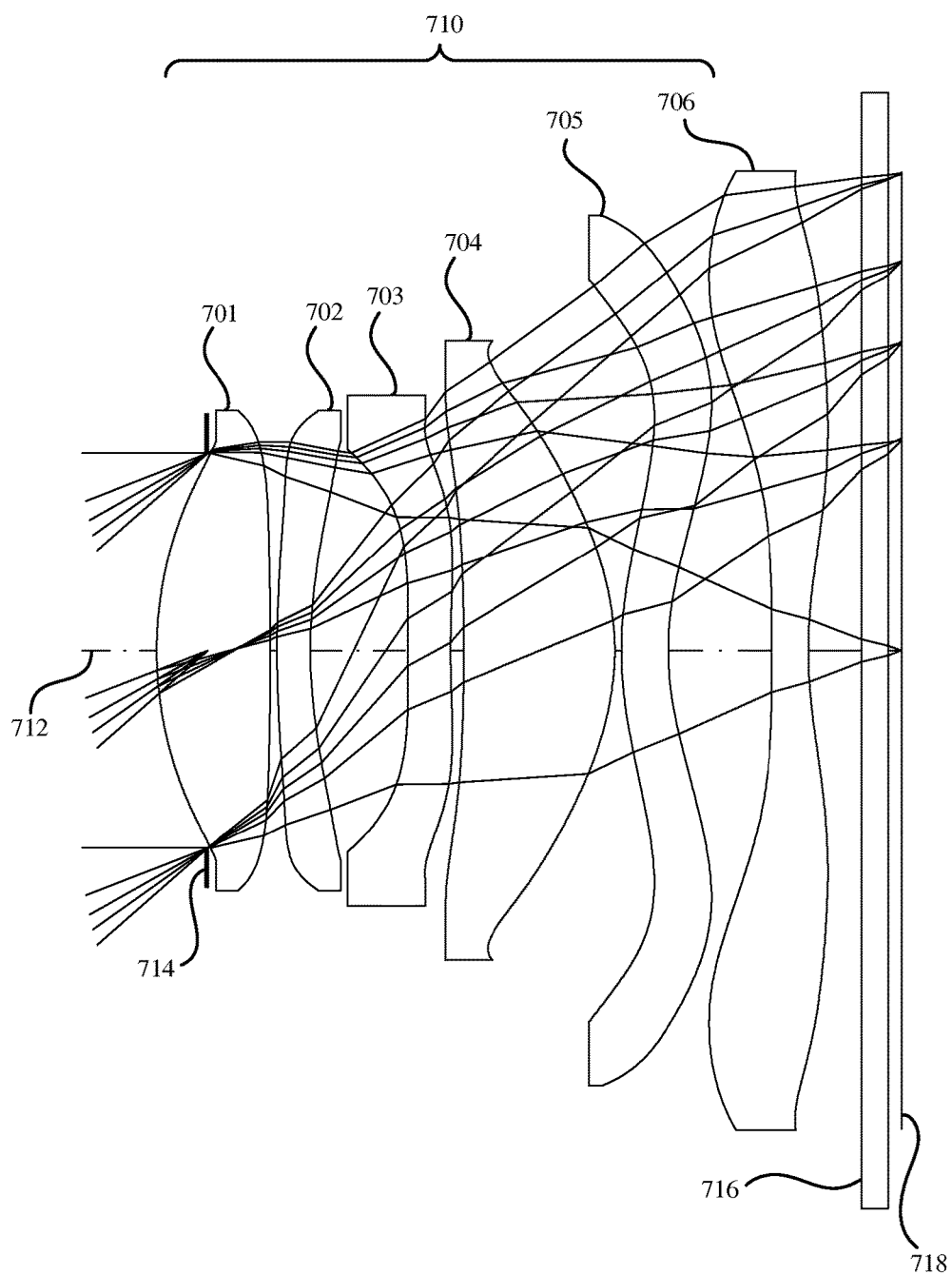
FIG. 35 is a cross-sectional illustration of another example embodiment of a lens system that includes six refractive lens elements.

FIG. 35 is a cross-sectional illustration of an example embodiment of a compact lens system 710 having a first lens component $L_1$ 701 with refractive power having a convex object-side surface. An aperture stop AS 714 is applied to the object side of the first lens component $L_1$. The lens system 710 includes six lens components 701-706 with refractive power. The parts of the lens system 710 are arranged along an optical axis AX of the lens system from the first object side lens component $L_1$ 701 to the sixth image side lens component $L_6$ 706 (from left to right in the drawing). The lens system 710 forms an image at the surface of a photosensor 718. In some embodiments, an infrared (IR) filter 716 may be located between the sixth lens component $L_6$ 706 and the photosensor 718.

The lens system 710 may be equipped and used with a standard iris type aperture stop. The lens system 710 may also be equipped with an electrochromic aperture that comprises a transparent layer of conductive organic polymer or inorganic material having variable light transmittance in response to an applied electrical voltage.

The fourth lens component $L_4$ 704 of the lens system 710 has positive refractive power, positive focal length $f_4$, and a concave object side surface. In addition, lens component $L_4$ of lens system 710 is positive meniscus in shape and has negative vertex radii of curvature $R_7$ and $R_8$, where $R_7$ is the radius of the object side surface and where $R_8$ is the radius of the image side surface, the values for both radii being at the optical axis 712. Further, $R_8 > R_7 - D_7$, where $D_7$ is the thickness of the lens at the optical axis 712.

Figure 36:
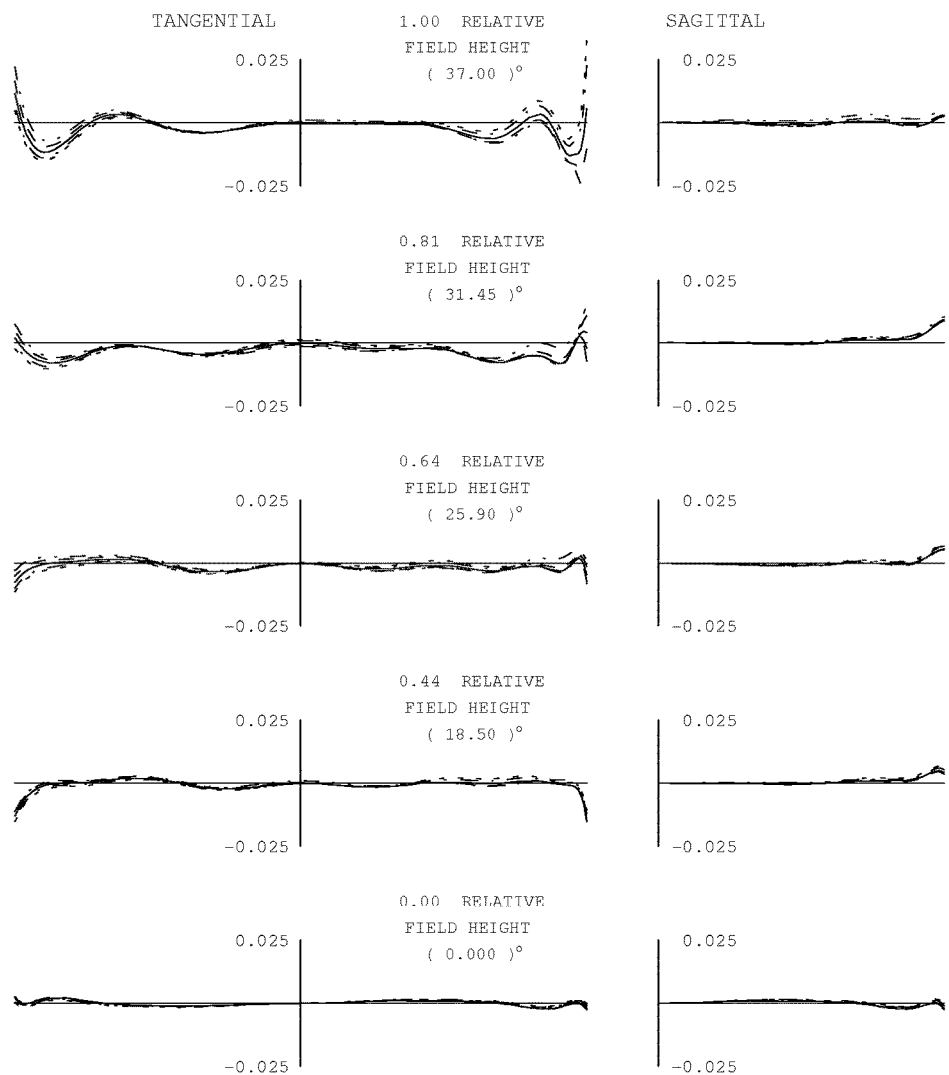
FIG. 36 shows the polychromatic ray aberration curves over the half field of view and over the visible spectral band ranging 470 nm to 650 nm for the lens system illustrated in FIG. 35.

FIG. 36 shows the polychromatic ray aberration curves over the half field of view (HFOV=37.0 degrees) over the visible spectral band ranging from 470 nm to 750 nm for a lens system 710 as illustrated in FIG. 35 and described in Tables 15A and 15B.

Figure 37:
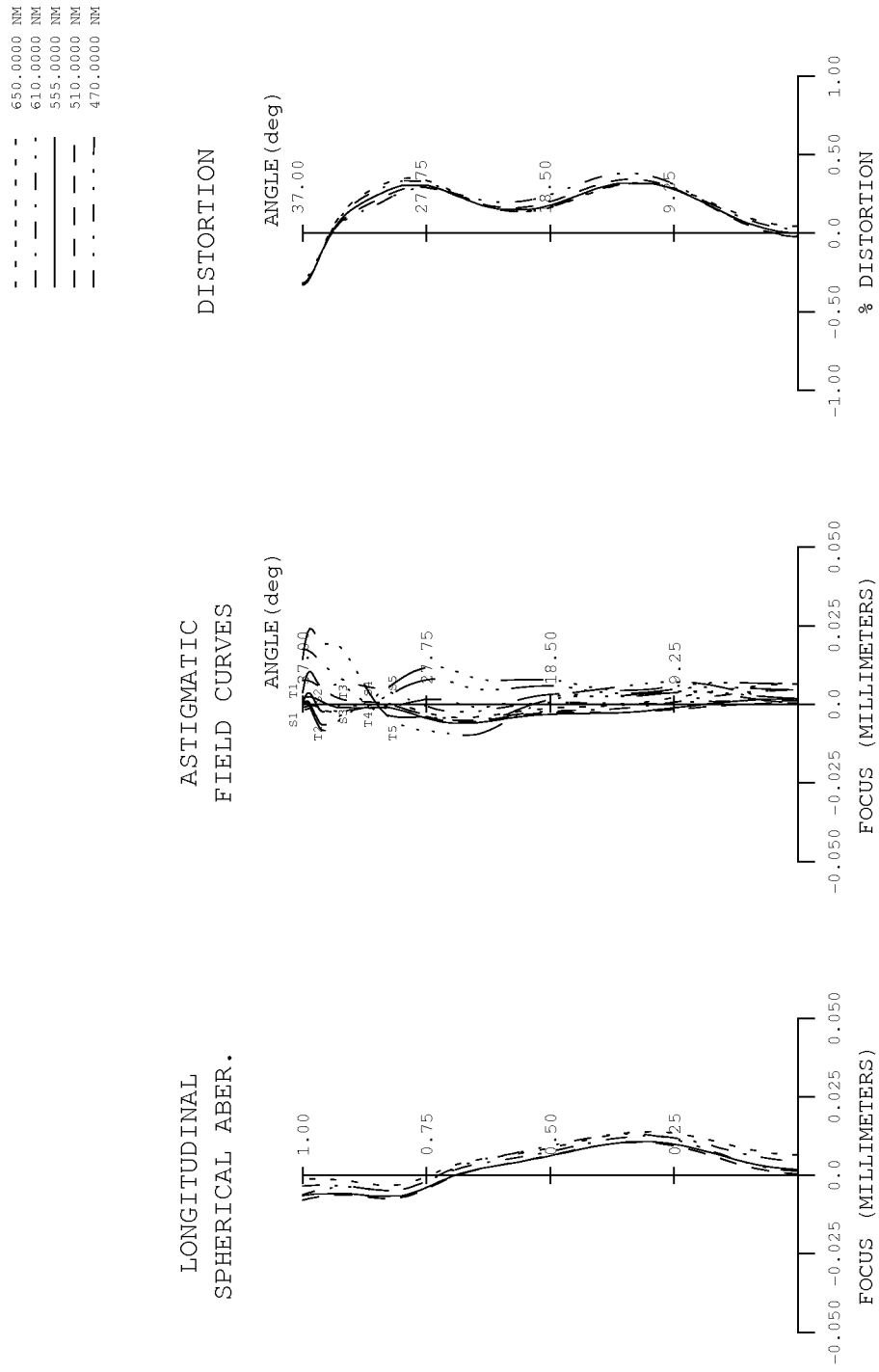
FIG. 37 shows the polychromatic curves of spherical aberration, astigmatism, and distortion over the visible band ranging 470 nm to 650 nm for the lens system illustrated in FIG. 35.

FIG. 37 shows the polychromatic curves for the chromatic variations of spherical aberration, astigmatic field curves, and distortion for the lens system 710 as illustrated in FIG. 35 and described in Tables 15A and 15B.

Figure 38:
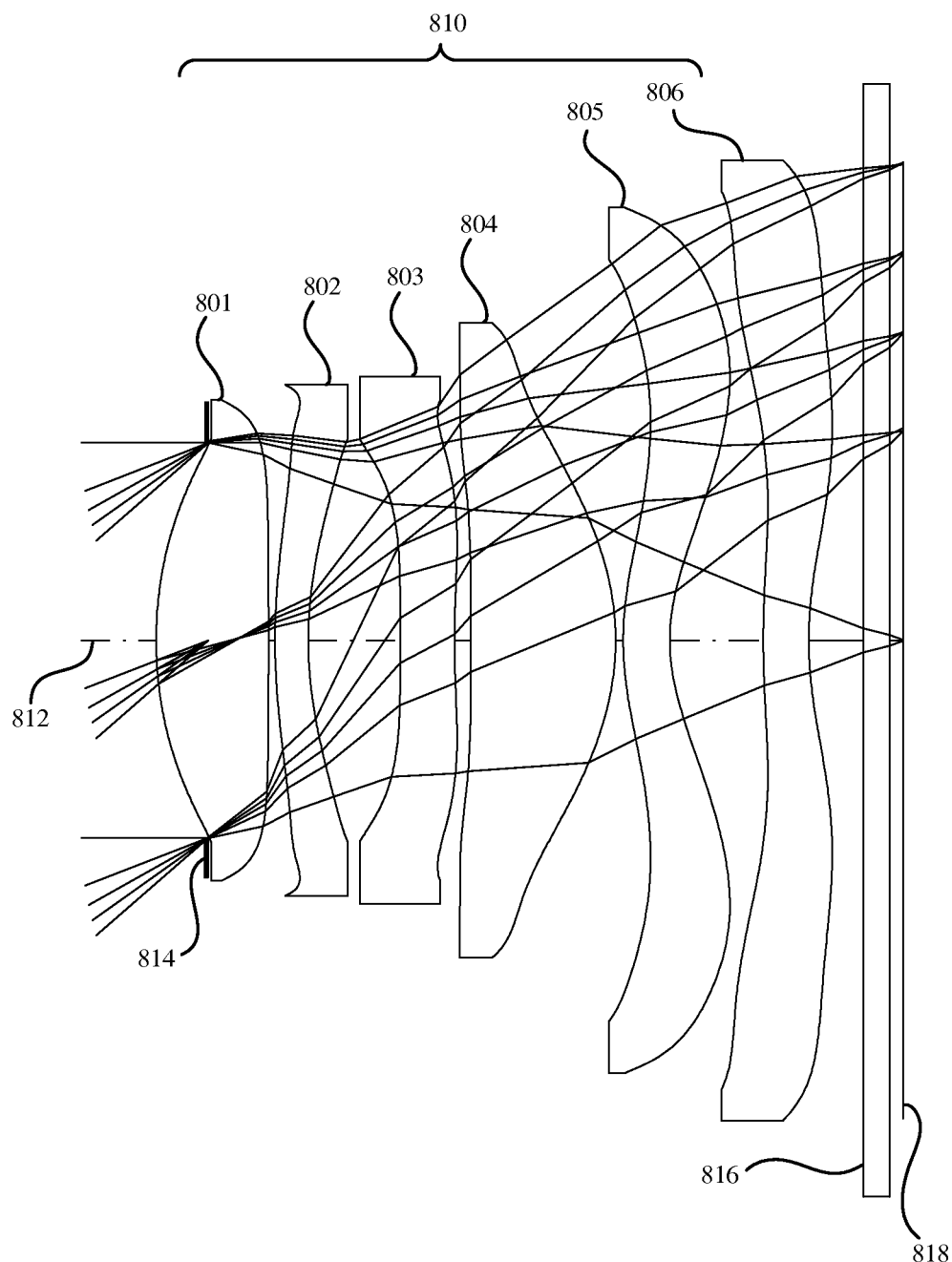
FIG. 38 is a cross-sectional illustration of another example embodiment of a lens system that includes six refractive lens elements.

FIG. 38 is a cross-sectional illustration of an example embodiment of a compact lens system 810 having a first lens component $L_1$ 801 with refractive power having a convex object-side surface. An aperture stop AS 814 is applied to the object side of the first lens component $L_1$. The lens system 810 includes six lens components 801-806 with refractive power. The parts of the lens system 810 are arranged along an optical axis AX of the lens system from the first object side lens component $L_1$ 801 to the sixth image side lens component $L_6$ 806 (from left to right in the drawing). The lens system 810 forms an image at the surface of a photosensor 818. In some embodiments, an infrared (IR) filter 816 may be located between the sixth lens component $L_6$ 806 and the photosensor 818.

The lens system 810 may be equipped and used with a standard iris type aperture stop. The lens system 810 may also be equipped with an electrochromic aperture that comprises a transparent layer of conductive organic polymer or inorganic material having variable light transmittance in response to an applied electrical voltage.

The fourth lens component $L_4$ 804 of the lens system 810 has positive refractive power, positive focal length $f_4$, and a convex object side surface. In addition, lens component $L_4$ of lens system 810 is positive meniscus in shape and has positive vertex radius of curvature $R_7$ and negative vertex radius of curvature $R_8$, where $R_7$ is the radius of the object side surface and where $R_8$ is the radius of the image side surface, the values for both radii being at the optical axis 812. Further, $R_8 < R_7 - D_7$, where $D_7$ is the thickness of the lens at the optical axis 812.

Figure 39:
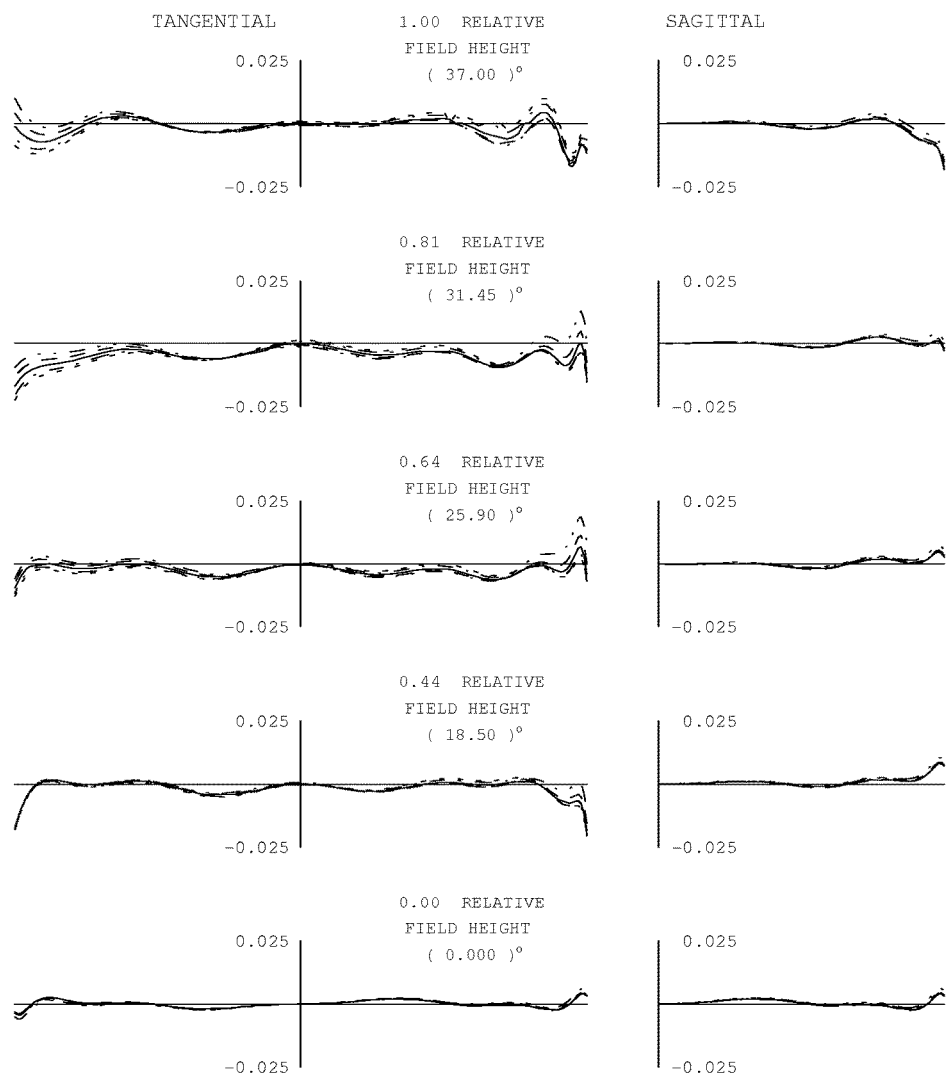
FIG. 39 shows the polychromatic ray aberration curves over the half field of view and over the visible spectral band ranging 470 nm to 650 nm for the lens system illustrated in FIG. 38.

FIG. 39 shows the polychromatic ray aberration curves over the half field of view (HFOV=37.0 degrees) over the visible spectral band ranging from 470 nm to 750 nm for a lens system 810 as illustrated in FIG. 38 and described in Tables 16A and 16B.

Figure 40:
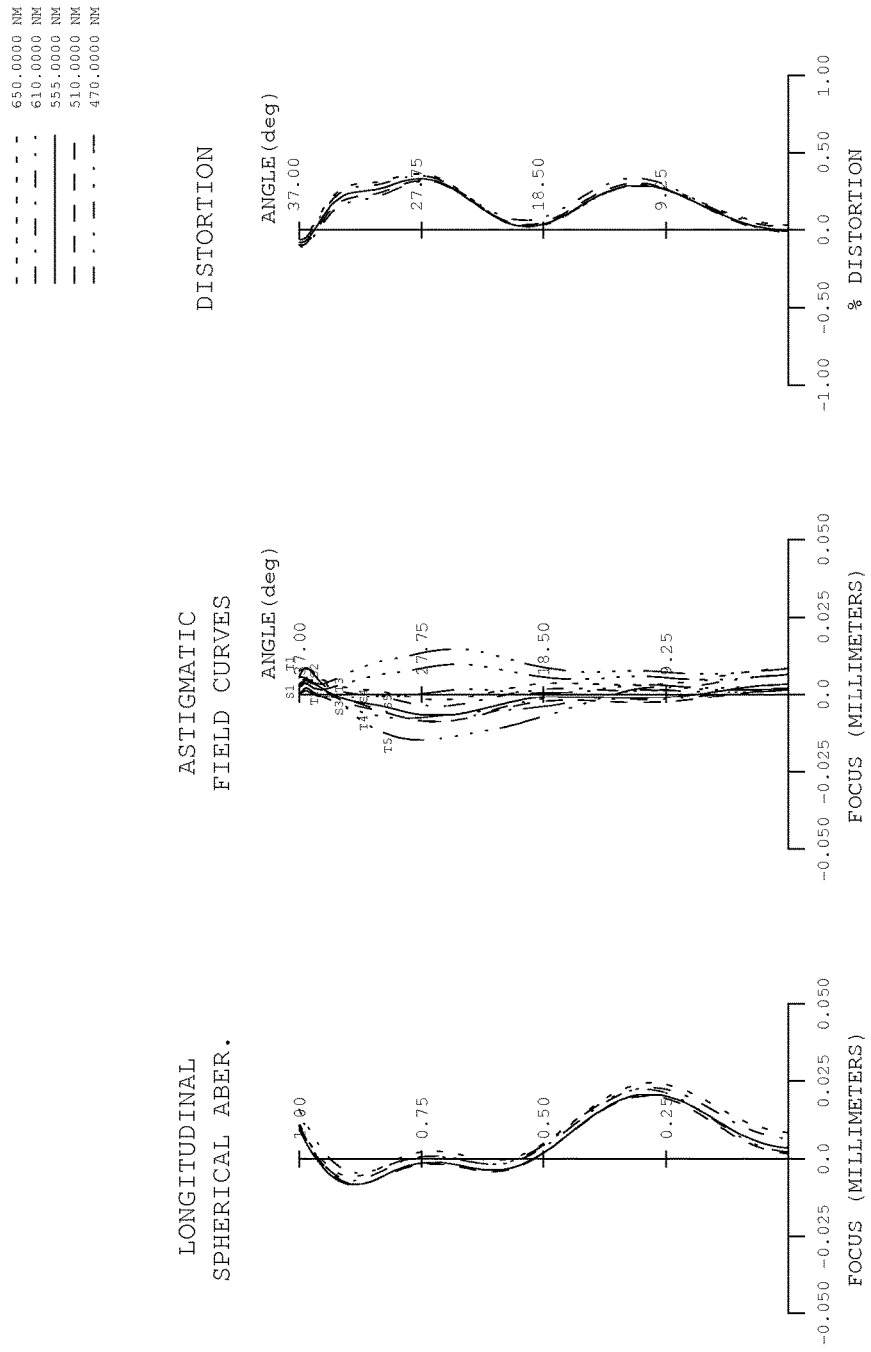
FIG. 40 shows the polychromatic curves of spherical aberration, astigmatism, and distortion over the visible band ranging 470 nm to 650 nm for the lens system illustrated in FIG. 38.

FIG. 40 shows the polychromatic curves for the chromatic variations of spherical aberration, astigmatic field curves, and distortion for the lens system 810 as illustrated in FIG. 38 and described in Tables 16A and 16B.

FIG. 41 is a cross-sectional illustration of an example embodiment of a compact lens system 910 having a first lens component $L_1$ 901 with refractive power having a convex object-side surface. An aperture stop AS 914 is applied to the object side of the first lens component $L_1$. The lens system 910 includes six lens components 901-906 with refractive power. The parts of the lens system 910 are arranged along an optical axis AX of the lens system from the first object side lens component $L_1$ 901 to the sixth image side lens component $L_6$ 906 (from left to right in the drawing). The lens system 910 forms an image at the surface of a photosensor 918. In some embodiments, an infrared (IR) filter 916 may be located between the sixth lens component $L_6$ 906 and the photosensor 918.

The lens system 910 may be equipped and used with a standard iris type aperture stop. The lens system 910 may also be equipped with an electrochromic aperture that comprises a transparent layer of conductive organic polymer or inorganic material having variable light transmittance in response to an applied electrical voltage.

The fourth lens component $L_4$ 904 of the lens system 910 has negative refractive power, negative focal length $f_4$, and a concave object side surface. In addition, lens component $L_4$ of lens system 910 is negative meniscus in shape and has negative vertex radius of curvature $R_7$ and negative vertex radius of curvature $R_8$, where $R_7$ is the radius of the object side surface and where $R_8$ is the radius of the image side surface, the values for both radii being at the optical axis 912. Further, $R_8 < R_7 - D_7$, where $D_7$ is the thickness of the lens at the optical axis 912.

Figure 42:
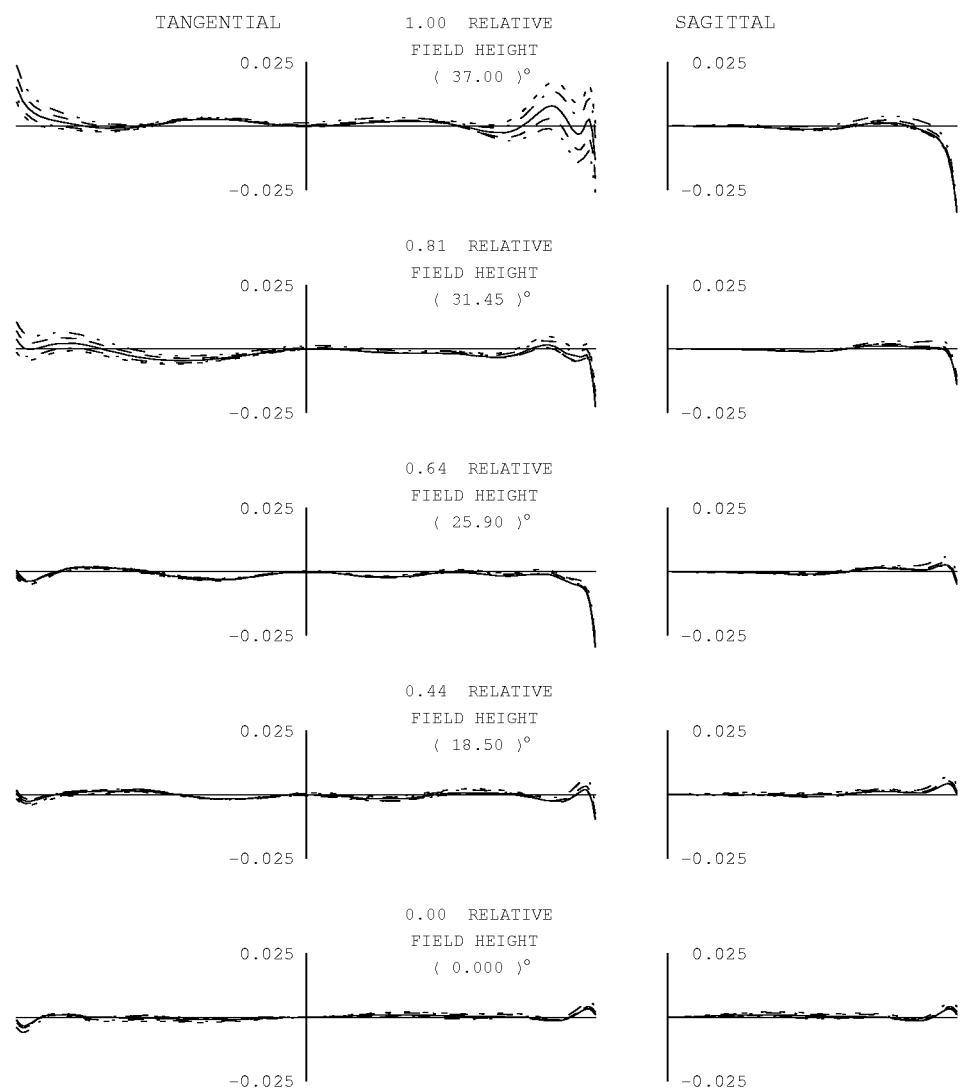
FIG. 42 shows the polychromatic ray aberration curves over the half field of view and over the visible spectral band ranging 470 nm to 650 nm for the lens system illustrated in FIG. 41.

FIG. 42 shows the polychromatic ray aberration curves over the half field of view (HFOV=37.0 degrees) over the visible spectral band ranging from 470 nm to 750 nm for a lens system 910 as illustrated in FIG. 41 and described in Tables 17A and 17B.

Figure 43:
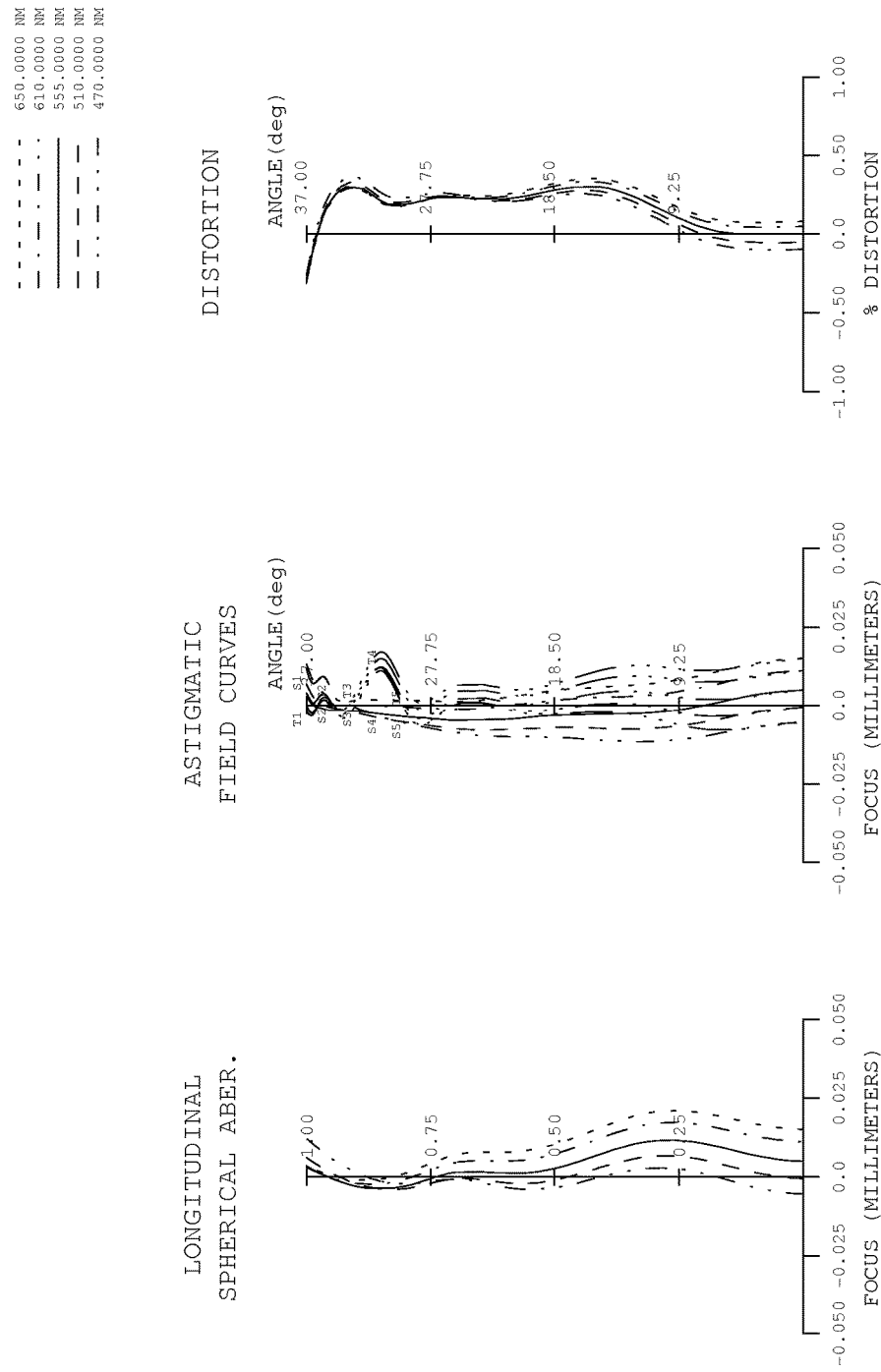
FIG. 43 shows the polychromatic curves of spherical aberration, astigmatism, and distortion over the visible band ranging 470 nm to 650 nm for the lens system illustrated in FIG. 41.

FIG. 43 shows the polychromatic curves for the chromatic variations of spherical aberration, astigmatic field curves, and distortion for the lens system 910 as illustrated in FIG. 41 and described in Tables 17A and 17B.

FIG. 44 is a cross-sectional illustration of an example embodiment of a compact lens system 1010 having a first lens component $L_1$ 1001 with refractive power having a convex object-side surface. An aperture stop AS 1014 is applied to the object side of the first lens component $L_1$. The lens system 1010 includes six lens components 1001-1006 with refractive power. The parts of the lens system 1010 are arranged along an optical axis AX of the lens system from the first object side lens component $L_1$ 1001 to the sixth image side lens component $L_6$ 1006 (from left to right in the drawing). The lens system 1010 forms an image at the surface of a photosensor 1018. In some embodiments, an infrared (IR) filter 1016 may be located between the sixth lens component $L_6$ 1006 and the photosensor 1018.

The lens system 1010 may be equipped and used with a standard iris type aperture stop. The lens system 1010 may also be equipped with an electrochromic aperture that comprises a transparent layer of conductive organic polymer or inorganic material having variable light transmittance in response to an applied electrical voltage.

The fourth lens component $L_4$ 1004 of the lens system 1010 has negative refractive power, negative focal length $f_4$, and a concave object side surface. In addition, lens component $L_4$ of lens system 1010 is negative meniscus in shape and has negative vertex radius of curvature $R_7$ and negative vertex radius of curvature $R_8$, where $R_7$ is the radius of the object side surface and where $R_8$ is the radius of the image side surface, the values for both radii being at the optical axis 1012. Further, $R_8 < R_7 - D_7$, where $D_7$ is the thickness of the lens at the optical axis 1012.

Figure 45:
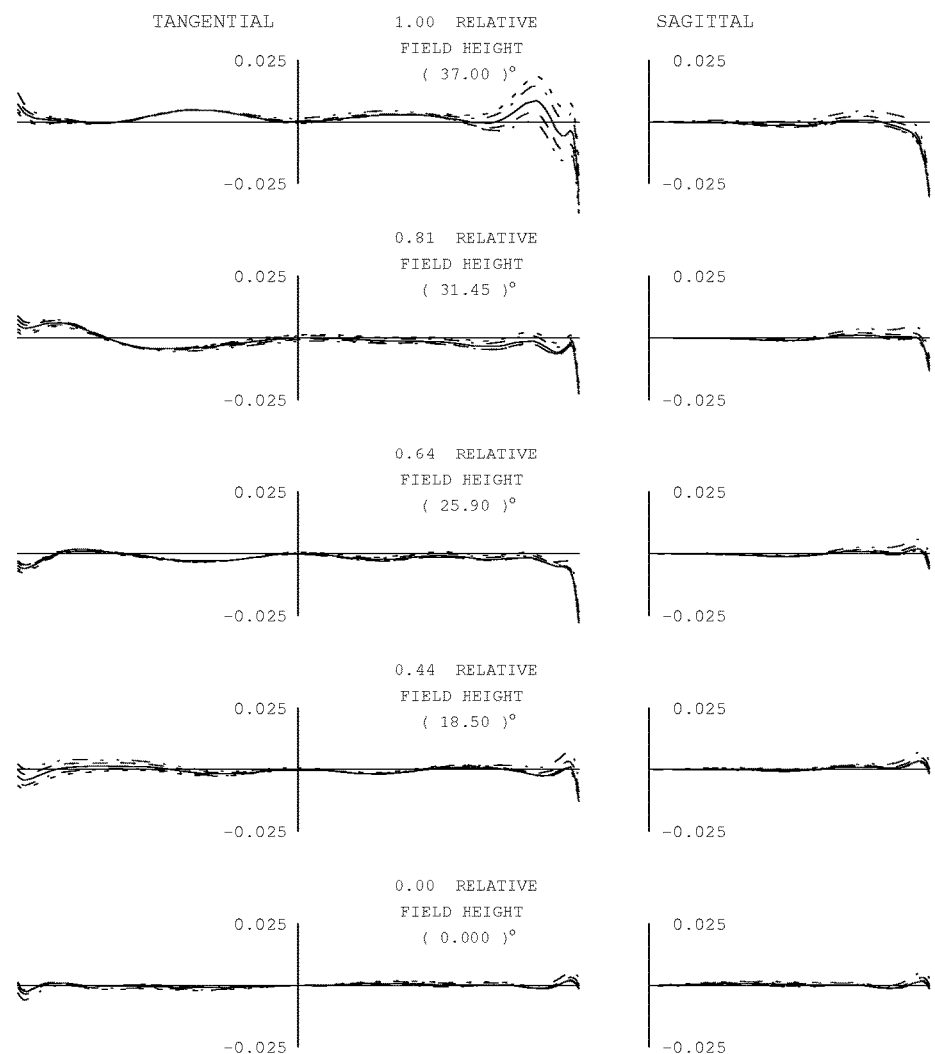
FIG. 45 shows the polychromatic ray aberration curves over the half field of view and over the visible spectral band ranging 470 nm to 650 nm for the lens system illustrated in FIG. 44.

FIG. 45 shows the polychromatic ray aberration curves over the half field of view (HFOV=37.0 degrees) over the visible spectral band ranging from 470 nm to 750 nm for a lens system 1010 as illustrated in FIG. 44 and described in Tables 18A and 18B.

Figure 46:
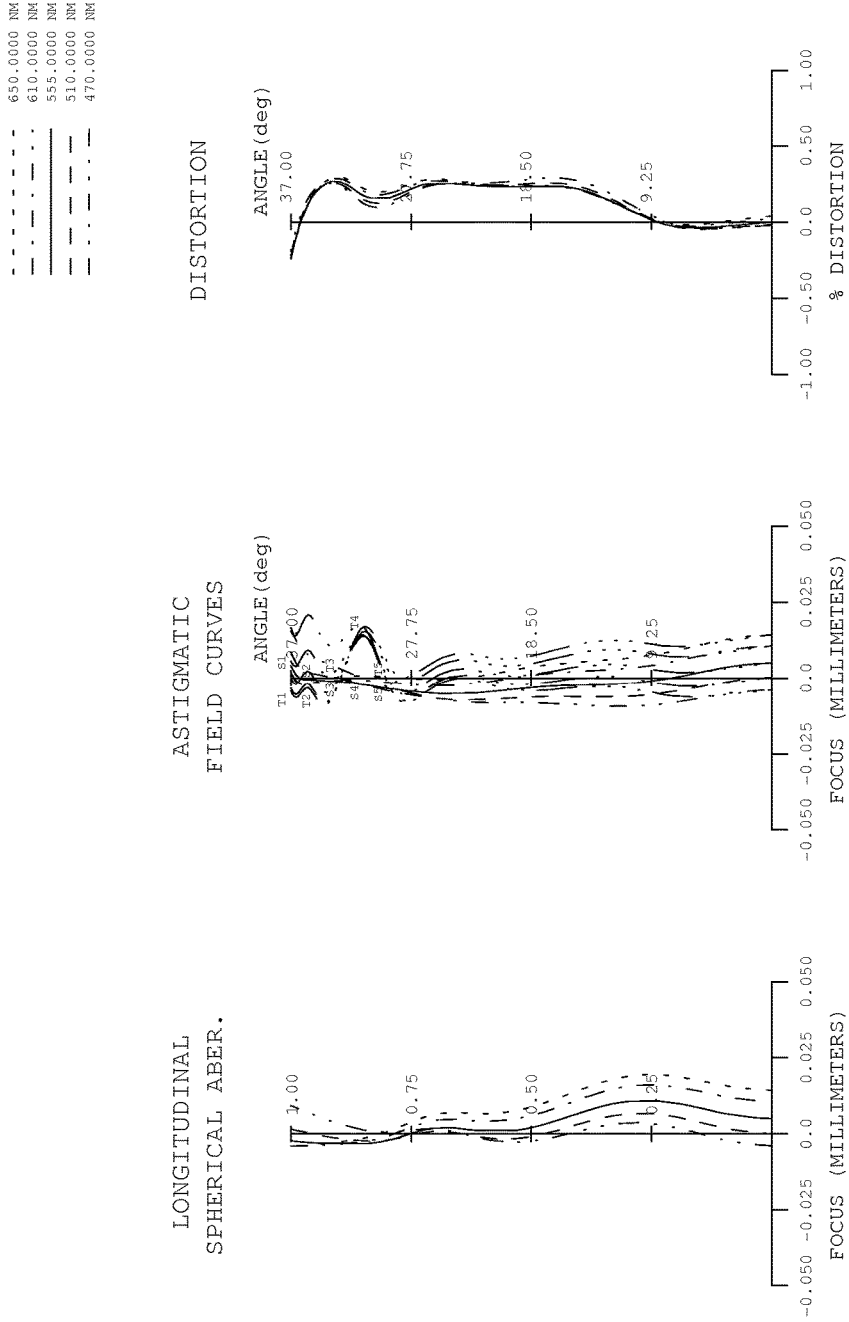
FIG. 46 shows the polychromatic curves of spherical aberration, astigmatism, and distortion over the visible band ranging 470 nm to 650 nm for the lens system illustrated in FIG. 44.

FIG. 46 shows the polychromatic curves for the chromatic variations of spherical aberration, astigmatic field curves, and distortion for the lens system 1010 as illustrated in FIG. 44 and described in Tables 18A and 18B.

FIG. 47 is a cross-sectional illustration of an example embodiment of a compact lens system 1110 having a first lens component $L_1$ 1101 with refractive power having a convex object-side surface. An aperture stop AS 1114 is applied to the object side of the first lens component $L_1$. The lens system 1110 includes six lens components 1101-1106 with refractive power. The parts of the lens system 1110 are arranged along an optical axis AX of the lens system from the first object side lens component $L_1$ 1101 to the sixth image side lens component $L_6$ 1106 (from left to right in the drawing). The lens system 1110 forms an image at the surface of a photosensor 1118. In some embodiments, an infrared (IR) filter 1116 may be located between the sixth lens component $L_6$ 1106 and the photosensor 1118.

The lens system 1110 may be equipped and used with a standard iris type aperture stop. The lens system 1110 may also be equipped with an electrochromic aperture that comprises a transparent layer of conductive organic polymer or inorganic material having variable light transmittance in response to an applied electrical voltage.

The fourth lens component $L_4$ 1104 of the lens system 1110 has positive refractive power, positive focal length $f_4$, and a concave object side surface. In addition, lens component $L_4$ of lens system 1110 is positive meniscus in shape and has negative vertex radii of curvature $R_7$ and $R_8$, where $R_7$ is the radius of the object side surface and where $R_8$ is the radius of the image side surface, the values for both radii being at the optical axis 1112. Further, $R_8 < R_7 - D_7$, where $D_7$ is the thickness of the lens at the optical axis 1112.

Figure 48:
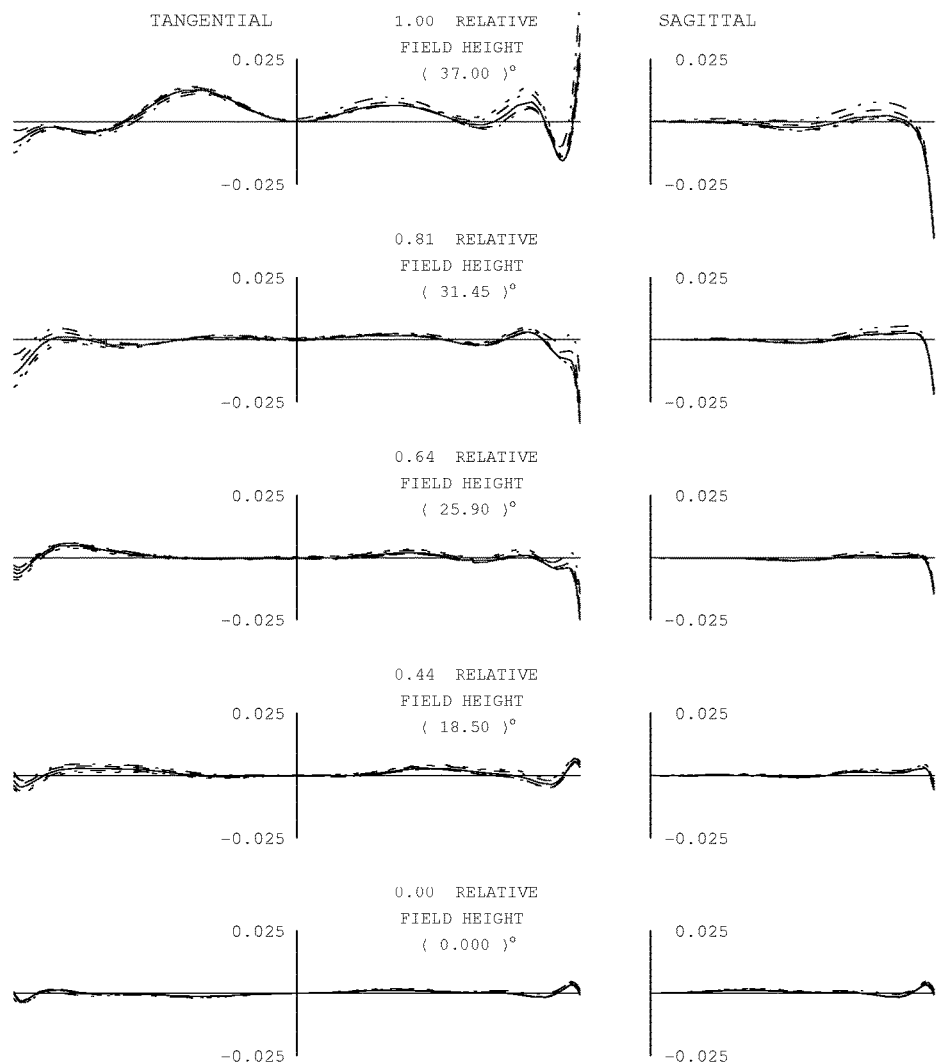
FIG. 48 shows the polychromatic ray aberration curves over the half field of view and over the visible spectral band ranging 470 nm to 650 nm for the lens system illustrated in FIG. 47.

FIG. 48 shows the polychromatic ray aberration curves over the half field of view (HFOV=37.0 degrees) over the visible spectral band ranging from 470 nm to 750 nm for a lens system 1110 as illustrated in FIG. 47 and described in Tables 19A and 19B.

Figure 49:
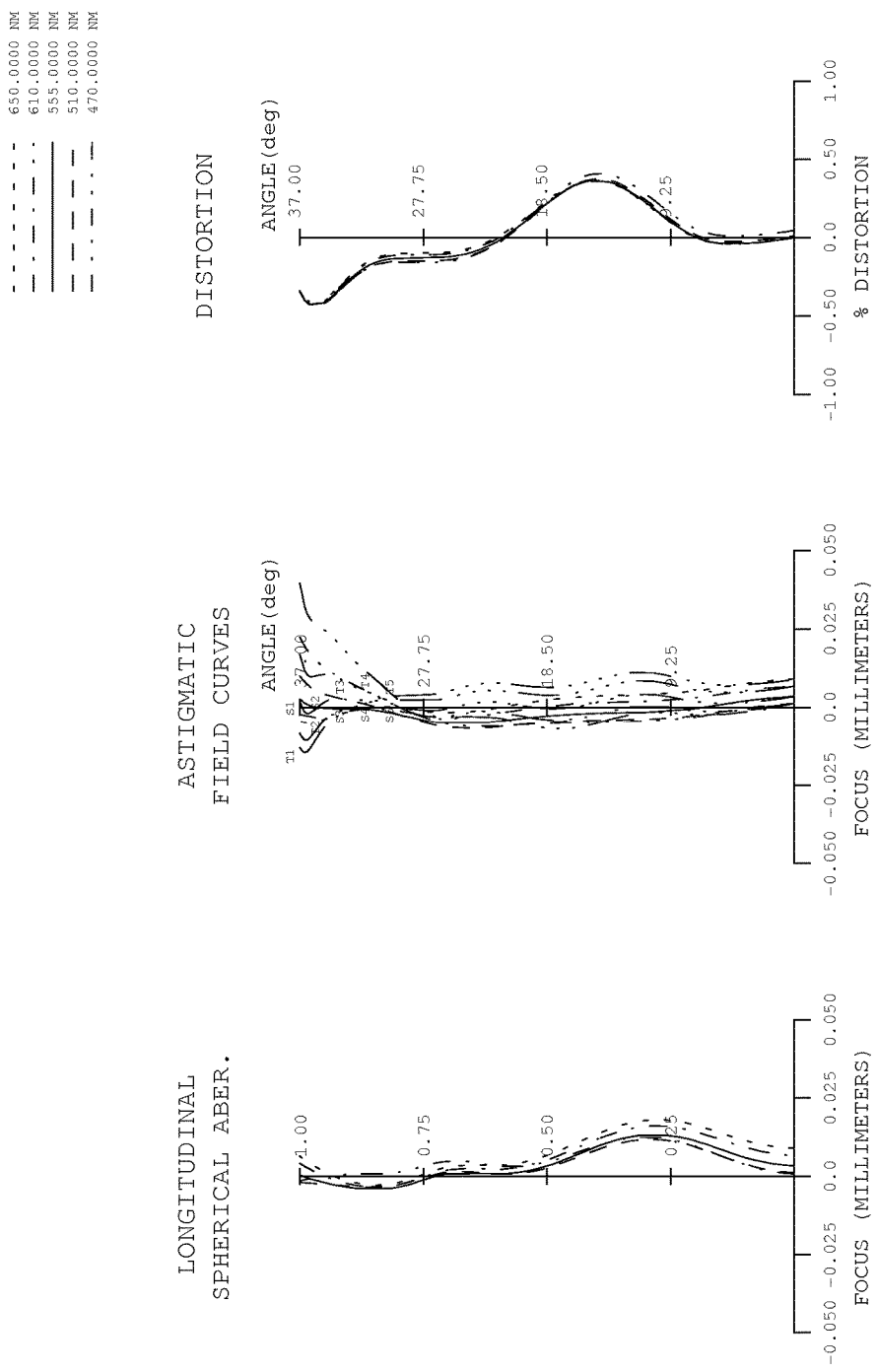
FIG. 49 shows the polychromatic curves of spherical aberration, astigmatism, and distortion over the visible band ranging 470 nm to 650 nm for the lens system illustrated in FIG. 47.

FIG. 49 shows the polychromatic curves for the chromatic variations of spherical aberration, astigmatic field curves, and distortion for the lens system 1110 as illustrated in FIG. 47 and described in Tables 19A and 19B.

The following Tables provide example values for various optical and physical parameters of embodiments of the lens systems as described herein and illustrated in FIGS. 1, 4, 7, 10, 27, 30, 35, 38, 41, 44, and 47. These tables may be described as providing optical prescriptions for the exemplary lens systems. For example, Tables 1A and 1B provide an optical prescription for the example embodiment of the lens system 110 with six lens components as illustrated in FIG. 1.

In the Tables, all dimensions are in millimeters unless otherwise specified. A positive radius indicates that the center of curvature is to the image side of the surface. A negative radius indicates that the center of curvature is to the object side of the surface. "INF" stands for infinity (as used in optics). "ASP" indicates an aspheric surface, and "FLT" indicates a flat surface. The thickness (or separation) is the axial distance from the intersection of a surface with the optical axis to the intersection of the next surface with the optical axis. The design wavelengths represent wavelengths in the spectral band of the imaging system.

For materials of the lens elements, window, wafer substrate, and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d = (N_d - 1)/(N_F - N_C),$$

where $N_F$ and $N_C$ are refractive index values of the material at the F and C lines of hydrogen, respectively.

Referring to the Tables of aspheric constants (Tables 1B, 2B, 3B, 4B, 5B, 6B, 7B, 8B, 9B, 10B, 11B, 12B, 13B, 14B, 15B, 16B, 17B, 18B, and 19B), the aspheric equation describing an aspherical surface may be given by:

$$Z = \frac{cr^2}{1 + \sqrt{1 - (1+K)c^2 r^2}} + Ar^4 + Br^6 + Cr^8 + Dr^{10} + Er^{12} + Fr^{14} + Gr^{16}$$

where Z is the sag of the surface parallel to the Z-axis (for all embodiments the Z-axis coincides with the optical axis);

c is the curvature of the surface (the reciprocal of the radius of curvature of the surface);

K is the conic constant; and

A, B, C, D, E, F, and G are the aspheric coefficients.

In the Tables "E" denotes exponential notation (powers of 10).

Tables 20A and 20B show data for various characteristics of the nineteen embodiments of lens systems described above. These characteristics and combinations of the characteristics may be used to characterize lens systems of the type described herein.

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some of the values in the Tables may be scaled up or down for larger or smaller implementations of a camera using an embodiment of a lens system as described herein.

Further note that the surface numbers ($S_i$) of the elements in the various embodiments of the lens system as shown in the Tables are listed from the first surface 0 at the object plane to the last surface at the image plane. Since number and location of elements may vary in embodiments, the surface number(s) that correspond to some elements may vary in the different Tables. For example, for the lens systems shown in Tables 1A, 2A, . . . , 19A the aperture stop is surface 2 and surface 3 is a dummy surface. The first lens element has surfaces 4 and 5 for the lens systems shown in Tables 1A through 19A. Note that where reference is given to the radius of curvature ($R_i$) of the surfaces of the lens element in this document, the reference ($R_i$) used (e.g., $R_1$ and $R_2$ for the surfaces of the first lens component are the same for all of the embodiments. But these surface numbers may, but do not necessarily, correspond to the surface numbers of the lens components as given in the Tables.

The effective focal length of the lens systems is given by f. The total track length (TTL) of the lens systems is the distance along the optical axis between the object side surface of the first component $L_1$ and the image plane. The lens systems are configured such that the ratio (TTL/f) of the lens systems satisfy the relation:

$$1.2 < TTL/f < 1.4$$

An aperture stop AS, which may be located near the front object side lens component $L_1$, may determine the entrance pupil of the lens system. The lens system focal ratio or f-number is defined as the lens system effective focal length f divided by the entrance pupil diameter. The IR filter 118 may act to block infrared radiation that could damage or adversely affect the photosensor, and may be configured so as to have no effect on f.

Embodiments of the lens systems described herein cover applications in the visible region of the spectrum from 470 nanometers (nm) to 650 nm with a reference wavelength at 555 nm. The optical prescriptions in the following Tables provide high image quality for the stated f-number over 470 nm to 650 nm spectrum.

The six lens components $L_1$, $L_2$, $L_3$, $L_4$, $L_5$, and $L_6$ of the exemplary lens systems may be composed of plastic materials with refractive indices and Abbe numbers as listed in the Tables. In at least some embodiments, three types of plastic materials may be used for the lens components. Lens components $L_1$, $L_3$, and $L_5$ may be composed of a first plastic material with an Abbe number $V_1$ of 55.9, lens components $L_2$, and $L_4$ may be composed of a second plastic material with an Abbe number $V_2$ of 21.5, and lens component $L_6$ may be composed of a third plastic material with an Abbe number $V_3$ of 20.3. In other embodiments, plastic materials with similar Abbe numbers may be used. It is desirable that the Abbe number $V_2$ for the plastic material used for the second lens component $L_2$, which has a negative refractive power, be substantially less than the Abbe numbers for the plastic materials used for the lens component $L_1$. The application of these plastic materials for the lens components allows the lens system to be optimized and corrected for chromatic aberrations over the visible region.

The lens component materials may be chosen and the refractive power distribution of the lens components may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens components and axial separations as illustrated in the Tables to produce well corrected and balanced minimal residual aberrations.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

TABLE 1A

Optical data for embodiment 1 shown in FIGS. 1-3
f = 4.611 mm, Fno = 2.0, HFOV = 37.0 deg, TTL = 5.73 mm

| $S_i$ | Component | | $R_i$ | Shape | $D_i$ | Material | $N_d$ | $V_d$ | $f_i$ |
|---|---|---|---|---|---|---|---|---|---|
| 0 | Object plane | | INF | FLT | INF | | | | |
| 1 | | | INF | FLT | 0.3496 | | | | |
| 2 | Aperture stop | | INF | FLT | −0.3496 | | | | |
| 3 | | | INF | FLT | 0.0000 | | | | |
| 4 | $L_1$ | $R_1$ | 1.953 | ASP | 0.8134 | Plastic | 1.545 | 55.9 | 3.41 |
| 5 | | $R_2$ | −35.805 | ASP | 0.1000 | | | | |
| 6 | $L_2$ | $R_3$ | 28.958 | ASP | 0.3000 | Plastic | 1.636 | 23.9 | −6.22 |
| 7 | | $R_4$ | 3.485 | ASP | 0.6396 | | | | |
| 8 | $L_3$ | $R_5$ | 104.878 | ASP | 0.3169 | Plastic | 1.636 | 23.9 | −15.79 |
| 9 | | $R_6$ | 9.209 | ASP | 0.3457 | | | | |
| 10 | $L_4$ | $R_7$ | −17.000 | ASP | 0.8135 | Plastic | 1.545 | 55.9 | 5.11 |
| 11 | | $R_8$ | −2.439 | ASP | 0.1000 | | | | |
| 12 | $L_5$ | $R_9$ | 2.760 | ASP | 0.5019 | Plastic | 1.545 | 55.9 | 22.54 |
| 13 | | $R_{10}$ | 3.327 | ASP | 0.7426 | | | | |

TABLE 1A-continued

Optical data for embodiment 1 shown in FIGS. 1-3
f = 4.611 mm, Fno = 2.0, HFOV = 37.0 deg, TTL = 5.73 mm

| $S_i$ | Component | $R_i$ | | Shape | $D_i$ | Material | $N_d$ | $V_d$ | $f_l$ |
|---|---|---|---|---|---|---|---|---|---|
| 14 | $L_6$ | $R_{11}$ | -3.644 | ASP | 0.3000 | Plastic | 1.545 | 55.9 | -3.75 |
| 15 | | $R_{12}$ | 4.827 | ASP | 0.2064 | | | | |
| 16 | IR filter | | INF | FLT | 0.2000 | Glass | 1.516 | 64.1 | |
| 17 | | | INF | FLT | 0.3500 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 1B

Aspheric coefficients for embodiment 1

| $S_i$ | c | K | A | B | C | D | E | F |
|---|---|---|---|---|---|---|---|---|
| 4 | 0.51215583 | 0.0 | -6.22186E-03 | 2.56886E-02 | -4.41762E-02 | 3.47723E-02 | -1.18063E-02 | -3.54476E-06 |
| 5 | -0.02792902 | 0.0 | -1.77637E-02 | 4.93445E-02 | -6.81777E-02 | 3.65615E-02 | -1.01079E-02 | 1.94964E-06 |
| 6 | 0.03453259 | 0.0 | -3.86336E-02 | 7.65510E-02 | -7.15564E-02 | 2.98014E-02 | -4.57737E-03 | 1.97386E-05 |
| 7 | 0.28696662 | 0.0 | -3.70155E-02 | 7.92813E-02 | -6.68370E-02 | 3.61894E-02 | -9.53074E-03 | 2.52152E-03 |
| 8 | 0.009534824 | 0.0 | -1.73628E-01 | 3.52402E-02 | -3.03502E-02 | 1.10928E-02 | 2.89642E-05 | 1.22749E-03 |
| 9 | 0.10859184 | 0.0 | -1.37754E-01 | 1.63612E-02 | -9.04764E-03 | 5.95846E-03 | 5.60164E-04 | 3.53769E-04 |
| 10 | -0.05882255 | 0.0 | 5.52749E-02 | -5.33694E-02 | 2.56478E-02 | -5.75586E-03 | 4.81004E-04 | -2.57398E-06 |
| 11 | -0.41000680 | 0.0 | 1.61621E-02 | 8.84089E-03 | 1.52284E-05 | -8.86007E-04 | 7.06845E-05 | 2.09455E-06 |
| 12 | 0.36237030 | 0.0 | -7.16539E-02 | 1.15639E-02 | -1.15518E-03 | 3.03765E-06 | 0.00000E+00 | 1.55783E-07 |
| 13 | 0.30052753 | 0.0 | -3.63239E-02 | 1.15801E-03 | 4.03651E-04 | -9.72538E-05 | 5.44770E-06 | |
| 14 | -0.27440039 | 0.0 | 5.07894E-03 | 9.27212E-04 | 1.80459E-04 | -2.91703E-05 | 1.18530E-06 | |
| 15 | 0.20718610 | 0.0 | -3.26260E-02 | 3.02682E-03 | -8.31514E-05 | -1.03408E-06 | | |

TABLE 2A

Optical data for embodiment 2 shown in FIGS. 4-6
f = 4.624 mm, Fno = 2.0, HFOV = 37.0 deg, TTL = 5.74 mm

| $S_i$ | Component | $R_i$ | | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3562 | | | | |
| 2 | Aperture stop | | INF | FLT | -0.3562 | | | | |
| 3 | | | INF | FLT | 0.0000 | | | | |
| 4 | $L_1$ | $R_1$ | 1.966 | ASP | 0.7834 | Plastic | 1.545 | 55.9 | 3.46 |
| 5 | | $R_2$ | -42.957 | ASP | 0.1000 | | | | |
| 6 | $L_2$ | $R_3$ | 29.799 | ASP | 0.3000 | Plastic | 1.636 | 23.9 | -6.76 |
| 7 | | $R_4$ | 3.772 | ASP | 0.5870 | | | | |
| 8 | $L_3$ | $R_5$ | -23.882 | ASP | 0.4049 | Plastic | 1.651 | 21.5 | -12.78 |
| 9 | | $R_6$ | 13.021 | ASP | 0.2475 | | | | |
| 10 | $L_4$ | $R_7$ | -78.695 | ASP | 0.8688 | Plastic | 1.545 | 55.9 | 4.38 |
| 11 | | $R_8$ | -2.333 | ASP | 0.2461 | | | | |
| 12 | $L_5$ | $R_9$ | 3.314 | ASP | 0.4143 | Plastic | 1.651 | 21.5 | -797.30 |
| 13 | | $R_{10}$ | 3.130 | ASP | 0.7994 | | | | |
| 14 | $L_6$ | $R_{11}$ | -3.572 | ASP | 0.2506 | Plastic | 1.545 | 55.9 | -3.94 |
| 15 | | $R_{12}$ | 5.567 | ASP | 0.1769 | | | | |
| 16 | IR filter | | INF | FLT | 0.2000 | Glass | 1.516 | 64.1 | |
| 17 | | | INF | FLT | 0.3597 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 2B

Aspheric coefficients for embodiment 2

| $S_i$ | c | K | A | B | C |
|---|---|---|---|---|---|
| 4 | 0.50858044 | 0.0 | −5.36724E−03 | 2.89358E−02 | −4.55486E−02 |
| 5 | −0.02327896 | 0.0 | −1.05092E−02 | 5.14227E−02 | −7.15478E−02 |
| 6 | 0.03355826 | 0.0 | −3.97462E−02 | 8.50386E−02 | −9.26271E−02 |
| 7 | 0.26511997 | 0.0 | −4.79206E−02 | 7.66237E−02 | −7.51621E−02 |
| 8 | −0.04187334 | 0.0 | −1.66297E−01 | 4.63581E−02 | −4.63558E−02 |
| 9 | 0.07679793 | 0.0 | −1.41433E−01 | 2.40648E−02 | −7.84673E−03 |
| 10 | −0.01270736 | 0.0 | 1.42854E−02 | −3.33569E−02 | 2.25707E−02 |
| 11 | −0.42861563 | 0.0 | 2.88205E−02 | 5.48461E−03 | 1.92036E−03 |
| 12 | 0.30177222 | 0.0 | −4.99219E−02 | 1.50896E−02 | 2.58066E−04 |
| 13 | 0.31951101 | 0.0 | −4.00356E−02 | −1.14274E−03 | 9.57302E−04 |
| 14 | −0.27993880 | 0.0 | −1.83417E−03 | 2.43950E−03 | 5.70710E−05 |
| 15 | 0.17963705 | 0.0 | −3.77775E−02 | 5.16416E−03 | −4.88564E−04 |

TABLE 2B-continued

Aspheric coefficients for embodiment 2

| $S_i$ | D | E | F |
|---|---|---|---|
| 4 | 3.24537E−02 | −7.24561E−03 | −1.50016E−03 |
| 5 | 3.89137E−02 | −9.13833E−03 | −1.17111E−03 |
| 6 | 4.03063E−02 | −3.97028E−03 | −1.59713E−03 |
| 7 | 3.38516E−02 | −6.95319E−03 | 9.54424E−04 |
| 8 | 1.08582E−02 | 9.11952E−04 | 1.70092E−03 |
| 9 | 2.77432E−03 | 1.82978E−05 | 7.29653E−04 |
| 10 | −6.22768E−03 | 6.42119E−04 | −9.58322E−06 |
| 11 | −9.76727E−04 | 9.92123E−05 | −8.71029E−07 |
| 12 | 1.72875E−05 | 0.00000E+00 | −1.64134E−06 |
| 13 | −1.09090E−04 | 3.10312E−06 | |
| 14 | −3.04506E−05 | 1.56825E−06 | |
| 15 | 1.92820E−05 | | |

TABLE 3A

Optical data for embodiment 3 shown in FIGS. 7-9
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_i$ |
|---|---|---|---|---|---|---|---|---|---|
| 0 | Object plane | | INF | FLT | INF | | | | |
| 1 | | | INF | FLT | 0.3413 | | | | |
| 2 | Aperture stop | | INF | FLT | −0.3413 | | | | |
| 3 | | | INF | FLT | 0.0000 | | | | |
| 4 | $L_1$ | $R_1$ | 1.969 | ASP | 0.8134 | Plastic | 1.545 | 55.9 | 3.43 |
| 5 | | $R_2$ | −33.830 | ASP | 0.1000 | | | | |
| 6 | $L_2$ | $R_3$ | 5.813 | ASP | 0.3000 | Plastic | 1.636 | 23.9 | −5.70 |
| 7 | | $R_4$ | 2.198 | ASP | 0.5341 | | | | |
| 8 | $L_3$ | $R_5$ | 5.606 | ASP | 0.3089 | Plastic | 1.636 | 23.9 | −14.89 |
| 9 | | $R_6$ | 3.454 | ASP | 0.1332 | | | | |
| 10 | $L_4$ | $R_7$ | 26.735 | ASP | 1.1252 | Plastic | 1.545 | 55.9 | 3.38 |
| 11 | | $R_8$ | −1.957 | ASP | 0.1000 | | | | |
| 12 | $L_5$ | $R_9$ | 2.788 | ASP | 0.3715 | Plastic | 1.545 | 55.9 | 21.26 |
| 13 | | $R_{10}$ | 3.495 | ASP | 0.5180 | | | | |
| 14 | $L_6$ | $R_{11}$ | −3.179 | ASP | 0.3000 | Plastic | 1.545 | 55.9 | −3.03 |
| 15 | | $R_{12}$ | 3.565 | ASP | 0.2456 | | | | |
| 16 | IR filter | | INF | FLT | 0.2000 | Glass | 1.516 | 64.1 | |
| 17 | | | INF | FLT | 0.3500 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_i$: focal length of lens component at 555 nm
Design wavelengths: 650 nm, 610 nm, 555 nm, 510 nm, 470 nm

TABLE 3B

Aspheric coefficients for embodiment 3

| $S_i$ | c | K | A | B | C |
|---|---|---|---|---|---|
| 4 | 0.50783797 | 0.02016702 | −3.59661E−03 | 2.52594E−02 | −4.14937E−02 |
| 5 | −0.02955952 | 0.0 | 5.20255E−04 | 4.33916E−02 | −7.11121E−02 |
| 6 | 0.17202531 | 0.0 | −6.49302E−02 | 8.88387E−02 | −1.02994E−01 |
| 7 | 0.45506172 | 0.0 | −8.44552E−02 | 1.05391E−01 | −9.67226E−02 |
| 8 | 0.17839523 | 0.0 | −1.73279E−01 | 6.10293E−02 | −2.87821E−02 |
| 9 | 0.28948625 | 0.0 | −1.37350E−01 | 2.98514E−02 | −1.52385E−02 |
| 10 | 0.03740462 | 0.0 | 4.67301E−02 | −5.20194E−02 | 2.65979E−02 |
| 11 | −0.51107653 | −0.21048952 | 2.93453E−03 | 1.80144E−02 | 9.70485E−04 |
| 12 | 0.35869242 | 0.09002481 | −8.53255E−02 | 6.28291E−03 | −1.05222E−03 |
| 13 | 0.28611833 | 0.02906876 | −3.58238E−02 | −3.25667E−03 | 5.51260E−04 |
| 14 | −0.31453091 | −0.04848546 | 1.80946E−02 | 1.40778E−03 | 1.61531E−05 |
| 15 | 0.28048468 | −0.51560028 | −4.63653E−02 | 5.71134E−03 | −3.57998E−04 |

TABLE 3B-continued

Aspheric coefficients for embodiment 3

| $S_i$ | D | E | F |
|---|---|---|---|
| 4 | 3.45296E−02 | −1.18063E−02 | −3.53084E−06 |
| 5 | 3.69675E−02 | −1.01080E−02 | 1.91494E−06 |
| 6 | 3.92539E−02 | −4.57733E−03 | 1.97451E−05 |
| 7 | 4.44084E−02 | −9.53076E−03 | 2.52151E−03 |
| 8 | 4.77885E−03 | 2.89613E−05 | 1.22749E−03 |
| 9 | 4.99050E−03 | −2.08023E−04 | 2.84575E−04 |
| 10 | −5.92257E−03 | 4.38320E−04 | 7.55832E−06 |
| 11 | −9.48561E−04 | 6.59576E−05 | 2.04419E−06 |
| 12 | −2.20717E−04 | 7.75941E−06 | 6.93371E−06 |
| 13 | −4.72371E−05 | 5.66077E−06 | |
| 14 | −3.07030E−05 | 2.29236E−06 | |
| 15 | 1.08825E−05 | | |

TABLE 4A

Optical data for embodiment 4, (Example-A) shown in FIGS. 10-12
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3553 | | | | |
| 2 | Aperture stop | | INF | FLT | −0.3553 | | | | |
| 3 | | | INF | FLT | 0.0000 | | | | |
| 4 | $L_1$ | $R_1$ | 1.941 | ASP | 0.7614 | Plastic | 1.545 | 55.9 | 3.39 |
| 5 | | $R_2$ | −36.283 | ASP | 0.0552 | | | | |
| 6 | $L_2$ | $R_3$ | 7.967 | ASP | 0.2496 | Plastic | 1.651 | 21.5 | −7.28 |
| 7 | | $R_4$ | 2.948 | ASP | 0.5883 | | | | |
| 8 | $L_3$ | $R_5$ | −10.013 | ASP | 0.4074 | Plastic | 1.651 | 21.5 | −23.52 |
| 9 | | $R_6$ | −28.985 | ASP | 0.2314 | | | | |
| 10 | $L_4$ | $R_7$ | −8.605 | ASP | 0.9789 | Plastic | 1.545 | 55.9 | 3.22 |
| 11 | | $R_8$ | −1.521 | ASP | 0.1000 | | | | |
| 12 | $L_5$ | $R_9$ | 1.707 | ASP | 0.3280 | Plastic | 1.545 | 55.9 | −8.04 |
| 13 | | $R_{10}$ | 1.146 | ASP | 0.7000 | | | | |
| 14 | $L_6$ | $R_{11}$ | −20.915 | ASP | 0.3000 | Plastic | 1.651 | 21.5 | −4.45 |
| 15 | | $R_{12}$ | 3.414 | ASP | 0.4000 | | | | |
| 16 | IR filter | | INF | FLT | 0.2000 | Glass | 1.516 | 64.1 | |
| 17 | | | INF | FLT | 0.1000 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 4B

Aspheric coefficients for embodiment 4

| $S_i$ | c | K | A | B | C |
|---|---|---|---|---|---|
| 4 | 0.51507081 | −0.96029612 | 1.06621E−02 | 2.28540E−02 | −3.44085E−02 |
| 5 | −0.02756118 | 0.0 | −4.67213E−02 | 1.16537E−01 | −1.27380E−01 |
| 6 | 0.12552148 | 0.0 | −1.09395E−01 | 1.82678E−01 | −1.67266E−01 |
| 7 | 0.33916220 | −6.57965903 | −6.74152E−02 | 1.17267E−01 | −1.44303E−01 |
| 8 | −0.09987112 | 0.0 | −1.52027E−01 | 2.81958E−03 | −4.32357E−02 |
| 9 | −0.03450105 | 0.0 | −1.17998E−01 | 1.99223E−02 | 1.73031E−02 |
| 10 | −0.11621745 | 0.0 | 2.31168E−03 | −4.27835E−02 | 5.60979E−02 |
| 11 | −0.65740292 | −1.00573554 | 4.30605E−02 | −2.39527E−02 | 1.60921E−02 |
| 12 | 0.58589093 | −0.72864026 | −1.72928E−01 | 4.47202E−02 | −8.31664E−03 |
| 13 | 0.87282599 | −2.97221686 | −7.89806E−02 | 2.06849E−02 | −4.64431E−03 |
| 14 | −0.04781308 | 0.0 | −5.92696E−02 | 1.73435E−02 | −2.04191E−03 |
| 15 | 0.29292224 | 0.25877650 | −9.78294E−02 | 2.08694E−02 | −2.12019E−03 |

TABLE 4B-continued

Aspheric coefficients for embodiment 4

| $S_i$ | D | E | F |
|---|---|---|---|
| 4 | 2.67534E−02 | −9.43970E−03 | |
| 5 | 5.65657E−02 | −9.67451E−03 | |
| 6 | 5.84631E−02 | 4.60642E−03 | −4.14885E−03 |
| 7 | 8.19249E−02 | −2.32324E−02 | −9.08682E−04 |
| 8 | 1.48271E−02 | −1.15846E−02 | 7.82347E−03 |
| 9 | −1.30882E−02 | 7.02630E−03 | 2.23444E−05 |
| 10 | −2.60227E−02 | 5.45489E−03 | −4.13452E−04 |
| 11 | −3.81208E−03 | 3.36683E−04 | −1.43314E−05 |
| 12 | 5.97763E−04 | 2.88314E−05 | −4.10926E−06 |
| 13 | 5.42137E−04 | −3.00720E−05 | −8.71126E−08 |
| 14 | 6.70449E−05 | | |
| 15 | 6.90733E−05 | −4.82619E−08 | |

TABLE 5A

Optical data for embodiment 5 (Example-B) plots shown in FIGS. 13-14
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3553 | | | | |
| 2 | Aperture stop | | INF | FLT | −0.3553 | | | | |
| 3 | | | INF | FLT | 0.0000 | | | | |
| 4 | $L_1$ | $R_1$ | 1.938 | ASP | 0.7542 | Plastic | 1.545 | 55.9 | 3.52 |
| 5 | | $R_2$ | −279.108 | ASP | 0.0584 | | | | |
| 6 | $L_2$ | $R_3$ | 6.237 | ASP | 0.2499 | Plastic | 1.661 | 20.3 | −8.07 |
| 7 | | $R_4$ | 2.842 | ASP | 0.5973 | | | | |
| 8 | $L_3$ | $R_5$ | −9.606 | ASP | 0.4213 | Plastic | 1.661 | 20.3 | −25.05 |
| 9 | | $R_6$ | −22.998 | ASP | 0.2192 | | | | |
| 10 | $L_4$ | $R_7$ | −7.875 | ASP | 0.9716 | Plastic | 1.545 | 55.9 | 3.24 |
| 11 | | $R_8$ | −1.508 | ASP | 0.1000 | | | | |
| 12 | $L_5$ | $R_9$ | 1.677 | ASP | 0.3277 | Plastic | 1.545 | 55.9 | −7.92 |
| 13 | | $R_{10}$ | 1.125 | ASP | 0.7000 | | | | |
| 14 | $L_6$ | $R_{11}$ | −19.992 | ASP | 0.3003 | Plastic | 1.661 | 20.3 | −4.46 |
| 15 | | $R_{12}$ | 3.516 | ASP | 0.3979 | | | | |
| 16 | IR filter | | INF | FLT | 0.2000 | Glass | 1.516 | 64.1 | |
| 17 | | | INF | FLT | 0.1022 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 5B

Aspheric coefficients for embodiment 5

| $S_i$ | c | K | A | B | C |
|---|---|---|---|---|---|
| 4 | 0.51597061 | −0.99904035 | 1.12162E−02 | 2.29458E−02 | −3.46366E−02 |
| 5 | −0.00358285 | 0.0 | −5.55912E−02 | 1.22202E−01 | −1.28426E−01 |
| 6 | 0.16032307 | 0.0 | −1.15208E−01 | 1.82040E−01 | −1.64156E−01 |
| 7 | 0.35182077 | −7.43677900 | −5.67913E−02 | 1.08525E−01 | −1.39487E−01 |
| 8 | −0.10409802 | 0.0 | −1.44848E−01 | 3.62381E−03 | −4.61813E−02 |
| 9 | −0.04348264 | 0.0 | −1.17730E−01 | 4.31281E−03 | 1.71347E−02 |
| 10 | −0.12699026 | 0.0 | −6.85838E−03 | −3.74255E−02 | 5.60791E−02 |
| 11 | −0.66330647 | −1.00513346 | 4.02467E−02 | −2.25950E−02 | 1.60169E−02 |
| 12 | 0.59635673 | −0.65368331 | −1.79684E−01 | 4.60451E−02 | −8.37857E−03 |
| 13 | 0.88875281 | −2.85958795 | −8.47209E−02 | 2.24728E−02 | −4.74926E−03 |
| 14 | −0.05002125 | 0.0 | −6.25391E−02 | 1.78586E−02 | −2.02407E−03 |
| 15 | 0.28441048 | 0.35039858 | −1.02038E−01 | 2.28759E−02 | −2.51562E−03 |

TABLE 5B-continued

Aspheric coefficients for embodiment 5

| $S_i$ | D | E | F | G |
|---|---|---|---|---|
| 4 | 2.70135E−02 | −9.43970E−03 | | |
| 5 | 5.62143E−02 | −9.67450E−03 | | |
| 6 | 5.66138E−02 | 4.60642E−03 | −4.14886E−03 | |
| 7 | 8.04990E−02 | −2.32324E−02 | −9.08671E−04 | |
| 8 | 1.48550E−02 | −1.15846E−02 | 7.82339E−03 | |
| 9 | −1.56299E−02 | 8.51360E−03 | −2.47529E−04 | |
| 10 | −2.63700E−02 | 5.43301E−03 | −3.80092E−04 | −1.41741E−05 |
| 11 | −3.83273E−03 | 3.37319E−04 | −1.44718E−05 | 3.26222E−07 |
| 12 | 5.62551E−04 | 2.33829E−05 | −3.09539E−06 | |
| 13 | 4.36033E−04 | 1.53257E−08 | −2.50289E−06 | |
| 14 | 6.59271E−05 | | | |
| 15 | 1.08314E−04 | −1.56224E−06 | | |

TABLE 6A

Optical data for embodiment 6 (Example-C) plots shown in FIGS. 15-16
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3553 | | | | |
| 2 | Aperture stop | | INF | FLT | −0.3553 | | | | |
| 3 | | | INF | FLT | 0.0000 | | | | |
| 4 | $L_1$ | $R_1$ | 1.940 | ASP | 0.7603 | Plastic | 1.545 | 55.9 | 3.39 |
| 5 | | $R_2$ | −36.096 | ASP | 0.0555 | | | | |
| 6 | $L_2$ | $R_3$ | 8.536 | ASP | 0.2494 | Plastic | 1.651 | 21.5 | −7.37 |
| 7 | | $R_4$ | 3.052 | ASP | 0.5868 | | | | |
| 8 | $L_3$ | $R_5$ | −9.847 | ASP | 0.4081 | Plastic | 1.651 | 21.5 | −21.95 |
| 9 | | $R_6$ | −31.622 | ASP | 0.2350 | | | | |
| 10 | $L_4$ | $R_7$ | −8.592 | ASP | 0.9771 | Plastic | 1.545 | 55.9 | 3.22 |
| 11 | | $R_8$ | −1.518 | ASP | 0.1000 | | | | |
| 12 | $L_5$ | $R_9$ | 1.694 | ASP | 0.3280 | Plastic | 1.545 | 55.9 | −8.03 |
| 13 | | $R_{10}$ | 1.138 | | 0.7000 | | | | |
| 14 | $L_6$ | $R_{11}$ | −23.777 | ASP | 0.3000 | Plastic | 1.651 | 21.5 | −4.44 |
| 15 | | $R_{12}$ | 3.337 | ASP | 0.3993 | | | | |
| 16 | IR filter | | INF | FLT | 0.2000 | Glass | 1.516 | 64.1 | |
| 17 | | | INF | FLT | 0.1007 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 6B

Aspheric coefficients for embodiment 6

| $S_i$ | c | K | A | B | C |
|---|---|---|---|---|---|
| 4 | 0.51538287 | −1.01719999 | 1.11615E−02 | 2.25969E−02 | −3.39630E−02 |
| 5 | −0.02770365 | 0.0 | −4.99919E−02 | 1.23123E−01 | −1.33803E−01 |
| 6 | 0.11714862 | 0.0 | −1.09880E−01 | 1.90070E−01 | −1.74945E−01 |
| 7 | 0.32769345 | −7.88834471 | −6.39827E−02 | 1.19103E−01 | −1.48537E−01 |
| 8 | −0.10155240 | 0.0 | −1.51022E−01 | −2.25315E−03 | −3.59861E−02 |
| 9 | −0.03162362 | 0.0 | −1.13607E−01 | −2.69191E−03 | 2.13892E−02 |
| 10 | −0.11638499 | 0.0 | 5.81867E−03 | −4.52491E−02 | 5.63640E−02 |
| 11 | −0.65884861 | −1.08946899 | 3.99999E−02 | −2.42435E−02 | 1.58975E−02 |
| 12 | 0.59045649 | −0.98080051 | −1.65554E−01 | 4.41478E−02 | −8.67494E−03 |
| 13 | 0.87838626 | −2.97781270 | −7.52257E−02 | 1.81134E−02 | −3.93292E−03 |
| 14 | −0.04205771 | 0.0 | −6.51453E−02 | 2.09235E−02 | −2.76858E−03 |
| 15 | 0.29969906 | 0.17530480 | −1.02815E−01 | 2.27664E−02 | −2.33918E−03 |

TABLE 6B-continued

Aspheric coefficients for embodiment 6

| $S_i$ | D | E | F | G |
|---|---|---|---|---|
| 4 | 2.63164E−02 | −9.43972E−03 | | |
| 5 | 5.86638E−02 | −9.67446E−03 | | |
| 6 | 6.13289E−02 | 4.60636E−03 | −4.14892E−03 | |
| 7 | 8.40812E−02 | −2.32323E−02 | −9.08576E−04 | |
| 8 | 1.20301E−02 | −1.15847E−02 | 7.82243E−03 | |
| 9 | −1.41025E−02 | 6.80895E−03 | 2.23415E−05 | |
| 10 | −2.59155E−02 | 5.45974E−03 | −4.15606E−04 | −1.11538E−05 |
| 11 | −3.78679E−03 | 3.71462E−04 | −1.42129E−05 | −8.87181E−07 |
| 12 | 7.34248E−04 | 3.34982E−05 | −6.22002E−06 | |
| 13 | 4.41340E−04 | −2.37710E−05 | 2.17921E−08 | |
| 14 | 1.15590E−04 | | | |
| 15 | 6.84689E−05 | 9.51322E−07 | | |

TABLE 7A

Optical data for embodiment 7 (Example-D) plots shown in FIGS. 17-18
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3700 | | | | |
| 2 | Aperture stop | | INF | FLT | −0.3700 | | | | |
| 3 | | | INF | FLT | 0.0000 | | | | |
| 4 | $L_1$ | $R_1$ | 1.932 | ASP | 0.7605 | Plastic | 1.545 | 55.9 | 3.35 |
| 5 | | $R_2$ | −30.408 | ASP | 0.0490 | | | | |
| 6 | $L_2$ | $R_3$ | 8.873 | ASP | 0.2492 | Plastic | 1.645 | 22.5 | −6.85 |
| 7 | | $R_4$ | 2.932 | ASP | 0.5836 | | | | |
| 8 | $L_3$ | $R_5$ | −10.319 | ASP | 0.3237 | Plastic | 1.645 | 22.5 | −18.41 |
| 9 | | $R_6$ | −76.014 | ASP | 0.2746 | | | | |
| 10 | $L_4$ | $R_7$ | −13.555 | ASP | 1.0637 | Plastic | 1.545 | 55.9 | 2.96 |
| 11 | | $R_8$ | −1.485 | ASP | 0.1000 | | | | |
| 12 | $L_5$ | $R_9$ | 1.558 | ASP | 0.2958 | Plastic | 1.545 | 55.9 | −7.24 |
| 13 | | $R_{10}$ | 1.043 | ASP | 0.7000 | | | | |
| 14 | $L_6$ | $R_{11}$ | −20.945 | ASP | 0.3000 | Plastic | 1.645 | 22.5 | −4.41 |
| 15 | | $R_{12}$ | 3.339 | ASP | 0.4501 | | | | |
| 16 | IR filter | | INF | FLT | 0.1500 | Glass | 1.563 | 51.3 | |
| 17 | | | INF | FLT | 0.1000 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 7B

Aspheric coefficients for embodiment 7

| $S_i$ | c | K | A | B | C |
|---|---|---|---|---|---|
| 4 | 0.51762104 | −0.87743643 | 1.22521E−02 | 2.17403E−02 | −3.25419E−02 |
| 5 | −0.03288615 | 0.0 | −4.27686E−02 | 1.18239E−01 | −1.24407E−01 |
| 6 | 0.11269996 | 0.0 | −1.14626E−01 | 1.91085E−01 | −1.68703E−01 |
| 7 | 0.34106619 | 0.36111447 | −1.07722E−01 | 1.26805E−01 | −1.41484E−01 |
| 8 | −0.09690530 | 0.0 | −1.80596E−01 | 3.67533E−03 | −3.43464E−02 |
| 9 | −0.01315542 | 0.0 | −1.46967E−01 | 1.26670E−01 | 1.98179E−02 |
| 10 | −0.07377471 | 0.0 | −8.28368E−03 | −4.11375E−02 | 5.56183E−02 |
| 11 | −0.67343381 | −0.97356423 | 4.24073E−02 | −2.62873E−02 | 1.52715E−02 |
| 12 | 0.64172858 | −0.95767362 | −1.95094E−01 | 5.45121E−02 | −9.32631E−03 |
| 13 | 0.95867882 | −2.60522549 | −9.69612E−02 | 2.89940E−02 | −6.14882E−03 |
| 14 | −0.04774353 | 0.0 | −5.44799E−02 | 1.54203E−02 | −1.66724E−03 |
| 15 | 0.29946494 | −0.41226988 | −1.00604E−01 | 2.25254E−02 | −2.36481E−03 |

TABLE 7B-continued

Aspheric coefficients for embodiment 7

| $S_i$ | D | E | F | G |
|---|---|---|---|---|
| 4 | 2.71999E−02 | −9.58905E−03 | | |
| 5 | 5.33917E−02 | −9.37818E−03 | | |
| 6 | 5.53293E−02 | 4.62964E−03 | −4.12831E−03 | |
| 7 | 7.69070E−02 | −2.32784E−02 | −9.33235E−04 | |
| 8 | 1.43114E−02 | −1.15152E−02 | 7.83577E−03 | |
| 9 | −1.46197E−02 | 9.39449E−03 | −5.52287E−04 | |
| 10 | −2.61061E−02 | 5.44545E−03 | −3.57671E−04 | −2.25798E−05 |
| 11 | −3.62970E−03 | 4.06063E−04 | −1.19223E−05 | −2.93637E−06 |
| 12 | 5.18131E−04 | 3.35516E−05 | −2.63323E−06 | |
| 13 | 5.78054E−04 | −2.62765E−06 | −2.94279E−06 | |
| 14 | 5.05543E−05 | | | |
| 15 | 9.69128E−05 | −7.18883E−07 | | |

TABLE 8A

Optical data for embodiment 8 (Example-E) plots shown in FIGS. 19-20
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3700 | | | | |
| 2 | Aperture stop | | INF | FLT | −0.3700 | | | | |
| 3 | | | INF | FLT | 0.0000 | | | | |
| 4 | $L_1$ | $R_1$ | 1.935 | ASP | 0.7680 | Plastic | 1.545 | 55.9 | 3.27 |
| 5 | | $R_2$ | −20.032 | ASP | 0.0392 | | | | |
| 6 | $L_2$ | $R_3$ | 10.101 | ASP | 0.2496 | Plastic | 1.640 | 23.5 | −6.47 |
| 7 | | $R_4$ | 2.923 | ASP | 0.5899 | | | | |
| 8 | $L_3$ | $R_5$ | −11.269 | ASP | 0.3197 | Plastic | 1.640 | 23.5 | −15.81 |
| 9 | | $R_6$ | 107.644 | ASP | 0.2556 | | | | |
| 10 | $L_4$ | $R_7$ | −14.036 | ASP | 1.0590 | Plastic | 1.545 | 55.9 | 2.92 |
| 11 | | $R_8$ | −1.469 | ASP | 0.1000 | | | | |
| 12 | $L_5$ | $R_9$ | 1.556 | ASP | 0.2941 | Plastic | 1.545 | 55.9 | −7.33 |
| 13 | | $R_{10}$ | 1.046 | ASP | 0.7250 | | | | |
| 14 | $L_6$ | $R_{11}$ | −21.882 | ASP | 0.3000 | Plastic | 1.640 | 23.5 | −4.42 |
| 15 | | $R_{12}$ | 3.293 | ASP | 0.4500 | | | | |
| 16 | IR filter | | INF | FLT | 0.1500 | Glass | 1.516 | 64.1 | |
| 17 | | | INF | FLT | 0.0971 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 8B

Aspheric coefficients for embodiment 8

| $S_i$ | c | K | A | B | C |
|---|---|---|---|---|---|
| 4 | 0.51689814 | −1.03552924 | 1.62645E−02 | 1.91299E−02 | −2.98163E−02 |
| 5 | −0.04991904 | 0.0 | −3.65011E−02 | 1.17568E−01 | −1.28557E−01 |
| 6 | 0.09900307 | 0.0 | −1.10516E−01 | 1.90597E−01 | −1.72458E−01 |
| 7 | 0.34208502 | −0.31437052 | 1.04488E−01 | 1.22398E−01 | −1.36553E−01 |
| 8 | −0.08873787 | 0.0 | −1.88049E−01 | 5.83431E−03 | −4.04205E−02 |
| 9 | 0.00928989 | 0.0 | −1.50565E−01 | 1.22970E−01 | 1.92085E−02 |
| 10 | −0.07124675 | 0.0 | −4.91188E−03 | −4.16325E−02 | 5.55160E−02 |
| 11 | −0.68051788 | −0.95085705 | 4.33374E−02 | −2.53710E−02 | 1.51784E−02 |
| 12 | 0.64250014 | −0.92600395 | −1.94511E−01 | 5.38967E−02 | −9.26305E−03 |
| 13 | 0.95575809 | −2.58915161 | −9.80983E−02 | 2.91808E−02 | −6.14127E−03 |
| 14 | −0.04569903 | 0.0 | −5.45388E−02 | 1.46716E−02 | −1.47133E−03 |
| 15 | 0.30362944 | −0.24340770 | −1.01069E−01 | 2.21671E−02 | −2.35228E−03 |

TABLE 8B-continued

Aspheric coefficients for embodiment 8

| $S_i$ | D | E | F | G |
|---|---|---|---|---|
| 4 | 2.61298E−02 | −9.64159E−03 | | |
| 5 | 5.49111E−02 | −9.27650E−03 | | |
| 6 | 5.72150E−02 | 4.63041E−03 | −4.12443E−03 | |
| 7 | 7.52740E−02 | −2.32814E−02 | −9.42091E−04 | |
| 8 | 1.71909E−02 | −1.15085E−02 | 7.83950E−03 | |
| 9 | −1.37676E−02 | 8.99852E−03 | −5.51968E−04 | |
| 10 | −2.61053E−02 | 5.45699E−03 | −3.50989E−04 | −2.46437E−05 |
| 11 | −3.61297E−03 | 4.13933E−04 | −1.23428E−05 | −3.41767E−06 |
| 12 | 5.32189E−04 | 3.65436E−05 | −3.46023E−06 | |
| 13 | 5.63001E−04 | 2.47690E−06 | −3.48318E−06 | |
| 14 | 3.53825E−05 | | | |
| 15 | 1.04184E−04 | −1.40342E−06 | | |

TABLE 9A

Optical data for embodiment 9 shown (Example-F) plots shown in FIGS. 21-22
f = 4.10 mm, Fno = 1.80, HFOV = 37.0 deg, TTL = 5.40 mm

| $S_i$ | Component | | $R_i$ | | Shape | $D_i$ | Material | $N_d$ | $V_d$ | $f_l$ |
|---|---|---|---|---|---|---|---|---|---|---|
| 0 | Object plane | | INF | | FLT | INF | | | | |
| 1 | | | INF | | FLT | 0.3553 | | | | |
| 2 | Aperture stop | | INF | | FLT | −0.3553 | | | | |
| 3 | | | INF | | FLT | 0.0000 | | | | |
| 4 | $L_1$ | $R_1$ | 1.933 | | ASP | 0.7727 | Plastic | 1.545 | 55.9 | 3.19 |
| 5 | | $R_2$ | −15.424 | | ASP | 0.0361 | | | | |
| 6 | $L_2$ | $R_3$ | 11.780 | | ASP | 0.2497 | Plastic | 1.636 | 23.9 | −6.18 |
| 7 | | $R_4$ | 2.936 | | ASP | 0.5968 | | | | |
| 8 | $L_3$ | $R_5$ | −10.699 | | ASP | 0.3184 | Plastic | 1.636 | 23.9 | −14.38 |
| 9 | | $R_6$ | 66.607 | | ASP | 0.2456 | | | | |
| 10 | $L_4$ | $R_7$ | −15.859 | | ASP | 1.0619 | Plastic | 1.545 | 55.9 | 2.91 |
| 11 | | $R_8$ | −1.478 | | ASP | 0.1000 | | | | |
| 12 | $L_5$ | $R_9$ | 1.539 | | ASP | 0.2938 | Plastic | 1.545 | 55.9 | −7.39 |
| 13 | | $R_{10}$ | 1.039 | | ASP | 0.7250 | | | | |
| 14 | $L_6$ | $R_{11}$ | −27.181 | | ASP | 0.3000 | Plastic | 1.636 | 23.9 | −4.49 |
| 15 | | $R_{12}$ | 3.229 | | ASP | 0.4500 | | | | |
| 16 | IR filter | | INF | | FLT | 0.1500 | Glass | 1.516 | 64.1 | |
| 17 | | | INF | | FLT | 0.0971 | | | | |
| 18 | Image plane | | INF | | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 9B

Aspheric coefficients for embodiment 9

| $S_i$ | c | K | A | B | C |
|---|---|---|---|---|---|
| 4 | 0.51738776 | −1.00559442 | 1.50134E−02 | 1.95448E−02 | −2.99713E−02 |
| 5 | −0.06483279 | 0.0 | −3.45374E−02 | 1.23686E−01 | −1.37749E−01 |
| 6 | 0.08488757 | 0.0 | −1.10764E−01 | 2.02483E−01 | −1.86689E−01 |
| 7 | 0.34063672 | 1.18277607 | −1.15760E−01 | 1.29493E−01 | −1.45150E−01 |
| 8 | −0.09346653 | 0.0 | −1.92076E−01 | 1.47054E−03 | −3.31299E−02 |
| 9 | 0.01501345 | 0.0 | −1.53102E−01 | 1.01033E−01 | 2.22703E−02 |
| 10 | −0.06305619 | 0.0 | −2.54063E−03 | −4.32297E−02 | 5.56385E−02 |
| 11 | −0.67657751 | −0.92171661 | 4.55930E−02 | −2.45961E−02 | 1.46436E−02 |
| 12 | 0.64956338 | −1.10954317 | −1.86229E−01 | 5.30684E−02 | −9.23098E−03 |
| 13 | 0.96210903 | −2.56108655 | −9.63141E−02 | 2.81129E−02 | −5.70990E−03 |
| 14 | −0.03679082 | 0.0 | −5.64672E−02 | 1.47575E−02 | −1.43860E−03 |
| 15 | 0.30974108 | −0.25330563 | −1.02667E−01 | 2.23167E−02 | −2.39076E−03 |

TABLE 9B-continued

Aspheric coefficients for embodiment 9

| $S_i$ | D | E | F | G |
|---|---|---|---|---|
| 4 | 2.58899E−02 | −9.64158E−03 | | |
| 5 | 5.85572E−02 | −9.27650E−03 | | |
| 6 | 6.28863E−02 | 4.63041E−03 | −4.12443E−03 | |
| 7 | 7.83565E−02 | −2.32814E−02 | −9.42091E−04 | |
| 8 | 1.47857E−02 | −1.15085E−02 | 7.83950E−03 | |
| 9 | −1.39070E−02 | 8.61261E−03 | 5.51968E−04 | |
| 10 | −2.60634E−02 | 5.46750E−03 | −3.50478E−04 | −2.60651E−05 |
| 11 | −3.62950E−03 | 4.59748E−04 | −1.21505E−05 | −4.92708E−06 |
| 12 | 5.84329E−04 | 3.44472E−05 | −4.29947E−06 | |
| 13 | 4.69198E−04 | 1.28559E−05 | −3.85553E−06 | |
| 14 | 3.39460E−05 | | | |
| 15 | 1.14295E−04 | −2.09113E−06 | | |

TABLE 10A

Optical data for embodiment 10 (Example-G) plots shown in FIGS. 23-24
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3700 | | | | |
| 2 | Aperture stop | | INF | FLT | −0.3700 | | | | |
| 3 | | | INF | FLT | 0.0000 | | | | |
| 4 | $L_1$ | $R_1$ | 1.931 | ASP | 0.7693 | Plastic | 1.545 | 55.9 | 3.27 |
| 5 | | $R_2$ | −21.132 | ASP | 0.0383 | | | | |
| 6 | $L_2$ | $R_3$ | 9.005 | ASP | 0.2496 | Plastic | 1.645 | 22.5 | −6.45 |
| 7 | | $R_4$ | 2.828 | ASP | 0.5986 | | | | |
| 8 | $L_3$ | $R_5$ | −9.722 | ASP | 0.3395 | Plastic | 1.636 | 23.9 | −19.56 |
| 9 | | $R_6$ | −44.034 | ASP | 0.2484 | | | | |
| 10 | $L_4$ | $R_7$ | −10.999 | ASP | 1.0368 | Plastic | 1.545 | 55.9 | 3.04 |
| 11 | | $R_8$ | −1.491 | ASP | 0.1000 | | | | |
| 12 | $L_5$ | $R_9$ | 1.577 | ASP | 0.2947 | Plastic | 1.545 | 55.9 | −7.61 |
| 13 | | $R_{10}$ | 1.068 | ASP | 0.7250 | | | | |
| 14 | $L_6$ | $R_{11}$ | −71.053 | ASP | 0.3000 | Plastic | 1.651 | 21.5 | −4.47 |
| 15 | | $R_{12}$ | 3.066 | ASP | 0.4500 | | | | |
| 16 | IR filter | | INF | FLT | | Glass | 1.516 | 64.1 | |
| 17 | | | INF | FLT | | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 10B

Aspheric coefficients for embodiment 10

| $S_i$ | c | K | A | B | C |
|---|---|---|---|---|---|
| 4 | 0.51797972 | −0.88747033 | 1.16261E−02 | 2.41174E−02 | −3.52937E−02 |
| 5 | −0.04732110 | 0.0 | −4.41075E−02 | 1.37500E−01 | −1.52191E−01 |
| 6 | 0.11104928 | 0.0 | −1.19307E−01 | 2.08800E−01 | −1.92869E−01 |
| 7 | 0.35357195 | 0.97581096 | −1.16157E−01 | 1.34145E−01 | −1.53671E−01 |
| 8 | −0.10285851 | 0.0 | −1.77045E−01 | 1.86017E−03 | −3.46818E−02 |
| 9 | −0.02270967 | 0.0 | −1.47745E−01 | 1.36232E−02 | 1.73680E−02 |
| 10 | −0.09091616 | 0.0 | −1.34768E−02 | −3.66698E−02 | 5.56373E−02 |
| 11 | −0.67081228 | −0.70771095 | 4.69731E−02 | −1.91005E−02 | 1.26851E−02 |
| 12 | 0.63423627 | −2.75735616 | −1.41455E−01 | 4.55278E−02 | −9.06082E−03 |
| 13 | 0.93634430 | −2.74671911 | −9.42853E−02 | 2.78501E−02 | −6.20710E−03 |
| 14 | −0.01407405 | 0.0 | −5.92021E−02 | 1.44774E−02 | −1.34774E−03 |
| 15 | 0.32611237 | −0.15843548 | −1.04319E−01 | 2.31159E−02 | −2.68379E−03 |

TABLE 10B-continued

Aspheric coefficients for embodiment 10

| $S_i$ | D | E | F | G |
|---|---|---|---|---|
| 4 | 2.91445E−02 | −1.01931E−02 | | |
| 5 | 6.84449E−02 | −1.23380E−02 | | |
| 6 | 6.47311E−02 | 6.30918E−03 | −5.48966E−03 | |
| 7 | 8.32176E−02 | −2.24792E−02 | −2.10968E−03 | |
| 8 | 9.74706E−03 | −9.20475E−03 | 7.83950E−03 | |
| 9 | −1.35599E−02 | 8.88508E−03 | −3.86727E−04 | |
| 10 | −2.67324E−02 | 5.43147E−03 | −2.46651E−04 | −4.64376E−05 |
| 11 | −3.42239E−03 | 5.15189E−04 | −1.82336E−05 | −6.59686E−06 |
| 12 | 6.63416E−04 | 3.99320E−05 | −5.92585E−06 | |
| 13 | 6.20020E−04 | −1.99143E−06 | −3.55600E−06 | |
| 14 | 2.46419E−05 | | | |
| 15 | 1.41954E−04 | −2.96140E−06 | | |

TABLE 11A

Optical data for embodiment 11 (Example-H) plots shown in FIGS. 25-26
f = 4.10 mm, Fno = 1.80, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3553 | | | | |
| 2 | Aperture stop | | INF | FLT | −0.3553 | | | | |
| 3 | | | INF | FLT | 0.0000 | | | | |
| 4 | $L_1$ | $R_1$ | 1.942 | ASP | 0.7603 | Plastic | 1.545 | 55.9 | 3.42 |
| 5 | | $R_2$ | −43.409 | ASP | 0.0555 | | | | |
| 6 | $L_2$ | $R_3$ | 7.984 | ASP | 0.2494 | Plastic | 1.651 | 21.5 | −7.39 |
| 7 | | $R_4$ | 2.979 | ASP | 0.5868 | | | | |
| 8 | $L_3$ | $R_5$ | −9.473 | ASP | 0.4081 | Plastic | 1.651 | 21.5 | −21.98 |
| 9 | | $R_6$ | −28.062 | ASP | 0.2350 | | | | |
| 10 | $L_4$ | $R_7$ | −8.682 | ASP | 0.9771 | Plastic | 1.545 | 55.9 | 3.18 |
| 11 | | $R_8$ | −1.508 | ASP | 0.1000 | | | | |
| 12 | $L_5$ | $R_9$ | 1.681 | ASP | 0.3280 | Plastic | 1.545 | 55.9 | −7.94 |
| 13 | | $R_{10}$ | 1.128 | ASP | 0.7000 | | | | |
| 14 | $L_6$ | $R_{11}$ | −22.861 | ASP | 0.3000 | Plastic | 1.661 | 20.4 | −4.55 |
| 15 | | $R_{12}$ | 3.522 | ASP | 0.4500 | | | | |
| 16 | IR filter | | INF | FLT | 0.1500 | Glass | 1.516 | 64.1 | |
| 17 | | | INF | FLT | 0.0971 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 11B

Aspheric coefficients for embodiment 11

| $S_i$ | c | K | A | B | C |
|---|---|---|---|---|---|
| 4 | 0.51497490 | −0.49853396 | 2.82308E−03 | 2.06461E−02 | −3.25751E−02 |
| 5 | −0.02303671 | 0.0 | −5.16994E−02 | 1.21884E−01 | −1.31873E−01 |
| 6 | 0.12524760 | 0.0 | −1.12242E−01 | 1.88446E−01 | −1.72552E−01 |
| 7 | 0.33563101 | −7.58419032 | −6.26311E−02 | 1.14977E−01 | −1.43652E−01 |
| 8 | −0.10556660 | 0.0 | −1.55420E−01 | 5.64168E−03 | −4.57010E−02 |
| 9 | −0.03563518 | 0.0 | −1.27643E−01 | 1.22788E−01 | 1.04252E−02 |
| 10 | −0.11518266 | 0.0 | −9.74211E−03 | −3.57423E−02 | 5.50779E−02 |
| 11 | −0.66323730 | −0.96894194 | 3.93878E−02 | −1.99585E−02 | 1.40677E−02 |
| 12 | 0.59475211 | −0.83078060 | −1.74274E−01 | 4.74876E−02 | −8.97572E−03 |
| 13 | 0.88631204 | −2.85391957 | −8.35047E−02 | 2.27336E−02 | −4.97627E−03 |
| 14 | −0.04374317 | 0.0 | −5.81719E−02 | 1.67041E−02 | −1.88551E−03 |
| 15 | 0.28394737 | 0.30802964 | −9.77084E−02 | 2.15146E−02 | −2.29345E−03 |

TABLE 11B-continued

Aspheric coefficients for embodiment 11

| $S_i$ | D | E | F | G |
|---|---|---|---|---|
| 4  | 2.56978E−02  | −9.43970E−03 |              |              |
| 5  | 5.76987E−02  | −9.67450E−03 |              |              |
| 6  | 6.02977E−02  | 4.60642E−03  | −4.14886E−03 |              |
| 7  | 8.14989E−02  | −2.32324E−02 | −9.08662E−04 |              |
| 8  | 1.61679E−02  | −1.15846E−02 | 7.82347E−03  |              |
| 9  | −9.08795E−03 | 5.90465E−03  | 1.12693E−04  |              |
| 10 | −2.62557E−02 | 5.42419E−03  | −3.53494E−04 | −2.05792E−05 |
| 11 | −3.37607E−03 | 3.47830E−04  | −2.92323E−05 | 1.64755E−06  |
| 12 | 6.61592E−04  | 2.91223E−05  | −4.36144E−06 |              |
| 13 | 5.07058E−04  | −1.04243E−05 | −1.86859E−06 |              |
| 14 | 6.12528E−05  |              |              |              |
| 15 | 9.18160E−05  | −9.45631E−07 |              |              |

TABLE 12A

Optical data for embodiment 12 (F1.6_Example-1) shown in FIGS. 27-29
f = 4.10 mm, Fno = 1.607, HFOV = 37.0 deg, TTL = 5.60 mm

| $S_i$ | Component |          | $R_i$   | Shape | $D_i$   | Material | $N_d$ | $V_d$ | $f_l$  |
|---|---|---|---|---|---|---|---|---|---|
| 0  | Object plane   |          | INF     | FLT | INF     |         |       |      |        |
| 1  |                |          | INF     | FLT | 0.3614  |         |       |      |        |
| 2  | Aperture stop  |          | INF     | FLT | −0.3614 |         |       |      |        |
| 3  |                |          | INF     | FLT | 0.0000  |         |       |      |        |
| 4  | $L_1$          | $R_1$    | 2.165   | ASP | 0.9143  | Plastic | 1.545 | 55.9 | 3.55   |
| 5  |                | $R_2$    | −15.796 | ASP | 0.0491  |         |       |      |        |
| 6  | $L_2$          | $R_3$    | 5.043   | ASP | 0.2494  | Plastic | 1.636 | 23.9 | −6.65  |
| 7  |                | $R_4$    | 2.263   | ASP | 0.6805  |         |       |      |        |
| 8  | $L_3$          | $R_5$    | 7.394   | ASP | 0.3191  | Plastic | 1.636 | 23.9 | −10.34 |
| 9  |                | $R_6$    | 3.434   | ASP | 0.1035  |         |       |      |        |
| 10 | $L_4$          | $R_7$    | −31.014 | ASP | 1.1333  | Plastic | 1.545 | 55.9 | 2.87   |
| 11 |                | $R_8$    | −1.512  | ASP | 0.0500  |         |       |      |        |
| 12 | $L_5$          | $R_9$    | 1.639   | ASP | 0.3008  | Plastic | 1.636 | 23.9 | −12.29 |
| 13 |                | $R_{10}$ | 1.259   | ASP | 0.8000  |         |       |      |        |
| 14 | $L_6$          | $R_{11}$ | −35.596 | ASP | 0.3000  | Plastic | 1.545 | 55.9 | −4.65  |
| 15 |                | $R_{12}$ | 2.749   | ASP | 0.3205  |         |       |      |        |
| 16 | IR filter      |          | INF     | FLT | 0.2000  | Glass   | 1.516 | 64.1 |        |
| 17 |                |          | INF     | FLT | 0.1795  |         |       |      |        |
| 18 | Image plane    |          | INF     | FLT |         |         |       |      |        |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 12B

Aspheric coefficients for embodiment 12

| $S_i$ | c | K | A | B | C |
|---|---|---|---|---|---|
| 4  | 0.46189299  | −0.53950049 | −3.60195E−03 | 2.85113E−02  | −3.61791E−02 |
| 5  | −0.06330557 | 0.0         | −1.54723E−02 | 8.24848E−02  | −1.04916E−01 |
| 6  | 0.19829611  | 0.0         | −9.20531E−02 | 1.42101E−01  | −1.27751E−01 |
| 7  | 0.44187662  | −2.71994079 | −8.42183E−02 | 1.37582E−01  | −1.37552E−01 |
| 8  | 0.13524041  | 0.0         | −1.80109E−01 | 7.50929E−02  | −6.18533E−02 |
| 9  | 0.29118283  | 0.0         | −1.65389E−01 | 3.72756E−02  | −1.81615E−03 |
| 10 | −0.03224345 | 0.0         | 8.80920E−03  | −6.76053E−02 | 6.38808E−02  |
| 11 | −0.66125588 | −0.70809252 | 4.04135E−02  | −1.58062E−02 | 1.24449E−02  |
| 12 | 0.61002324  | −0.66195337 | −1.53387E−01 | 4.83448E−02  | −1.08767E−02 |
| 13 | 0.79397964  | −3.30189830 | −7.46076E−02 | 2.51657E−02  | −6.29201E−03 |
| 14 | −0.02809277 | 0.0         | −7.78762E−02 | 2.02360E−02  | −1.94294E−03 |
| 15 | 0.36380527  | −0.65060238 | −1.01613E−01 | 2.36692E−02  | −2.94440E−03 |

TABLE 12B-continued

Aspheric coefficients for embodiment 12

| $S_i$ | D | E | F | G |
|---|---|---|---|---|
| 4 | 2.29033E−02 | −6.25359E−03 | 1.06922E−05 | |
| 5 | 4.80184E−02 | −8.62982E−03 | | |
| 6 | 3.11421E−02 | 9.53486E−03 | −3.60558E−03 | |
| 7 | 7.44113E−02 | −2.43765E−02 | 4.80580E−03 | |
| 8 | 2.73404E−02 | −1.08236E−02 | 3.62308E−03 | |
| 9 | −9.83716E−03 | 6.97839E−03 | −1.13820E−03 | |
| 10 | −2.54159E−02 | 5.03382E−03 | −4.31766E−04 | 1.79617E−06 |
| 11 | −3.55453E−03 | 4.19154E−04 | 1.26469E−05 | −7.00701E−06 |
| 12 | 7.99139E−04 | 7.28316E−05 | −1.04813E−05 | |
| 13 | 7.11539E−04 | −9.70356E−06 | −2.35121E−06 | |
| 14 | 7.78950E−05 | −1.16080E−06 | | |
| 15 | 1.69953E−04 | −3.39238E−06 | | |

TABLE 13A

Optical data for embodiment 13 (F1.6_Example-2) shown in FIGS. 30-32
f = 4.06 mm, Fno = 1.59, HFOV = 37.0 deg, TTL = 5.60 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3916 | | | | |
| 2 | Aperture stop | | INF | FLT | −0.3916 | | | | |
| 3 | | | INF | FLT | 0.0000 | | | | |
| 4 | $L_1$ | $R_1$ | 2.165 | ASP | 0.8565 | Plastic | 1.545 | 55.9 | 3.54 |
| 5 | | $R_2$ | −15.796 | ASP | 0.0495 | | | | |
| 6 | $L_2$ | $R_3$ | 5.043 | ASP | 0.2470 | Plastic | 1.640 | 23.5 | −6.60 |
| 7 | | $R_4$ | 2.263 | ASP | 0.7438 | | | | |
| 8 | $L_3$ | $R_5$ | 7.394 | ASP | 0.2551 | Plastic | 1.640 | 23.5 | −10.21 |
| 9 | | $R_6$ | 3.434 | ASP | 0.1577 | | | | |
| 10 | $L_4$ | $R_7$ | −31.014 | ASP | 1.1458 | Plastic | 1.545 | 55.9 | 2.87 |
| 11 | | $R_8$ | −1.512 | ASP | 0.0500 | | | | |
| 12 | $L_5$ | $R_9$ | 1.639 | ASP | 0.3291 | Plastic | 1.545 | 55.9 | −14.33 |
| 13 | | $R_{10}$ | 1.259 | ASP | 0.8000 | | | | |
| 14 | $L_6$ | $R_{11}$ | −35.596 | ASP | 0.2500 | Plastic | 1.545 | 55.9 | −4.66 |
| 15 | | $R_{12}$ | 2.749 | ASP | 0.1911 | | | | |
| 16 | IR filter | | INF | FLT | 0.2000 | Glass | 1.516 | 64.1 | |
| 17 | | | INF | FLT | 0.3207 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 13B

Aspheric coefficients for embodiment 13

| $S_i$ | c | K | A | B | C |
|---|---|---|---|---|---|
| 4 | 0.46189299 | −0.62732785 | −1.16135E−04 | 2.62757E−02 | −3.48697E−02 |
| 5 | −0.06330557 | 0.0 | −2.01160E−02 | 8.87273E−02 | −1.02472E−01 |
| 6 | 0.19829611 | 0.0 | −1.06447E−01 | 1.55804E−01 | −1.22962E−01 |
| 7 | 0.44187662 | −5.80794514 | −6.07574E−02 | 1.26417E−01 | −1.29058E−01 |
| 8 | 0.13524041 | 0.0 | −2.21674E−01 | 7.85922E−02 | −6.14321E−02 |
| 9 | 0.29118283 | 0.0 | −1.91079E−01 | 4.02571E−02 | −1.46148E−03 |
| 10 | −0.03224345 | 0.0 | 2.43907E−02 | −8.19403E−02 | 6.44001E−02 |
| 11 | −0.66125588 | −0.62764318 | 3.44653E−02 | −1.34503E−02 | 1.00561E−02 |
| 12 | 0.61002324 | −0.79507059 | −1.43189E−01 | 4.44524E−02 | −1.02937E−02 |
| 13 | 0.79397964 | −3.09076192 | −6.88912E−02 | 2.11078E−02 | −6.07047E−03 |
| 14 | −0.02809277 | 0.0 | −7.80938E−02 | 2.01337E−02 | −2.01725E−03 |
| 15 | 0.36380527 | −0.31133393 | −1.04294E−01 | 2.43059E−02 | −2.99850E−03 |

TABLE 13B-continued

Aspheric coefficients for embodiment 13

| $S_i$ | D | E | F | G |
|---|---|---|---|---|
| 4 | 2.34399E−02 | −6.64750E−03 | 2.23988E−06 | |
| 5 | 4.57193E−02 | −8.43929E−03 | | |
| 6 | 2.52625E−02 | 1.07569E−02 | −3.61557E−03 | |
| 7 | 7.17512E−02 | −2.42579E−02 | 4.81360E−03 | |
| 8 | 2.88944E−02 | −1.15771E−02 | 3.90043E−03 | |
| 9 | −8.02397E−03 | 6.40034E−03 | −1.19923E−03 | |
| 10 | −2.50539E−02 | 5.10861E−03 | −4.67217E−04 | 6.02691E−06 |
| 11 | −3.78115E−03 | 5.18530E−04 | 4.16880E−05 | −1.36605E−05 |
| 12 | 8.03028E−04 | 5.30999E−05 | −7.68639E−06 | |
| 13 | 7.57567E−04 | −1.90366E−05 | −1.61942E−06 | |
| 14 | 7.93812E−05 | −6.05014E−07 | | |
| 15 | 1.63436E−04 | −3.52042E−06 | | |

TABLE 14A

Optical data for embodiment 14 (F1.6_Example-3) plots shown in FIGS. 33-34
f = 4.10 mm, Fno = 1.607, HFOV = 37.0 deg, TTL = 5.60 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3930 | | | | |
| 2 | Aperture stop | | INF | FLT | −0.3930 | | | | |
| 3 | | | INF | FLT | 0.0000 | | | | |
| 4 | $L_1$ | $R_1$ | 2.154 | ASP | 0.8565 | Plastic | 1.545 | 55.9 | 3.55 |
| 5 | | $R_2$ | −16.705 | ASP | 0.0495 | | | | |
| 6 | $L_2$ | $R_3$ | 4.881 | ASP | 0.2470 | Plastic | 1.645 | 22.5 | −6.69 |
| 7 | | $R_4$ | 2.254 | ASP | 0.7438 | | | | |
| 8 | $L_3$ | $R_5$ | 7.693 | ASP | 0.2551 | Plastic | 1.645 | 22.5 | −10.14 |
| 9 | | $R_6$ | 3.503 | ASP | 0.1577 | | | | |
| 10 | $L_4$ | $R_7$ | −29.001 | ASP | 1.1458 | Plastic | 1.545 | 55.9 | 2.87 |
| 11 | | $R_8$ | −1.513 | ASP | 0.0500 | | | | |
| 12 | $L_5$ | $R_9$ | 1.659 | ASP | 0.3291 | Plastic | 1.545 | 55.9 | −13.58 |
| 13 | | $R_{10}$ | 1.261 | ASP | 0.8000 | | | | |
| 14 | $L_6$ | $R_{11}$ | −34.677 | ASP | 0.2500 | Plastic | 1.545 | 55.9 | −4.61 |
| 15 | | $R_{12}$ | 2.724 | ASP | 0.1911 | | | | |
| 16 | IR filter | | INF | FLT | 0.2000 | Glass | 1.516 | 64.1 | |
| 17 | | | INF | FLT | 0.3240 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 14B

Aspheric coefficients for embodiment 14

| $S_i$ | c | K | A | B | C |
|---|---|---|---|---|---|
| 4 | 0.46426387 | −0.61927696 | −1.67660E−05 | 2.61425E−02 | −3.49275E−02 |
| 5 | −0.05986347 | 0.0 | −2.06624E−02 | 8.89262E−02 | −1.02401E−01 |
| 6 | 0.20486141 | 0.0 | −1.05794E−01 | 1.55763E−01 | −1.22926E−01 |
| 7 | 0.44356204 | −5.65599602 | −6.01031E−02 | 1.26346E−01 | −1.29172E−01 |
| 8 | 0.12999622 | 0.0 | −2.20960E−01 | 7.83130E−02 | −6.13107E−02 |
| 9 | 0.28549894 | 0.0 | −1.91124E−01 | 4.03093E−02 | −1.41994E−03 |
| 10 | −0.03448213 | 0.0 | 2.48298E−02 | −8.18650E−02 | 6.44121E−02 |
| 11 | −0.66108336 | −0.63507481 | 3.59443E−02 | −1.36784E−02 | 1.00129E−02 |
| 12 | 0.60288736 | −0.81105738 | −1.43940E−01 | 4.42938E−02 | −1.03138E−02 |
| 13 | 0.79320164 | −3.12684205 | −6.98230E−02 | 2.11341E−02 | −6.06636E−03 |
| 14 | −0.02883753 | 0.0 | −7.78905E−02 | 2.01318E−02 | −2.01458E−03 |
| 15 | 0.36709087 | −0.31323254 | −1.05656E−01 | 2.43205E−02 | −2.99346E−03 |

TABLE 14B-continued

Aspheric coefficients for embodiment 14

| $S_i$ | D | E | F | G |
|---|---|---|---|---|
| 4 | 2.34577E−02 | −6.63516E−03 | 2.24003E−06 | |
| 5 | 4.57132E−02 | −8.44145E−03 | | |
| 6 | 2.53069E−02 | 1.07576E−02 | −3.61557E−03 | |
| 7 | 7.17953E−02 | −2.42579E−02 | 4.81360E−03 | |
| 8 | 2.88707E−02 | −1.15771E−02 | 3.90043E−03 | |
| 9 | −7.96310E−03 | 6.40641E−03 | −1.11576E−03 | |
| 10 | −2.50537E−02 | 5.10771E−03 | −4.67427E−04 | 6.03813E−06 |
| 11 | −3.77589E−03 | 5.18220E−04 | 4.17225E−05 | −1.36688E−05 |
| 12 | 8.00458E−04 | 5.29415E−05 | −7.71625E−06 | |
| 13 | 7.57415E−04 | −1.90395E−05 | −1.63755E−06 | |
| 14 | 7.99323E−05 | −5.24379E−07 | | |
| 15 | 1.63879E−04 | −3.49181E−06 | | |

TABLE 15A

Optical data for embodiment 15 (F1.6_Example-4) shown in FIGS. 35-37
f = 4.10 mm, Fno = 1.608, HFOV = 37.0 deg, TTL = 5.60 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3854 | | | | |
| 2 | Aperture stop | | INF | FLT | −0.3854 | | | | |
| 3 | | | INF | FLT | 0.0000 | | | | |
| 4 | $L_1$ | $R_1$ | 2.121 | ASP | 0.8570 | Plastic | 1.545 | 55.9 | 3.62 |
| 5 | | $R_2$ | −25.551 | ASP | 0.0496 | | | | |
| 6 | $L_2$ | $R_3$ | 5.623 | ASP | 0.2499 | Plastic | 1.651 | 21.5 | −8.05 |
| 7 | | $R_4$ | 2.676 | ASP | 0.7300 | | | | |
| 8 | $L_3$ | $R_5$ | 28.678 | ASP | 0.3199 | Plastic | 1.651 | 21.5 | −10.22 |
| 9 | | $R_6$ | 5.411 | ASP | 0.1000 | | | | |
| 10 | $L_4$ | $R_7$ | −12.654 | ASP | 0.1373 | Plastic | 1.545 | 55.9 | 3.06 |
| 11 | | $R_8$ | −1.524 | ASP | 0.0500 | | | | |
| 12 | $L_5$ | $R_9$ | 2.004 | ASP | 0.3506 | Plastic | 1.651 | 21.5 | −16.10 |
| 13 | | $R_{10}$ | 1.568 | ASP | 0.7803 | | | | |
| 14 | $L_6$ | $R_{11}$ | −33.903 | ASP | 0.2755 | Plastic | 1.545 | 55.9 | −4.29 |
| 15 | | $R_{12}$ | 2.528 | ASP | 0.4000 | | | | |
| 16 | IR filter | | INF | FLT | 0.2000 | Glass | 1.516 | 64.1 | |
| 17 | | | INF | FLT | 0.1000 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 15B

Aspheric coefficients for embodiment 15

| $S_i$ | c | K | A | B | C |
|---|---|---|---|---|---|
| 4 | 0.47155855 | −0.76664384 | 2.98168E−03 | 1.97415E−02 | −2.71155E−02 |
| 5 | −0.03913673 | 0.0 | −3.77482E−02 | 1.05964E−01 | −1.12820E−01 |
| 6 | 0.17784891 | 0.0 | −9.80212E−02 | 1.53011E−01 | −1.22422E−01 |
| 7 | 0.37363830 | −7.63746368 | −4.66900E−02 | 1.02249E−01 | −1.13635E−01 |
| 8 | 0.03486974 | 0.0 | −2.04335E−01 | 9.31614E−02 | −1.13208E−01 |
| 9 | 0.18481414 | 0.0 | −1.70145E−01 | 4.30399E−02 | −2.28411E−02 |
| 10 | −0.07902727 | 0.0 | 1.85502E−02 | −7.31598E−02 | 6.41743E−02 |
| 11 | −0.65633597 | −0.61236720 | 4.04589E−02 | −9.19117E−03 | 1.02523E−02 |
| 12 | 0.49908136 | −0.91032816 | −1.01512E−01 | 3.23491E−02 | −8.72099E−03 |
| 13 | 0.63791685 | −4.16561793 | −4.49527E−02 | 1.25748E−02 | −4.35023E−03 |
| 14 | −0.02949555 | 0.0 | −7.19187E−02 | 1.87557E−02 | −1.87801E−03 |
| 15 | 0.39557604 | −0.46505079 | −1.03131E−01 | 2.32415E−02 | −2.99834E−03 |

TABLE 15B-continued

Aspheric coefficients for embodiment 15

| $S_i$ | D | E | F | G |
|---|---|---|---|---|
| 4 | 1.94282E−02 | −6.68763E−03 | 4.07459E−04 | |
| 5 | 4.80604E−02 | −7.98165E−03 | | |
| 6 | 2.89752E−02 | 7.51196E−03 | −2.48754E−03 | |
| 7 | 6.74424E−02 | −2.53197E−02 | 4.95294E−03 | |
| 8 | 5.91092E−02 | −7.85787E−03 | −1.41871E−03 | |
| 9 | 6.86277E−03 | 4.68765E−03 | −1.52591E−03 | |
| 10 | −2.64538E−02 | 5.08006E−03 | −1.19260E−04 | −6.44475E−05 |
| 11 | −4.48854E−03 | 4.56627E−04 | 7.98009E−05 | −7.99382E−06 |
| 12 | 7.51414E−04 | 5.17270E−05 | −7.59355E−06 | |
| 13 | 6.57427E−04 | −3.03578E−05 | −4.95317E−07 | |
| 14 | 8.13946E−05 | −9.99222E−07 | | |
| 15 | 1.82193E−04 | −4.05423E−06 | | |

TABLE 16A

Optical data for embodiment 16 (F1.6_Example-5) shown in FIGS. 38-40
f = 4.10 mm, Fno = 1.606, HFOV = 37.0 deg, TTL = 5.60 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3900 | | | | |
| 2 | Aperture stop | | INF | FLT | −0.3900 | | | | |
| 3 | | | INF | FLT | 0.0000 | | | | |
| 4 | $L_1$ | $R_1$ | 2.137 | ASP | 0.8405 | Plastic | 1.545 | 55.9 | 3.94 |
| 5 | | $R_2$ | 253.256 | ASP | 0.0489 | | | | |
| 6 | $L_2$ | $R_3$ | 3.297 | ASP | 0.2502 | Plastic | 1.661 | 20.3 | −9.83 |
| 7 | | $R_4$ | 2.127 | ASP | 0.6878 | | | | |
| 8 | $L_3$ | $R_5$ | 131.991 | ASP | 0.4073 | Plastic | 1.661 | 20.3 | −8.26 |
| 9 | | $R_6$ | 5.284 | ASP | 0.1204 | | | | |
| 10 | $L_4$ | $R_7$ | 74.053 | ASP | 1.0872 | Plastic | 1.545 | 55.9 | 2.63 |
| 11 | | $R_8$ | −1.460 | ASP | 0.0561 | | | | |
| 12 | $L_5$ | $R_9$ | 1.704 | ASP | 0.3488 | Plastic | 1.545 | 55.9 | −6.42 |
| 13 | | $R_{10}$ | 1.064 | ASP | 0.7000 | | | | |
| 14 | $L_6$ | $R_{11}$ | 5.231 | ASP | 0.3403 | Plastic | 1.545 | 55.9 | −6.42 |
| 15 | | $R_{12}$ | 2.053 | ASP | 0.4070 | | | | |
| 16 | IR filter | | INF | FLT | 0.2000 | Glass | 1.516 | 64.1 | |
| 17 | | | INF | FLT | 0.1000 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 16B

Aspheric coefficients for embodiment 16

| $S_i$ | c | K | A | B | C |
|---|---|---|---|---|---|
| 4 | 0.46783809 | −0.73442958 | −4.00846E−03 | 3.94108E−02 | −5.12634E−02 |
| 5 | 0.00394858 | 0.0 | −5.59134E−02 | 1.25796E−01 | −1.33588E−01 |
| 6 | 0.30332833 | 0.0 | −1.22774E−01 | 1.64134E−01 | −1.33925E−01 |
| 7 | 0.47014510 | −1.04131110 | −9.79476E−02 | 1.28820E−01 | −1.28622E−01 |
| 8 | 0.00757627 | 0.0 | −1.28218E−01 | 5.64210E−02 | −6.90364E−02 |
| 9 | 0.18923491 | 0.0 | −1.36855E−01 | 2.90643E−02 | 5.81425E−03 |
| 10 | 0.01350389 | 0.0 | −3.80515E−02 | −4.31772E−02 | 5.93891E−02 |
| 11 | −0.68478294 | −0.80258467 | 4.86985E−02 | −2.59205E−02 | 1.41486E−02 |
| 12 | 0.58677619 | −0.56714151 | −1.80926E−01 | 5.55113E−02 | −1.15783E−02 |
| 13 | 0.93979099 | −2.81950550 | −8.35415E−02 | 2.68953E−02 | −6.12657E−03 |
| 14 | 0.19115693 | 0.0 | −8.23923E−02 | 1.76583E−02 | −1.69873E−03 |
| 15 | 0.48709210 | −1.69427907 | −1.07562E−01 | 2.37093E−02 | −2.51541E−03 |

TABLE 16B-continued

Aspheric coefficients for embodiment 16

| $S_i$ | D | E | F | G |
|---|---|---|---|---|
| 4 | 3.21632E−02 | −8.53022E−03 | 3.98219E−05 | |
| 5 | 6.01244E−02 | −1.10949E−02 | | |
| 6 | 3.15946E−02 | 9.76950E−03 | −3.70766E−03 | |
| 7 | 7.03790E−02 | −2.37049E−02 | 4.84126E−03 | |
| 8 | 3.98858E−02 | −1.63769E−02 | 4.54925E−03 | |
| 9 | −1.23354E−02 | 6.38083E−03 | −8.38387E−04 | |
| 10 | −2.56727E−02 | 5.28206E−03 | −4.74248E−04 | 3.28295E−06 |
| 11 | −2.36225E−03 | 2.73064E−04 | −8.06091E−05 | 8.21834E−06 |
| 12 | 8.38899E−04 | 7.87412E−05 | −1.22299E−05 | |
| 13 | 6.51279E−04 | −1.35207E−05 | −1.51927E−06 | |
| 14 | 8.19187E−05 | −2.30213E−06 | | |
| 15 | 1.32425E−04 | −3.17049E−06 | | |

TABLE 17A

Optical data for embodiment 17 (F1.6_Example-x1) shown in FIGS. 41-43
f = 4.10 mm, Fno = 1.60, HFOV = 37.0 deg, TTL = 5.60 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3842 | | | | |
| 2 | Aperture stop | | INF | FLT | −0.3842 | | | | |
| 3 | | | INF | FLT | 0.0000 | | | | |
| 4 | $L_1$ | $R_1$ | 2.251 | ASP | 0.7739 | Plastic | 1.545 | 55.9 | 4.72 |
| 5 | | $R_2$ | 15.472 | ASP | 0.3044 | | | | |
| 6 | $L_2$ | $R_3$ | 5.245 | ASP | 0.2503 | Plastic | 1.642 | 22.4 | −6.33 |
| 7 | | $R_4$ | 2.257 | ASP | 0.3035 | | | | |
| 8 | $L_3$ | $R_5$ | 5.312 | ASP | 0.7942 | Plastic | 1.545 | 55.9 | 5.67 |
| 9 | | $R_6$ | −7.040 | ASP | 0.2629 | | | | |
| 10 | $L_4$ | $R_7$ | −2.248 | ASP | 0.3883 | Plastic | 1.545 | 55.9 | −42.89 |
| 11 | | $R_8$ | −2.638 | ASP | 0.0500 | | | | |
| 12 | $L_5$ | $R_9$ | 1.754 | ASP | 0.4204 | Plastic | 1.545 | 55.9 | 10.67 |
| 13 | | $R_{10}$ | 2.295 | ASP | 0.7436 | | | | |
| 14 | $L_6$ | $R_{11}$ | 3.855 | ASP | 0.6077 | Plastic | 1.545 | 55.9 | −5.32 |
| 15 | | $R_{12}$ | 1.566 | ASP | 0.4008 | | | | |
| 16 | IR filter | | INF | FLT | 0.2000 | Glass | 1.516 | 64.1 | |
| 17 | | | INF | FLT | 0.1000 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 17B

Aspheric coefficients for embodiment 17

| $S_i$ | c | K | A | B | C |
|---|---|---|---|---|---|
| 4 | 0.44416690 | 0.04092295 | −7.77210E−03 | 1.89897E−02 | −2.53909E−02 |
| 5 | 0.06463483 | 0.0 | −2.83383E−02 | 2.25110E−02 | −1.70622E−02 |
| 6 | 0.19066235 | 3.88133673 | −1.67425E−01 | 1.02726E−01 | −4.19620E−02 |
| 7 | 0.44301618 | 0.88458017 | −1.80359E−01 | 1.36504E−01 | −8.63973E−02 |
| 8 | 0.18824482 | 4.11476796 | −2.93533E−02 | 2.35754E−02 | −2.89259E−02 |
| 9 | −0.14203962 | −15.07212214 | −2.50124E−02 | 1.80200E−02 | 5.05598E−03 |
| 10 | −0.44488669 | 0.88653448 | 8.17699E−02 | −2.56326E−02 | 3.98260E−02 |
| 11 | −0.37909088 | −5.29639150 | −4.97671E−02 | 2.36895E−02 | −1.41110E−03 |
| 12 | 0.57022775 | −0.55743569 | −4.13956E−02 | −6.15874E−03 | −6.40197E−03 |
| 13 | 0.43567652 | −0.12589773 | 4.51405E−02 | −5.53538E−02 | 1.46065E−02 |
| 14 | 0.25942529 | 0.0 | −1.46759E−01 | 4.64008E−02 | −3.84867E−03 |
| 15 | 0.63854204 | −4.71100426 | −6.27112E−02 | 1.83842E−02 | −3.37031E−03 |

TABLE 17B-continued

Aspheric coefficients for embodiment 17

| $S_i$ | D | E | F |
|---|---|---|---|
| 4 | 1.63276E−02 | −4.63272E−03 | −2.95574E−06 |
| 5 | 3.51967E−03 | −8.93624E−04 | |
| 6 | −1.07798E−03 | 3.59745E−03 | |
| 7 | 2.68890E−02 | −3.70819E−03 | |
| 8 | 1.49595E−02 | −4.71615E−03 | |
| 9 | −1.43391E−02 | 3.94127E−03 | −2.69947E−04 |
| 10 | −2.43701E−02 | 5.01576E−03 | −8.68544E−05 |
| 11 | −2.98767E−04 | −2.00629E−05 | −1.38492E−05 |
| 12 | 2.41237E−03 | −3.13785E−04 | 1.57566E−05 |
| 13 | −1.73456E−03 | 5.29761E−05 | |
| 14 | −8.75734E−04 | 2.06939E−04 | −1.43136E−05 |
| 15 | 3.37424E−04 | −1.44707E−05 | |

TABLE 18A

Optical data for embodiment 18 (F1.6_Example-x2) shown in FIGS. 44-46
f = 4.10 mm, Fno = 1.60, HFOV = 37.0 deg, TTL = 5.40 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3913 | | | | |
| 2 | Aperture stop | | INF | FLT | −0.3913 | | | | |
| 3 | | | INF | FLT | 0.0000 | | | | |
| 4 | $L_1$ | $R_1$ | 2.210 | ASP | 0.7708 | Plastic | 1.545 | 55.9 | 4.79 |
| 5 | | $R_2$ | 12.465 | ASP | 0.3217 | | | | |
| 6 | $L_2$ | $R_3$ | 5.129 | ASP | 0.2496 | Plastic | 1.642 | 22.4 | −6.63 |
| 7 | | $R_4$ | 2.292 | ASP | 0.3205 | | | | |
| 8 | $L_3$ | $R_5$ | 5.729 | ASP | 0.7306 | Plastic | 1.545 | 55.9 | 5.76 |
| 9 | | $R_6$ | −6.668 | ASP | 0.2468 | | | | |
| 10 | $L_4$ | $R_7$ | −2.258 | ASP | 0.4158 | Plastic | 1.545 | 55.9 | −37.19 |
| 11 | | $R_8$ | −2.706 | ASP | 0.0500 | | | | |
| 12 | $L_5$ | $R_9$ | 1.738 | ASP | 0.4118 | Plastic | 1.545 | 55.9 | 10.70 |
| 13 | | $R_{10}$ | 2.266 | ASP | 0.8242 | | | | |
| 14 | $L_6$ | $R_{11}$ | 3.251 | ASP | 0.5582 | Plastic | 1.651 | 21.5 | −5.27 |
| 15 | | $R_{12}$ | 1.561 | ASP | 0.4000 | | | | |
| 16 | IR filter | | INF | FLT | 0.2000 | Glass | 1.516 | 64.1 | |
| 17 | | | INF | FLT | 0.1000 | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 18B

Aspheric coefficients for embodiment 18

| $S_i$ | c | K | A | B | C |
|---|---|---|---|---|---|
| 4 | 0.45255182 | 0.03831299 | −7.84368E−03 | 1.81355E−02 | −2.48548E−02 |
| 5 | 0.08022496 | 0.0 | −2.95169E−02 | 2.13385E−02 | −1.65503E−02 |
| 6 | 0.19495711 | 3.73906844 | −1.68146E−01 | 1.02693E−01 | −4.08995E−02 |
| 7 | 0.43623330 | 1.15015902 | −1.82303E−01 | 1.37226E−01 | −8.51135E−02 |
| 8 | 0.17454359 | 3.31785726 | −3.12746E−02 | 2.41048E−02 | −2.88493E−02 |
| 9 | −0.14997135 | −15.53648853 | −2.22610E−02 | 1.92692E−02 | 4.70447E−03 |
| 10 | −0.44277197 | 0.88918140 | 8.89798E−02 | −2.65836E−02 | 3.98591E−02 |
| 11 | −0.36953485 | −5.87353539 | −4.95044E−02 | 2.32864E−02 | −1.63379E−03 |
| 12 | 0.57542546 | −0.56815650 | −3.74259E−02 | −6.31972E−03 | −6.35511E−03 |
| 13 | 0.44137463 | −0.16620580 | 5.06712E−02 | −5.65421E−02 | 1.46468E−02 |
| 14 | 0.30760733 | 0.0 | −1.41667E−01 | 4.30710E−02 | −4.12183E−03 |
| 15 | 0.64075612 | −4.96547712 | −6.23724E−02 | 1.84322E−02 | −3.25223E−03 |

TABLE 18B-continued

Aspheric coefficients for embodiment 18

| $S_i$ | D | E | F |
|---|---|---|---|
| 4 | 1.61624E−02 | −4.64862E−03 | −7.66629E−07 |
| 5 | 3.77047E−03 | −1.01181E−03 | |
| 6 | −9.44564E−04 | 3.56401E−03 | |
| 7 | 2.61005E−02 | −3.61470E−03 | |
| 8 | 1.49334E−02 | −4.79948E−03 | |
| 9 | −1.45667E−02 | 3.89531E−03 | −2.44490E−04 |
| 10 | −2.44774E−02 | 4.98955E−03 | −6.62128E−05 |
| 11 | −3.18997E−04 | −1.25922E−05 | −4.70353E−06 |
| 12 | 2.48551E−03 | −3.05775E−04 | 1.31623E−05 |
| 13 | −1.77499E−03 | 6.71829E−05 | |
| 14 | −7.61900E−04 | 2.14700E−04 | −1.59933E−05 |
| 15 | 3.02911E−04 | −1.22316E−05 | |

TABLE 19A

Optical data for embodiment 19 (F1.6_Example-x3) shown in FIGS. 47-49
f = 4.10 mm, Fno = 1.60, HFOV = 37.0 deg, TTL = 5.60 mm

| $S_i$ | Component | | $R_i$ | Shape | $D_i$ | Material | $N_d$ | $V_d$ | $f_l$ |
|---|---|---|---|---|---|---|---|---|---|
| 0 | Object plane | | INF | FLT | INF | | | | |
| 1 | | | INF | FLT | 0.3574 | | | | |
| 2 | Aperture stop | | INF | FLT | −0.3574 | | | | |
| 3 | | | INF | FLT | 0.0000 | | | | |
| 4 | $L_1$ | $R_1$ | 2.362 | ASP | 0.7620 | Plastic | 1.545 | 55.9 | 5.17 |
| 5 | | $R_2$ | 12.788 | ASP | 0.3992 | | | | |
| 6 | $L_2$ | $R_3$ | 4.157 | ASP | 0.2492 | Plastic | 1.651 | 21.5 | −6.00 |
| 7 | | $R_4$ | 1.975 | ASP | 0.1540 | | | | |
| 8 | $L_3$ | $R_5$ | 5.802 | ASP | 0.8537 | Plastic | 1.545 | 55.9 | 4.85 |
| 9 | | $R_6$ | −4.623 | ASP | 0.3181 | | | | |
| 10 | $L_4$ | $R_7$ | −2.632 | ASP | 0.4310 | Plastic | 1.651 | 21.5 | 44.36 |
| 11 | | $R_8$ | −2.570 | ASP | 0.0500 | | | | |
| 12 | $L_5$ | $R_9$ | 1.597 | ASP | 0.4078 | Plastic | 1.545 | 55.9 | 11.63 |
| 13 | | $R_{10}$ | 1.941 | ASP | 0.8034 | | | | |
| 14 | $L_6$ | $R_{11}$ | 16.550 | ASP | 0.4715 | Plastic | 1.661 | 20.3 | −3.66 |
| 15 | | $R_{12}$ | 2.102 | ASP | 0.3854 | | | | |
| 16 | IR filter | | INF | FLT | | Glass | 1.516 | 64.1 | |
| 17 | | | INF | FLT | | | | | |
| 18 | Image plane | | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component at 555 nm
Design wavelengths: 650 nm, 610 nm, 555 nm, 510 nm, 470 nm

TABLE 19B

Aspheric coefficients for embodiment 19

| $S_i$ | c | K | A | B | C |
|---|---|---|---|---|---|
| 4 | 0.42331025 | −1.63739338 | 9.75448E−03 | 1.52504E−02 | −2.39950E−02 |
| 5 | 0.07819614 | 0.0 | −3.11742E−02 | 1.28389E−02 | −8.13151E−03 |
| 6 | 0.24053639 | 1.32154112 | −2.46625E−01 | 1.37080E−01 | −6.37591E−02 |
| 7 | 0.50635900 | −1.70539986 | −2.38569E−01 | 2.12804E−01 | −1.38573E−01 |
| 8 | 0.17234755 | 8.54424068 | −3.60160E−02 | 5.17208E−02 | −3.54262E−02 |
| 9 | −0.21632387 | 0.05563761 | −1.62976E−02 | 1.79915E−02 | 3.64951E−03 |
| 10 | −0.37996741 | −2.64351958 | 5.98231E−02 | −5.57586E−02 | 3.06498E−02 |
| 11 | −0.38909885 | −8.60911108 | −5.27880E−02 | 1.69282E−02 | −6.49831E−03 |
| 12 | 0.62605503 | −2.45725575 | −1.95286E−02 | −1.08248E−02 | −6.70257E−03 |
| 13 | 0.51532847 | −3.51530985 | 4.47948E−02 | −5.89496E−02 | 1.79005E−02 |
| 14 | 0.06042140 | 0.0 | −1.59181E−01 | 4.86217E−02 | −3.95900E−03 |
| 15 | 0.47576734 | −11.11473259 | −6.77420E−02 | 1.32668E−02 | −8.32655E−04 |

TABLE 19B-continued

Aspheric coefficients for embodiment 19

| $S_i$ | D | E | F |
|---|---|---|---|
| 4 | 1.67027E-02 | -4.95988E-03 | 3.31667E-06 |
| 5 | -1.83991E-04 | -3.91884E-04 | |
| 6 | 1.16802E-02 | 3.91237E-04 | |
| 7 | 4.16714E-02 | -4.12856E-03 | |
| 8 | 2.91466E-04 | 1.89552E-03 | |
| 9 | -9.39838E-03 | 1.86940E-03 | -2.13718E-05 |
| 10 | -1.38881E-02 | 2.37004E-03 | -4.71258E-05 |
| 11 | 1.49239E-04 | 3.63160E-04 | |
| 12 | 3.29792E-03 | -4.80016E-04 | |
| 13 | -2.66995E-03 | 1.46045E-04 | -2.19832E-07 |
| 14 | -7.98388E-04 | 1.64561E-04 | -7.87808E-06 |
| 15 | -4.37196E-05 | 4.65976E-06 | |

TABLE 20A

Data for various embodiments

| | 1 | 2 | 3 | 4 | 5 | 6 | 7 | 8 | 9 | 10 |
|---|---|---|---|---|---|---|---|---|---|---|
| f, mm | 4.611 | 4.624 | 4.100 | 4.100 | 4.100 | 4.100 | 4.100 | 4.100 | 4.100 | 4.100 |
| F-no | 2.0 | 2.0 | 1.8 | 1.8 | 1.8 | 1.8 | 1.8 | 1.8 | 1.8 | 1.8 |
| HFOV, deg | 37.0 | 37.0 | 37.0 | 37.0 | 37.0 | 37.0 | 37.0 | 37.0 | 37.0 | 37.0 |
| TTL, mm | 5.73 | 5.74 | 5.40 | 5.40 | 5.40 | 5.40 | 5.40 | 5.40 | 5.40 | 5.40 |
| TTL/f | 1.24 | 1.24 | 1.32 | 1.32 | 1.32 | 1.32 | 1.32 | 1.32 | 1.32 | 1.32 |
| $(R_1 + R_2)/(R_1 - R_2)$ | -0.90 | -0.91 | -0.89 | -0.90 | -0.99 | -0.90 | -0.88 | -0.82 | -0.78 | -0.83 |
| $(R_3 + R_4)/(R_3 - R_4)$ | 1.27 | 1.29 | 2.22 | 2.67 | 2.17 | 2.11 | 1.99 | 1.81 | 1.66 | 1.92 |
| $(R_5 + R_6)/(R_5 - R_6)$ | 1.19 | 0.29 | 4.21 | -2.06 | -2.43 | -1.90 | -1.31 | -0.81 | -0.72 | -1.57 |
| $(R_7 + R_8)/(R_7 - R_8)$ | 1.34 | 1.06 | 0.86 | 1.43 | 1.47 | 1.43 | 1.25 | 1.23 | 1.21 | 1.31 |
| $(R_9 + R_{10})/(R_9 - R_{10})$ | -10.74 | 35.02 | -8.89 | 5.09 | 5.08 | 5.09 | 5.05 | 5.10 | 5.16 | 5.20 |
| $(R_{11} + R_{12})/(R_{11} - R_{12})$ | -0.14 | -0.22 | -0.06 | 0.72 | 0.70 | 0.72 | 0.75 | 0.73 | 0.74 | 0.79 | 0.92 |
| $f_1/f$ | 0.7395 | 0.7483 | 0.8366 | 0.8268 | 0.8585 | 0.8268 | 0.8171 | 0.7976 | 0.7780 | 0.7976 |
| $f_2/f$ | -1.3489 | -1.4619 | -1.3902 | -1.7756 | -1.9683 | -1.7976 | -1.6707 | -1.5780 | -1.5073 | -1.5732 |
| $f_3/f$ | -3.4244 | -2.7638 | -3.6317 | -5.7366 | -6.1098 | -5.3537 | -4.4902 | -3.8561 | -3.5073 | -4.7707 |
| $f_4/f$ | 1.1082 | 0.9472 | 0.8244 | 0.7854 | 0.7902 | 0.7854 | 0.7220 | 0.7122 | 0.7098 | 0.7415 |
| $f_5/f$ | 4.8883 | -172.42 | 5.1854 | -1.9610 | -1.9317 | -1.9585 | -1.7659 | -1.7878 | -1.8024 | -1.8561 |
| $f_6/f$ | -0.8133 | -0.8521 | -0.7390 | -1.0854 | -1.0878 | -1.0829 | -1.0756 | -1.0780 | -1.0951 | -1.0902 |
| $|f_1/f|$ | 0.7395 | 0.7483 | 0.8366 | 0.8268 | 0.8585 | 0.8268 | 0.8171 | 0.7976 | 0.7780 | 0.7976 |
| $|f_2/f|$ | 1.3489 | 1.4619 | 1.3902 | 1.7756 | 1.9683 | 1.7976 | 1.6707 | 1.5780 | 1.5073 | 1.5732 |
| $|f_3/f|$ | 3.4244 | 2.7638 | 3.6317 | 5.7366 | 6.1098 | 5.3537 | 4.4902 | 3.8561 | 3.5073 | 4.7707 |
| $|f_4/f|$ | 1.1082 | 0.9472 | 0.8244 | 0.7854 | 0.7902 | 0.7854 | 0.7220 | 0.7122 | 0.7098 | 0.7415 |
| $|f_5/f|$ | 4.8883 | 172.426 | 5.1854 | 1.9610 | 1.9317 | 1.9585 | 1.7659 | 1.7878 | 1.8024 | 1.8561 |
| $|f_6/f|$ | 0.8133 | 0.8521 | 0.7390 | 1.0854 | 1.0878 | 1.0829 | 1.0756 | 1.0780 | 1.0951 | 1.0902 |
| $R_1/R_2$ | -0.055 | -0.046 | -0.058 | -0.053 | -0.007 | -0.054 | -0.064 | -0.097 | -0.125 | -0.091 |
| $R_3/R_4$ | 8.309 | 7.900 | 2.645 | 2.703 | 2.195 | 2.797 | 3.026 | 3.456 | 4.012 | 3.184 |
| $R_5/R_6$ | 11.389 | -1.834 | 1.623 | 0.345 | 0.418 | 0.311 | 0.136 | -0.105 | -0.161 | 0.221 |
| $R_7/R_8$ | 6.970 | 33.731 | -13.661 | 5.657 | 5.222 | 5.660 | 9.128 | 9.555 | 10.730 | 7.377 |
| $R_9/R_{10}$ | 0.830 | 1.059 | 0.798 | 1.490 | 1.491 | 1.489 | 1.494 | 1.488 | 1.481 | 1.477 |
| $R_{11}/R_{12}$ | -0.755 | -0.642 | -0.892 | -6.126 | -5.686 | -7.125 | -6.273 | -6.645 | -8.418 | -23.174 |

TABLE 20B

Data for various embodiments

| | 11 | 12 | 13 | 14 | 15 | 16 | 17 | 18 | 19 |
|---|---|---|---|---|---|---|---|---|---|
| f, mm | 4.100 | 4.100 | 4.060 | 4.100 | 4.100 | 4.100 | 4.100 | 4.100 | 4.100 |
| F-no | 1.8 | 1.6 | 1.6 | 1.6 | 1.6 | 1.6 | 1.6 | 1.6 | 1.6 |
| HFOV, deg | 37.0 | 37.0 | 37.0 | 37.0 | 37.0 | 37.0 | 37.0 | 37.0 | 37.0 |
| TTL, mm | 5.40 | 5.60 | 5.60 | 5.60 | 5.60 | 5.60 | 5.60 | 5.40 | 5.60 |
| TTL/f | 1.32 | 1.37 | 1.38 | 1.37 | 1.37 | 1.37 | 1.37 | 1.32 | 1.37 |
| $(R_1 + R_2)/(R_1 - R_2)$ | -0.91 | -0.76 | -0.76 | -0.77 | -0.85 | -1.02 | -1.34 | -1.43 | -1.45 |
| $(R_3 + R_4)/(R_3 - R_4)$ | 2.19 | 2.63 | 2.63 | 2.72 | 2.82 | 4.64 | 2.51 | 2.62 | 2.81 |
| $(R_5 + R_6)/(R_5 - R_6)$ | -2.02 | 2.73 | 2.73 | 2.67 | 1.47 | 1.08 | -0.14 | -0.08 | 0.11 |
| $(R_7 + R_8)/(R_7 - R_8)$ | 1.42 | 1.10 | 1.10 | 1.11 | 1.27 | 0.96 | -12.53 | -11.08 | 83.90 |
| $(R_9 + R_{10})/(R_9 - R_{10})$ | 5.08 | 7.63 | 7.63 | 7.34 | 8.19 | 4.33 | -7.48 | -7.58 | -10.28 |
| $(R_{11} + R_{12})/(R_{11} - R_{12})$ | 0.73 | 0.86 | 0.86 | 0.85 | 0.86 | 2.29 | 2.37 | 2.85 | 1.29 |
| $f_1/f$ | 0.8341 | 0.8659 | 0.8719 | 0.8659 | 0.8829 | 0.9610 | 1.1512 | 1.1683 | 1.2610 |

TABLE 20B-continued

Data for various embodiments

| | 11 | 12 | 13 | 14 | 15 | 16 | 17 | 18 | 19 |
|---|---|---|---|---|---|---|---|---|---|
| $f_2/f$ | −1.8024 | −1.6220 | −1.6256 | −1.6317 | −1.9634 | −2.3976 | −1.5439 | −1.6171 | −1.4634 |
| $f_3/f$ | −5.3610 | −2.5220 | −2.5148 | −2.4732 | −2.4927 | −2.0146 | 1.3829 | 1.4049 | 1.1829 |
| $f_4/f$ | 0.7756 | 0.7000 | 0.7069 | 0.7000 | 0.7463 | 0.6415 | −10.461 | −9.0707 | 10.8195 |
| $f_5/f$ | −1.9366 | −2.9976 | −3.5296 | −3.3122 | −3.9268 | −1.5659 | 2.6024 | 2.6098 | 2.8366 |
| $f_6/f$ | −1.1098 | −1.1341 | −1.1478 | −1.1244 | −1.0463 | −1.5659 | −1.2976 | −1.2854 | −0.8927 |
| $|f_1/f|$ | 0.8341 | 0.8659 | 0.8719 | 0.8659 | 0.8829 | 0.9610 | 1.1512 | 1.1683 | 1.2610 |
| $|f_2/f|$ | 1.8024 | 1.6220 | 1.6256 | 1.6317 | 1.9634 | 2.3976 | 1.5439 | 1.6171 | 1.4634 |
| $|f_3/f|$ | 5.3610 | 2.5220 | 2.5148 | 2.4732 | 2.4927 | 2.0146 | 1.3829 | 1.4049 | 1.1829 |
| $|f_4/f|$ | 0.7756 | 0.7000 | 0.7069 | 0.7000 | 0.7463 | 0.6415 | 10.461 | 9.0707 | 10.8195 |
| $|f_5/f|$ | 1.9366 | 2.9976 | 3.5296 | 3.3122 | 3.9268 | 1.5659 | 2.6024 | 2.6098 | 2.8366 |
| $|f_6/f|$ | 1.1098 | 1.1341 | 1.1478 | 1.1244 | 1.0463 | 1.5659 | 1.2976 | 1.2854 | 0.8927 |
| $R_1/R_2$ | −0.045 | −0.137 | −0.137 | −0.129 | −0.083 | 0.008 | 0.145 | 0.177 | 0.185 |
| $R_3/R_4$ | 2.680 | 2.228 | 2.228 | 2.165 | 2.101 | 1.550 | 2.324 | 2.238 | 2.105 |
| $R_5/R_6$ | 0.338 | 2.153 | 2.153 | 2.196 | 5.300 | 24.979 | −0.755 | −0.859 | −1.255 |
| $R_7/R_8$ | 5.757 | 20.512 | 20.512 | 19.168 | 8.303 | −50.721 | 0.852 | 0.834 | 1.024 |
| $R_9/R_{10}$ | 1.490 | 1.302 | 1.302 | 1.316 | 1.278 | 1.602 | 0.764 | 0.767 | 0.823 |
| $R_{11}/R_{12}$ | −6.491 | −12.949 | −12.949 | −12.730 | −13.411 | 2.548 | 2.462 | 2.083 | 7.873 |

What is claimed is:

1. An optical imaging lens assembly comprising, in order from an object side to an image side:
   a first lens component with positive refractive power and a convex object-side refractive surface;
   a second lens component with negative refractive power, a convex object-side refractive surface, and a concave image-side refractive surface;
   a third lens component with refractive power;
   a fourth lens component with refractive power and a convex image-side refractive surface;
   a fifth lens component with refractive power, a convex object-side refractive surface, and a concave image-side refractive surface; and
   a sixth lens component with negative refractive power, an object-side refractive surface that is concave in a paraxial region, and a concave image-side refractive surface.

2. The optical imaging lens assembly of claim 1 wherein the first lens component has a convex image-side refractive surface.

3. The optical imaging lens assembly of claim 1 wherein the fourth lens component has a concave object-side refractive surface.

4. The optical imaging lens assembly of claim 1 wherein the following relation is satisfied:

$-2.4 < f_2/f < -1.3$.

5. The optical imaging lens assembly of claim 1 wherein the following relation is satisfied:

$-1.6 < f_6/f < -0.7$.

6. The optical imaging lens assembly of claim 1 wherein the following relation is satisfied:

$-1.5 < (Ri+R_2)/(Ri-R_2) < -0.7$.

7. The optical imaging lens assembly of claim 1 wherein the following relation is satisfied:

$1.2 < (R3+R4)/(R3-R4) < 4.7$.

8. The optical imaging lens assembly of claim 1 wherein the following relation is satisfied:

$-0.3 < (Rii+Ri_2)/(Rii-R_{12}) < 2.9$.

9. The optical imaging lens assembly of claim 1 wherein the following relation is satisfied:

$0.7 < R9/R10 < 1.7$.

10. The optical imaging lens assembly of claim 1 wherein at least one of the object-side refractive surface or the image-side refractive surface of each of the six lens components is aspheric.

11. The optical imaging lens assembly of claim 1 wherein the object-side refractive surface and the image-side refractive surface of each of the six lens components are both aspheric.

12. The optical imaging lens assembly of claim 1 wherein the fourth lens component has a positive refractive power.

13. The optical imaging lens assembly of claim 12 wherein the third lens component has a negative refractive power.

14. A portable wireless communications device comprising:
   an outer housing; and
   a digital camera integrated inside the outer housing, the digital camera having an optical imaging lens assembly comprising, in order from an object side to an image side:
     a first lens component with positive refractive power and a convex object-side refractive surface;
     a second lens component with negative refractive power, a convex object-side refractive surface, and a concave image-side refractive surface;
     a third lens component with refractive power;
     a fourth lens component with refractive power and a convex image-side refractive surface;
     a fifth lens component with refractive power, a convex object-side refractive surface, and a concave image-side refractive surface; and
     a sixth lens component with negative refractive power, an object-side refractive surface that is concave in a paraxial region, and a concave image-side refractive surface.

15. The portable wireless communications device of claim 14 wherein the third lens component has a negative refractive power.

16. The portable wireless communications device of claim 14 wherein the first lens component has a convex image-side refractive surface.

17. The portable wireless communications device of claim 14 wherein the fourth lens component has a concave object-side refractive surface.

18. The portable wireless communications device of claim 14 wherein the optical imaging lens assembly has a total track length of less than 6 millimeters.

\* \* \* \* \*